United States Patent
Asano et al.

(10) Patent No.: US 11,755,169 B2
(45) Date of Patent: Sep. 12, 2023

(54) MULTI-DIRECTIONAL INPUT DEVICE

(71) Applicant: Hosiden Corporation, Yao (JP)

(72) Inventors: Mitsuhiro Asano, Yao (JP); Masato Shimizu, Yao (JP)

(73) Assignee: HOSIDEN CORPORATION, Yao (JP)

( * ) Notice: Subject to any disclaimer, the term of this patent is extended or adjusted under 35 U.S.C. 154(b) by 0 days.

(21) Appl. No.: 17/877,007

(22) Filed: Jul. 29, 2022

(65) Prior Publication Data
US 2023/0032914 A1    Feb. 2, 2023

(30) Foreign Application Priority Data

Aug. 2, 2021   (JP) .................... 2021-126436
May 20, 2022   (JP) .................... 2022-083102
May 20, 2022   (JP) .................... 2022-083103

(51) Int. Cl.
*G06F 3/046*   (2006.01)
*G05G 9/047*   (2006.01)

(52) U.S. Cl.
CPC ............. *G06F 3/046* (2013.01); *G05G 9/047* (2013.01); *G05G 2009/04722* (2013.01)

(58) Field of Classification Search
CPC .......... G05G 2009/04722; G05G 2009/04755; G06F 3/046
See application file for complete search history.

(56) References Cited

U.S. PATENT DOCUMENTS

| 9,946,293 | B2 | 4/2018 | Rubio et al. |
| 10,203,717 | B2 | 2/2019 | Olsson |
| 2020/0209908 | A1* | 7/2020 | Arita ................ G06F 3/0338 |
| 2022/0334608 | A1 | 10/2022 | Ninomiya |

FOREIGN PATENT DOCUMENTS

| JP | 2020-107178 | 7/2020 |
| WO | 2021/140754 A1 | 7/2021 |

OTHER PUBLICATIONS

Extended European Search Report corresponding to Application No. EP 22187677.4, dated Dec. 16, 2022, 11 pages.

* cited by examiner

*Primary Examiner* — Lisa S Landis
(74) *Attorney, Agent, or Firm* — Rankin, Hill & Clark LLP

(57) ABSTRACT

A multi-directional input device includes an operating member that can be tilted and pushed in, a metal dome that functions as a push-in operation detector that detects a push-in operation of the operating member, a magnet holding member that is relatively movable with respect to the operating member only in a direction along a push-in direction and is interlocked only in a tilting direction, a magnet held by the magnet holding member, and a magnetic sensor that is disposed at a position facing the magnet and detects a movement of the magnet.

14 Claims, 37 Drawing Sheets

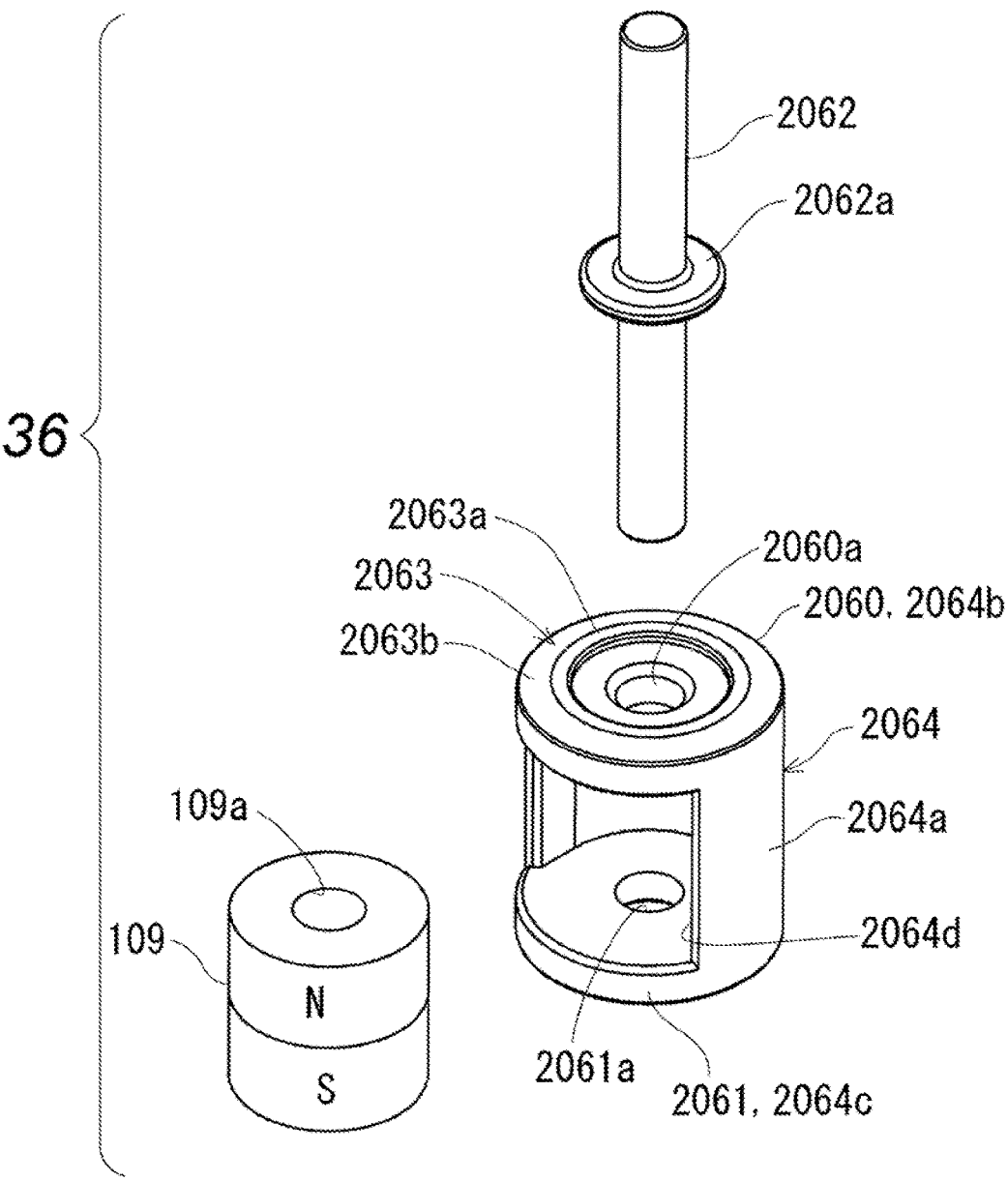

MULTI-DIRECTIONAL INPUT DEVICE

BACKGROUND OF THE INVENTION

(1) Field of the Invention

The present invention relates to a multi-directional input device.

(2) Description of Related Art

Conventionally, there has been known a multi-directional input device including an operating member that can be tilted and pushed, a push-in operation detector that detects a push-in operation of the operating member, a magnet embedded in a lower end portion of the operating member, and a magnetoelectric conversion element that detects a magnetic field of the magnet displaced according to the tilting operation of the operating member (see, for example, JP 2020-107178 A).

SUMMARY OF THE INVENTION

In the conventional multi-directional input device, there is a problem that the magnet also moves downward when the operating member is pushed in, so that the magnetic field changes, which adversely affects the detection of the tilting operation of the operating member.

An object of the present invention is to provide a multi-directional input device capable of improving detection accuracy of tilting operation of an operating member.

A multi-directional input device according to the present invention includes: an operating member that can be tilted and pushed in; a push-in operation detector that detects a push-in operation of the operating member; a magnet holding member that is relatively movable with respect to the operating member only in a direction along a push-in direction and is interlocked with the operating member only in a tilting direction; a magnet held by the magnet holding member; and a magnetic sensor that is disposed at a position facing the magnet and detects movement of the magnet.

In the multi-directional input device according to the present invention, since the magnet is held by the magnet holding member that is relatively movable with respect to the operating member only in the direction along the push-in direction and is interlocked only in the tilting direction, the magnet does not move downward and the magnetic field does not change when the operating member is pushed in. Therefore, the detection accuracy of the tilting operation of the operating member is not adversely affected, and the detection accuracy of the tilting operation of the operating member can be improved.

According to the present invention, it is possible to provide the multi-directional input device capable of improving the detection accuracy of the tilting operation of the operating member.

BRIEF DESCRIPTION OF THE DRAWINGS

FIGS. 25A and 25B are views illustrating a disk-shaped component, in which FIG. 25A is a plan view and FIG. 25B is a front view of one side cross section;

FIG. 36 is an exploded perspective view illustrating the first modification of the magnet holding portion;

FIGS. 37A and 37B are views illustrating a cylindrical component, in which FIG. 37A is a one-side cross-sectional plan view and FIG. 37B is a one-side cross-sectional front view.

DETAILED DESCRIPTION OF PREFERRED EMBODIMENTS

Figure 1:
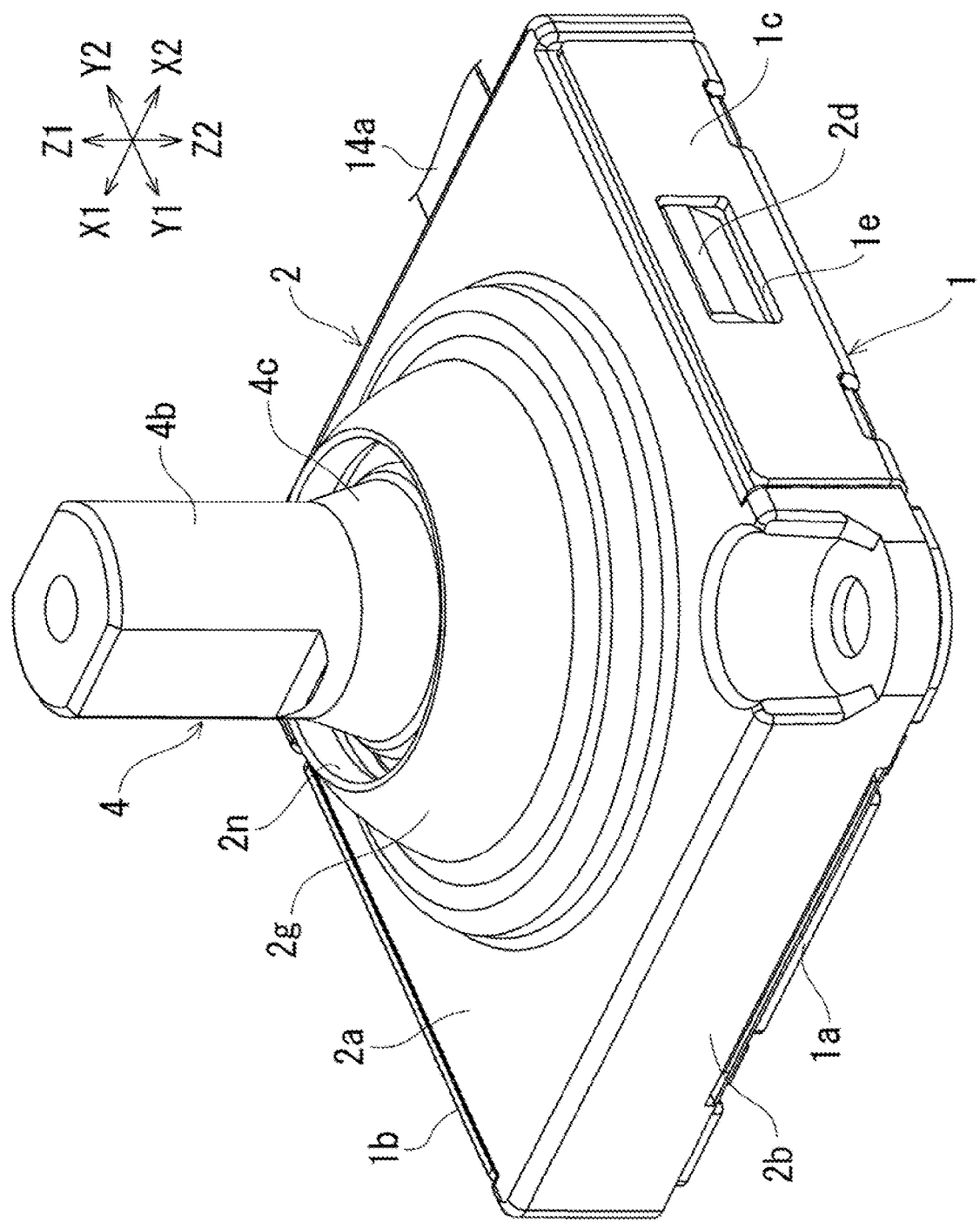
FIG. 1 is a front perspective view illustrating a multi-directional input device according to an embodiment of the present invention in a state where an operating force is not applied to an operating member.
Figure 2:
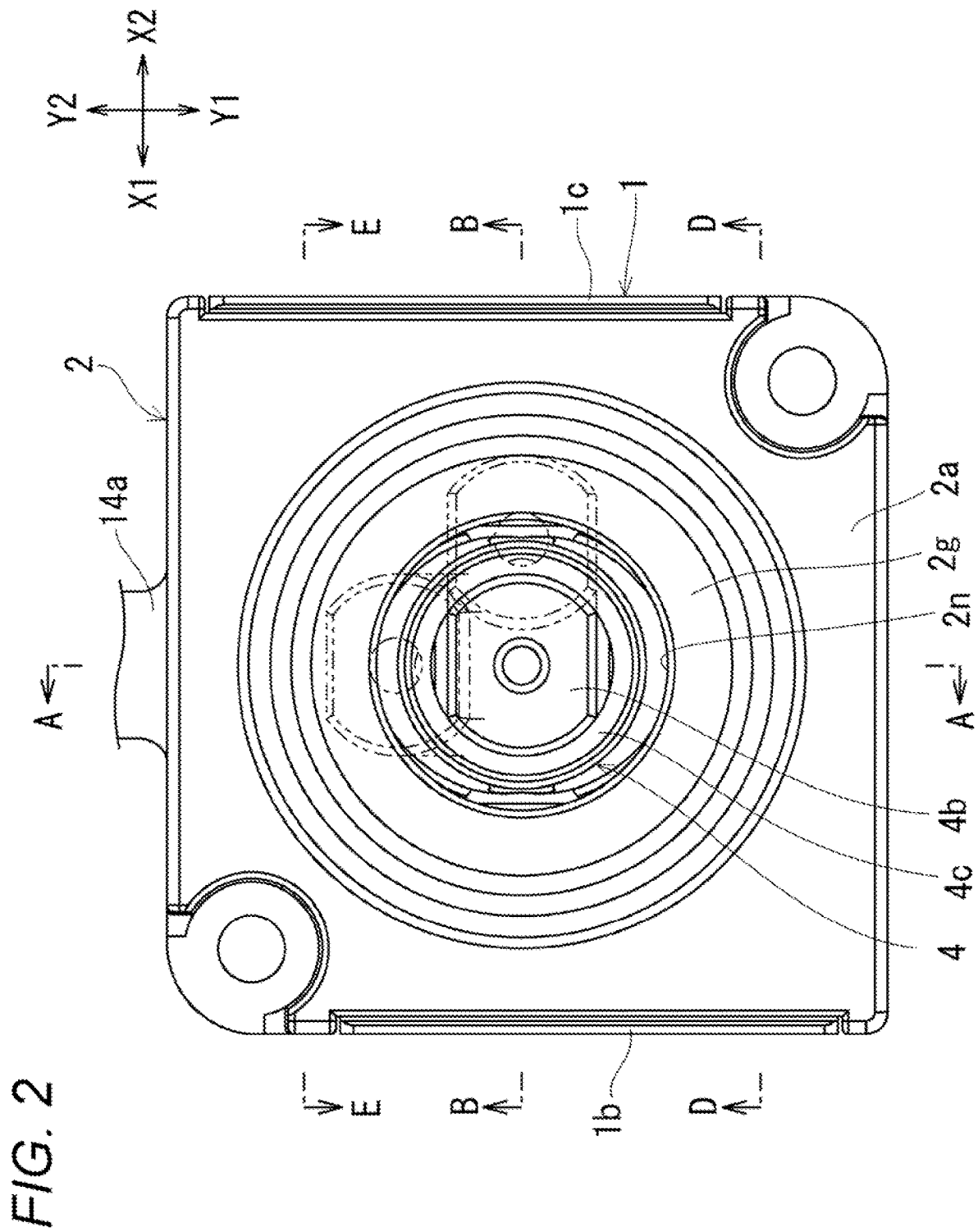
FIG. 2 is a plan view of the multi-directional input device in FIG. 1.
Figure 3:
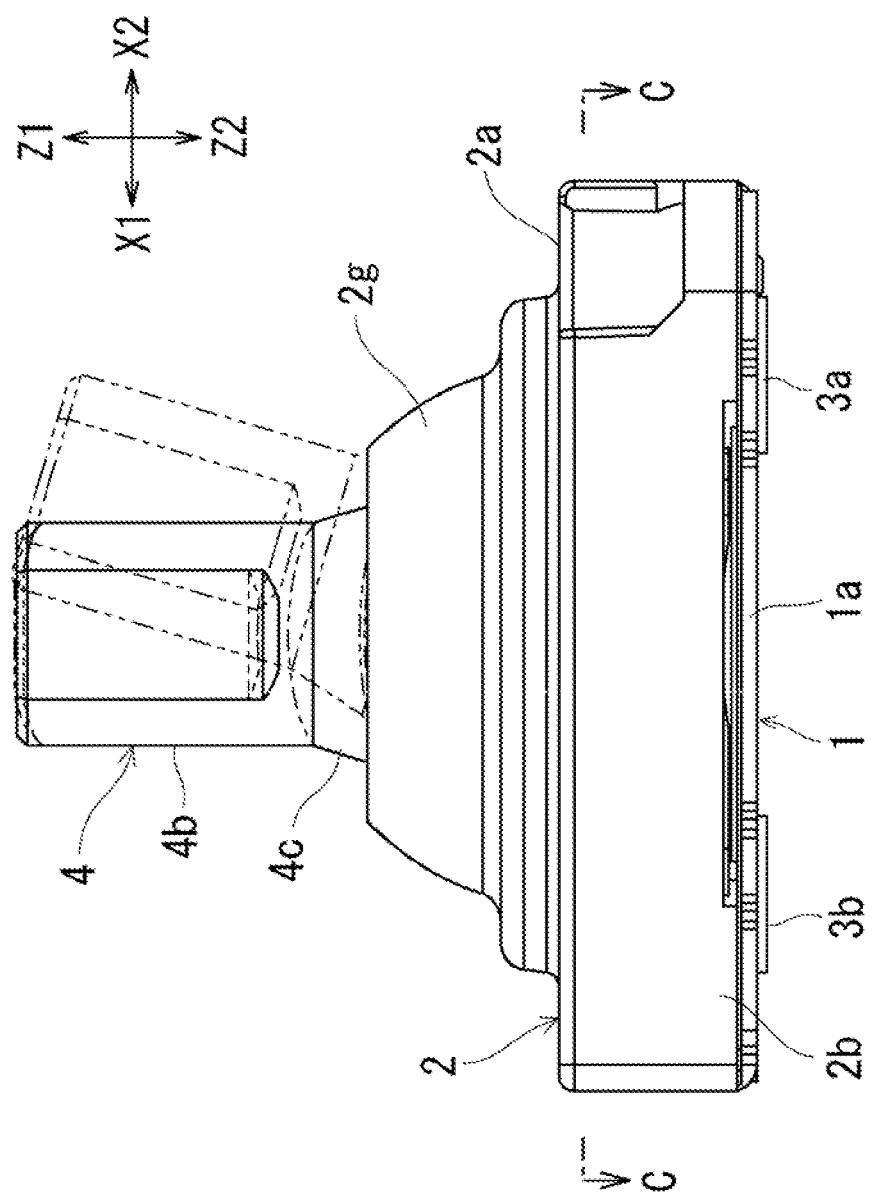
FIG. 3 is a front view of the multi-directional input device in FIG. 1.
Figure 4:
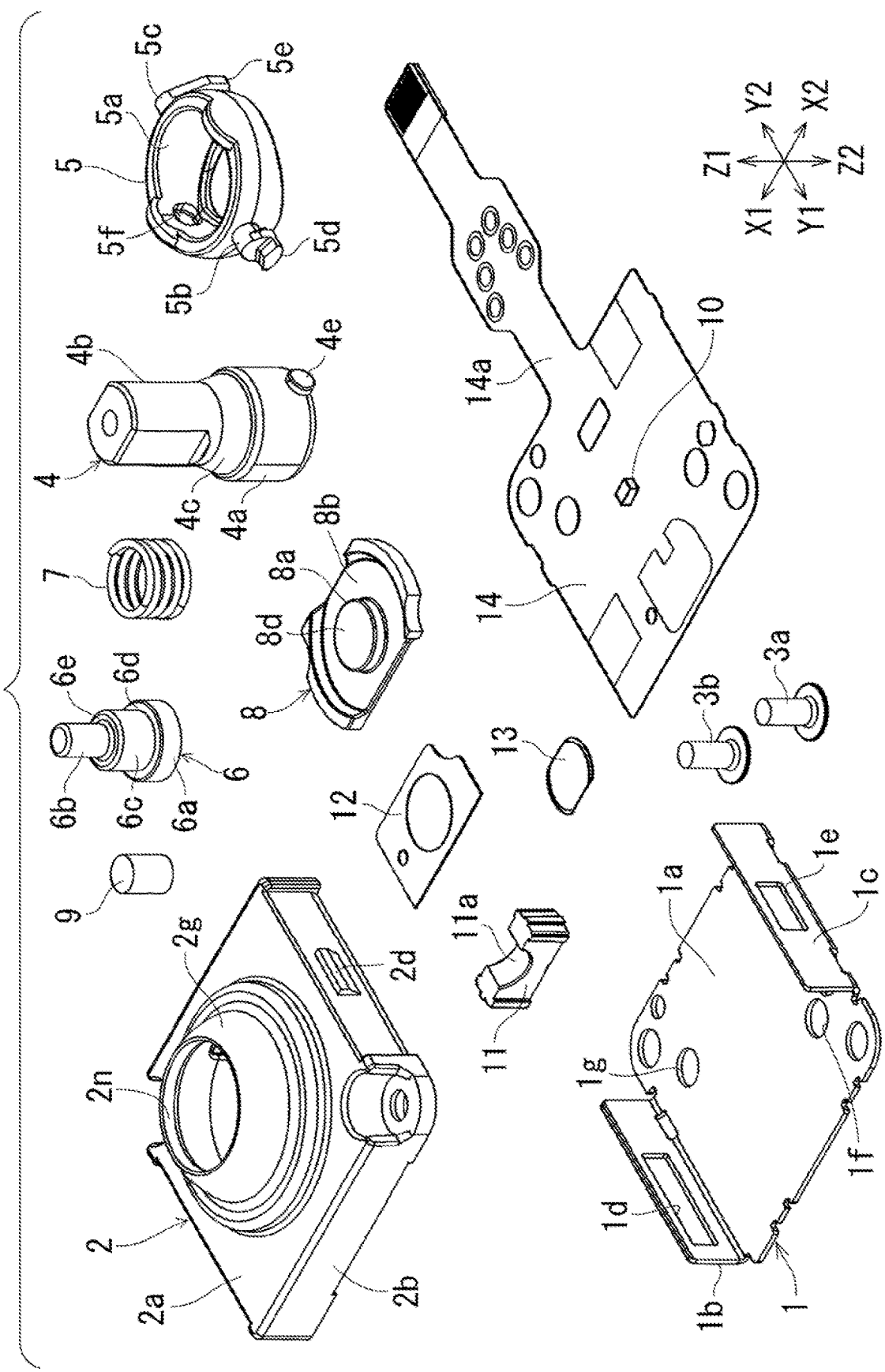
FIG. 4 is an exploded front perspective view of the multi-directional input device in FIG. 1.
Figure 5:
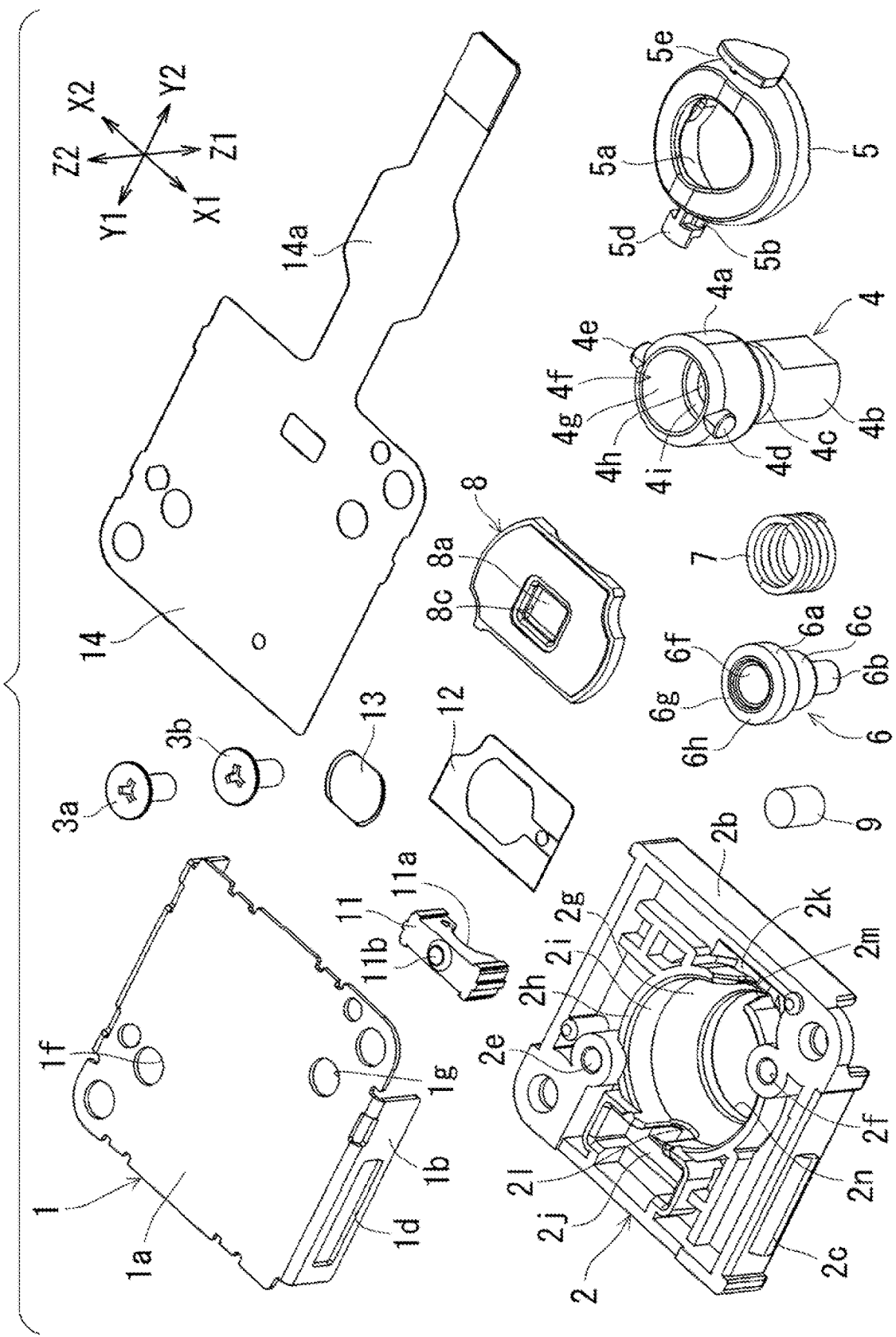
FIG. 5 is an exploded bottom perspective view of the multi-directional input device in FIG. 1.
Figure 6:
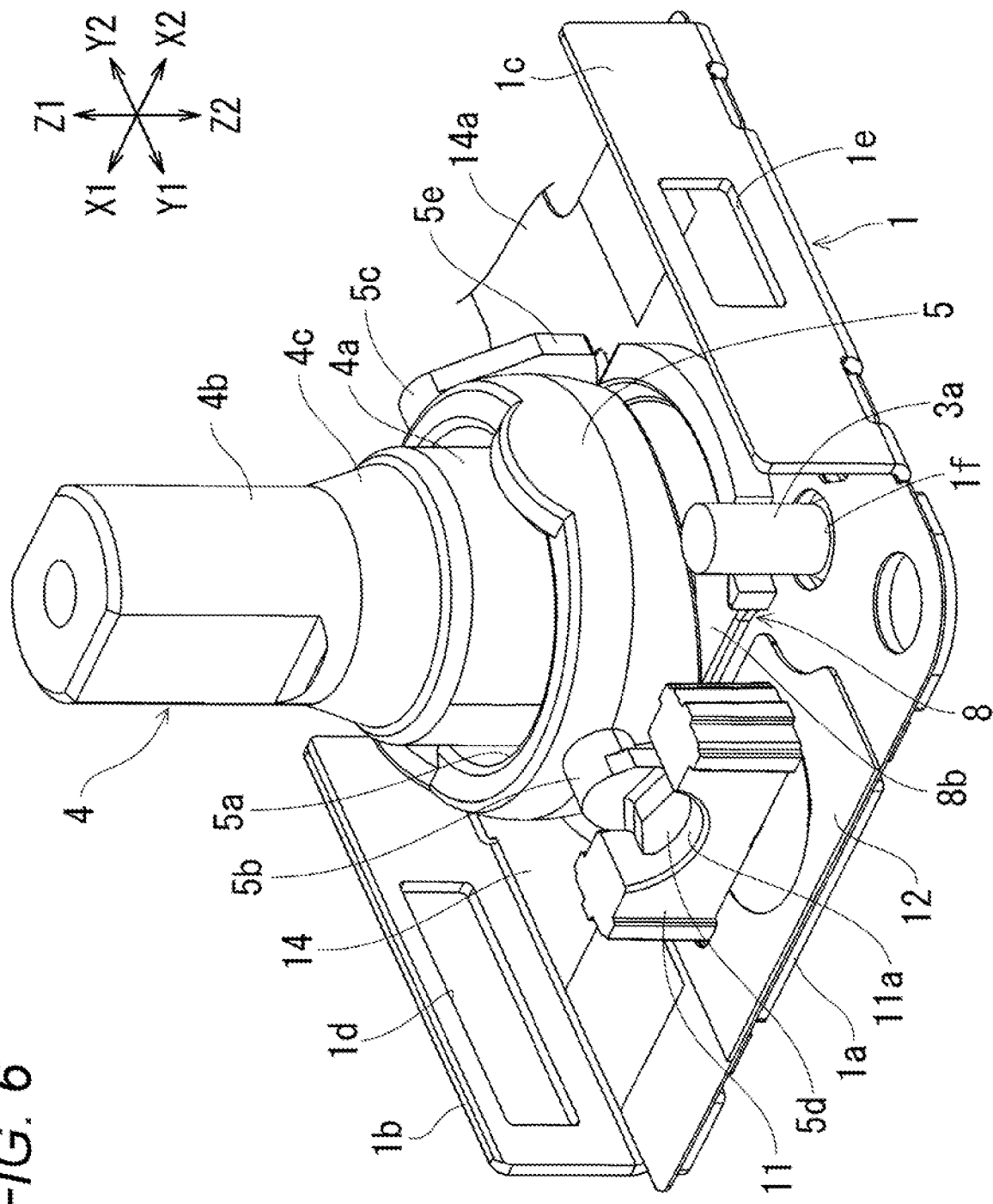
FIG. 6 is a front perspective view of the multi-directional input device in FIG. 1 in a state where an upper cover is transparent.
Figure 7:
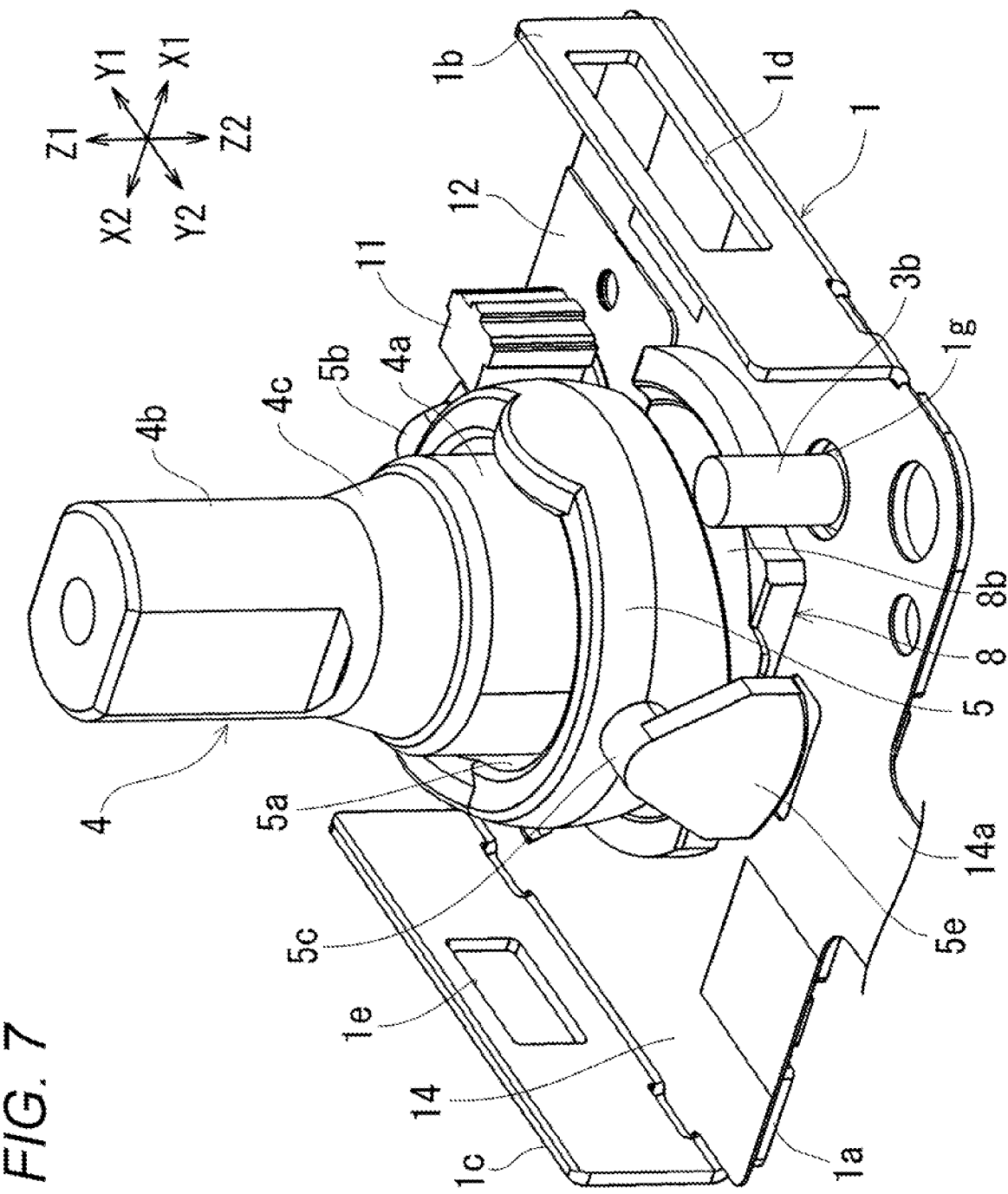
FIG. 7 is a rear perspective view of the multi-directional input device in FIG. 1 in a state where the upper cover is transparent.
Figure 8:
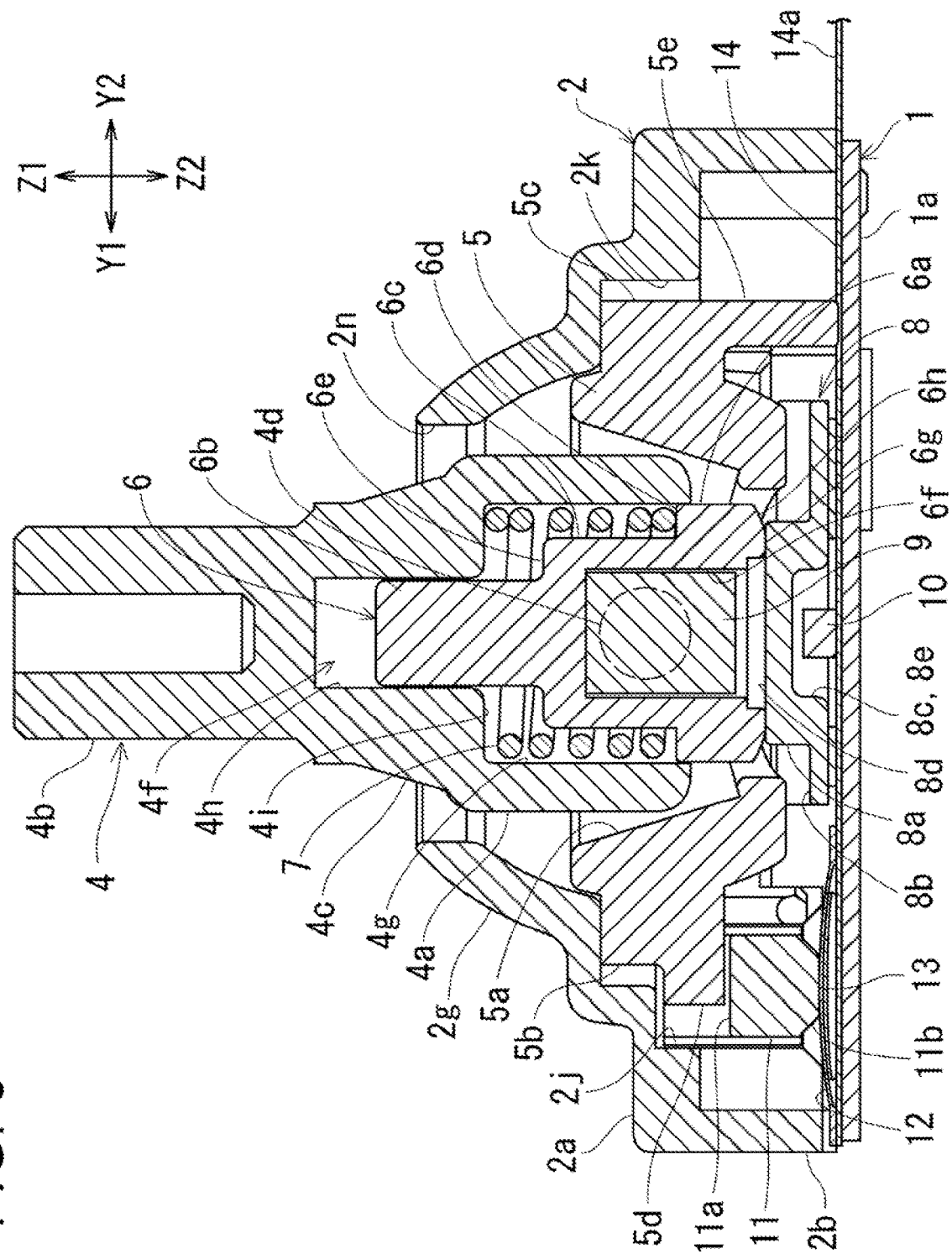
FIG. 8 is a cross-sectional view taken along line A-A of FIG. 2.
Figure 9:
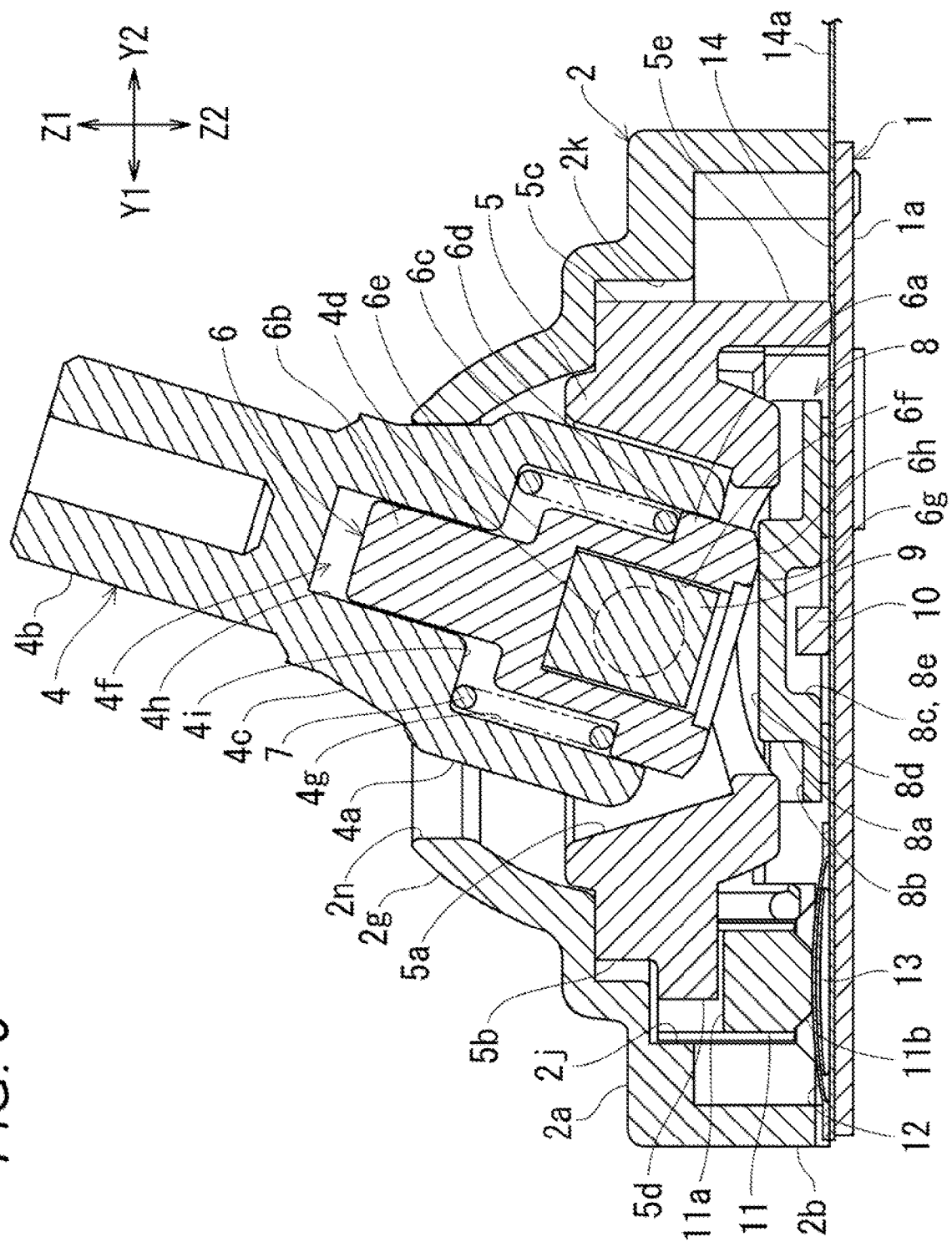
FIG. 9 is a cross-sectional view taken along line A-A of FIG. 2 in a state where the operating member is tilted backward.
Figure 10:
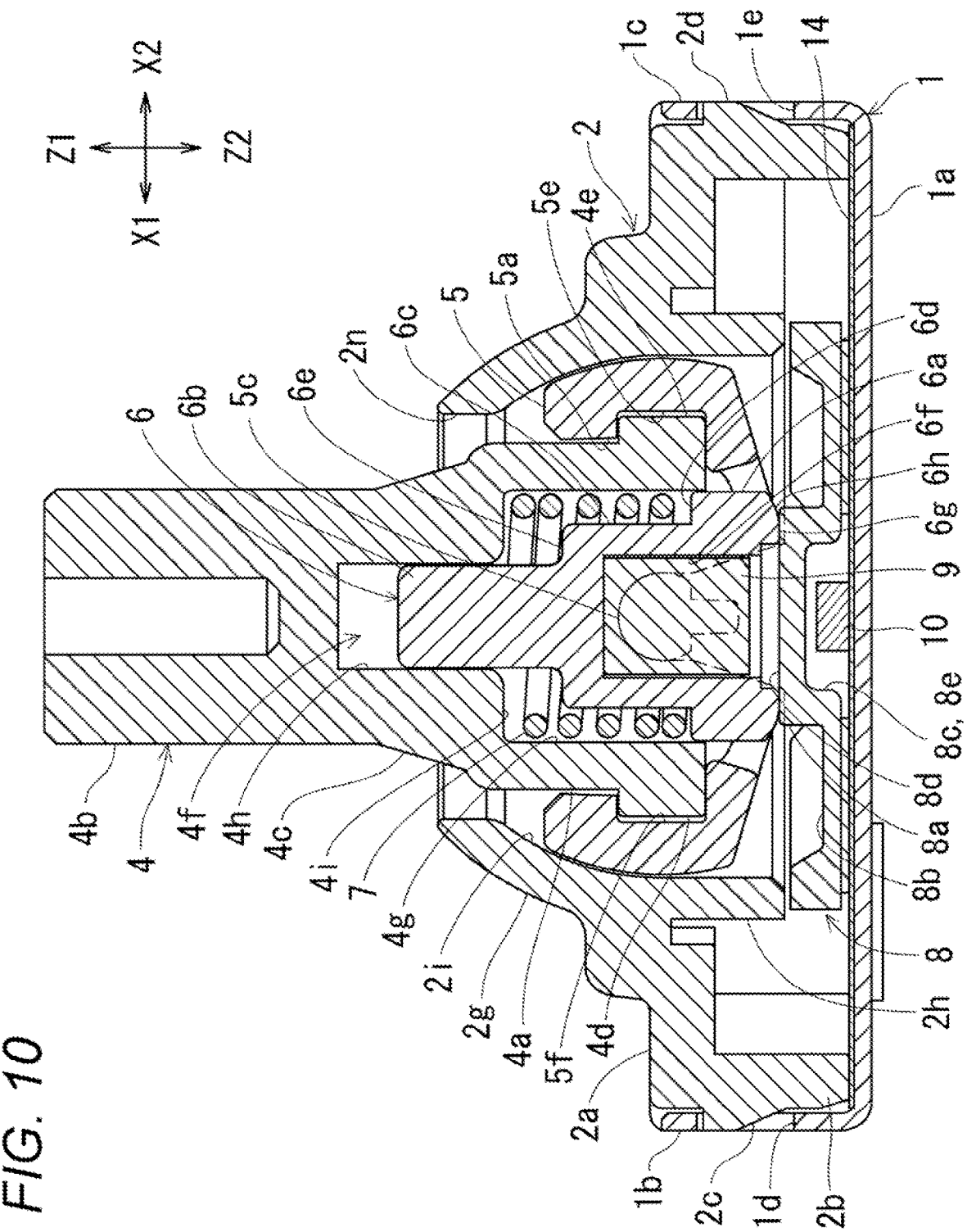
FIG. 10 is a cross-sectional view taken along line B-B of FIG. 2.
Figure 11:
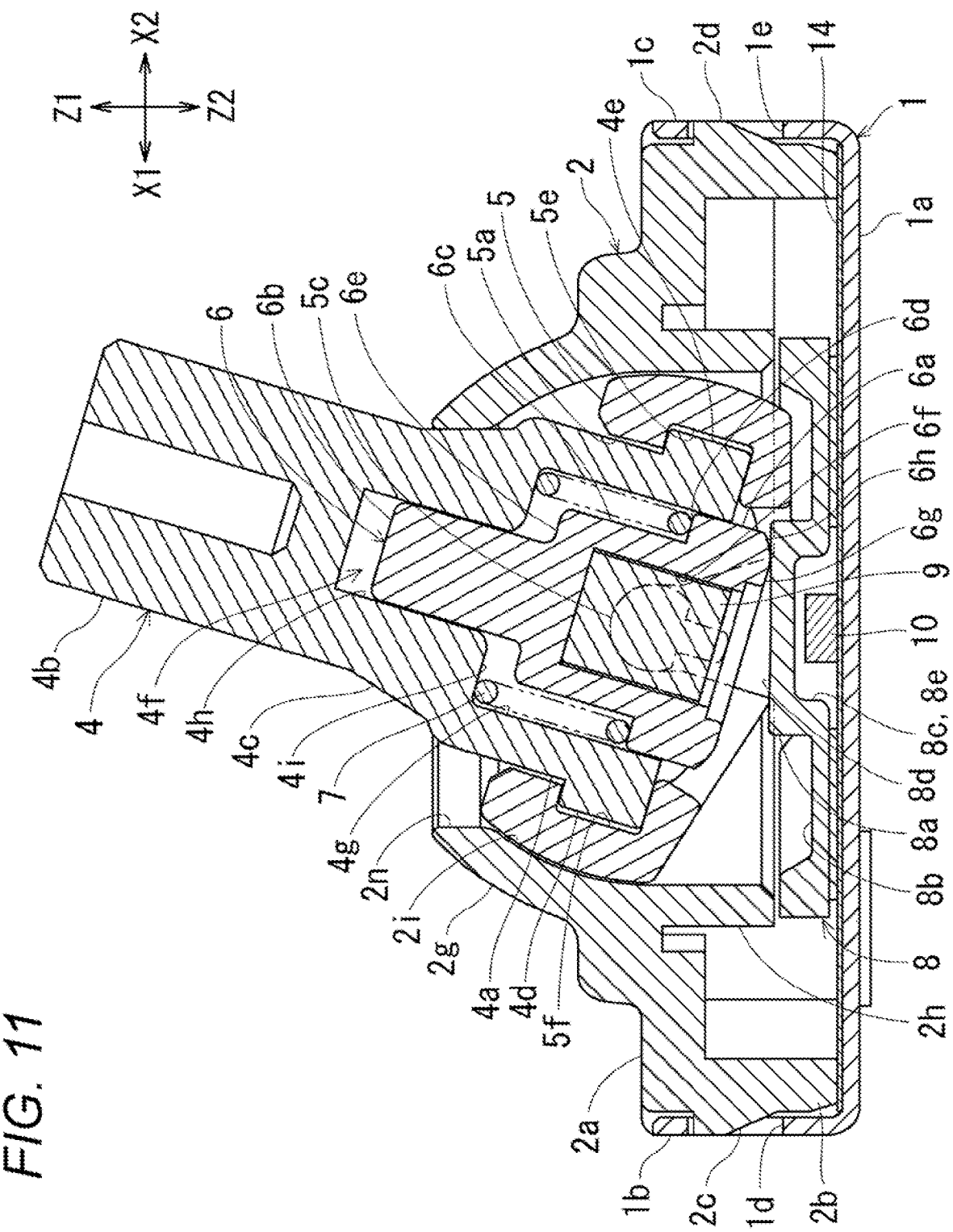
FIG. 11 is a cross-sectional view taken along line B-B of FIG. 2 in a state where the operating member is tilted rightward.
Figure 12:
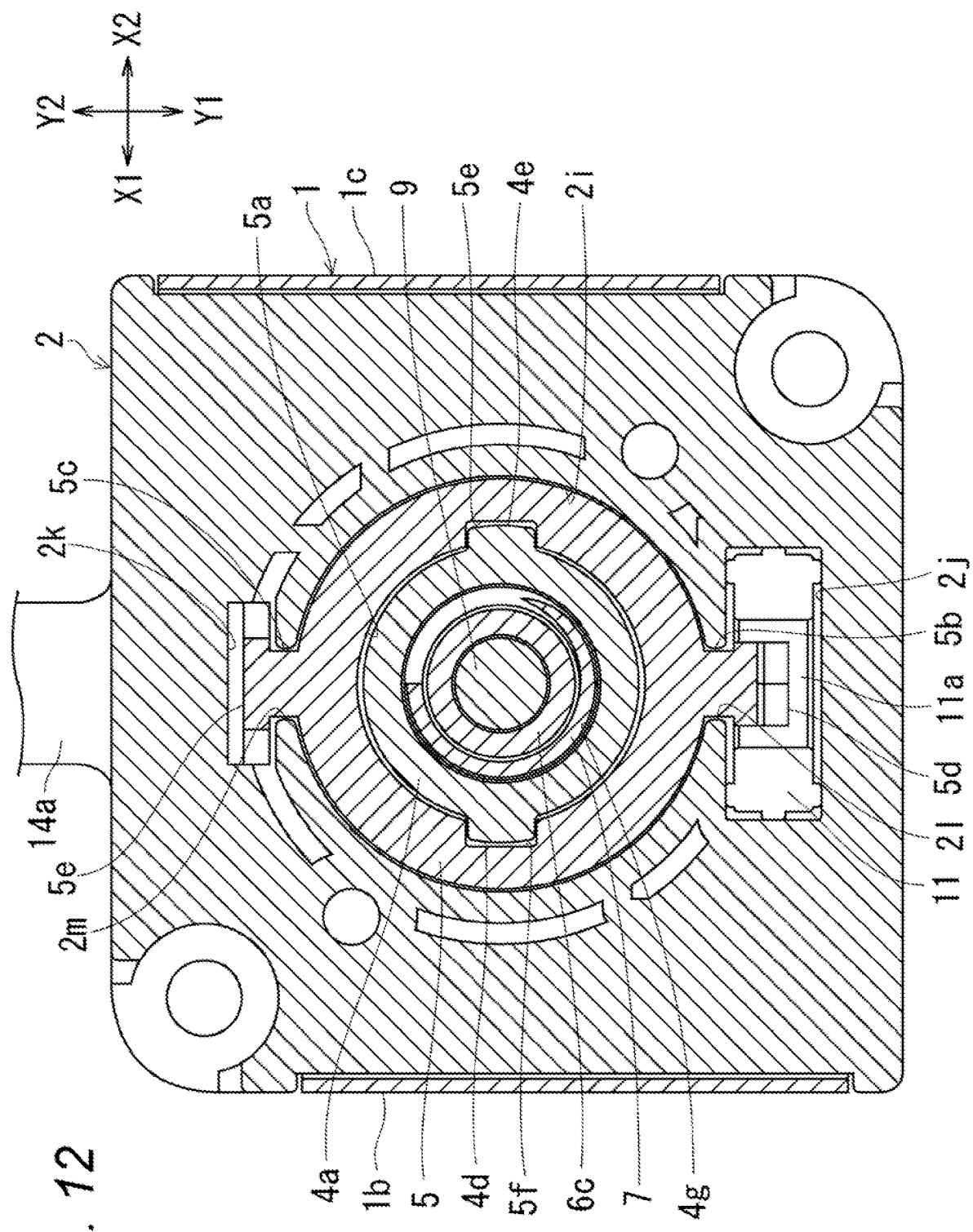
FIG. 12 is a cross-sectional view taken along line C-C of FIG. 3.
Figure 13:
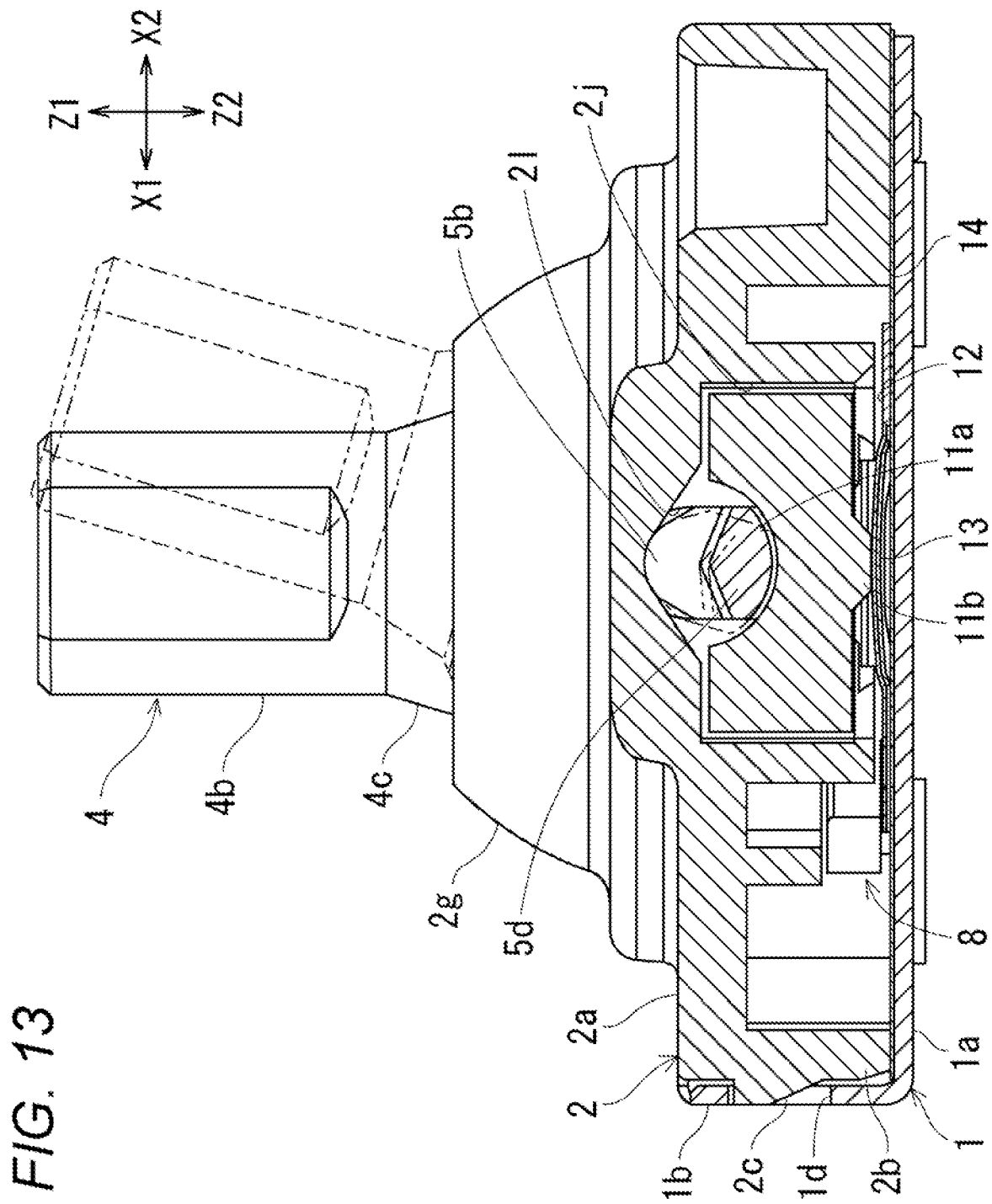
FIG. 13 is a cross-sectional view taken along line D-D of FIG. 2.
Figure 14:
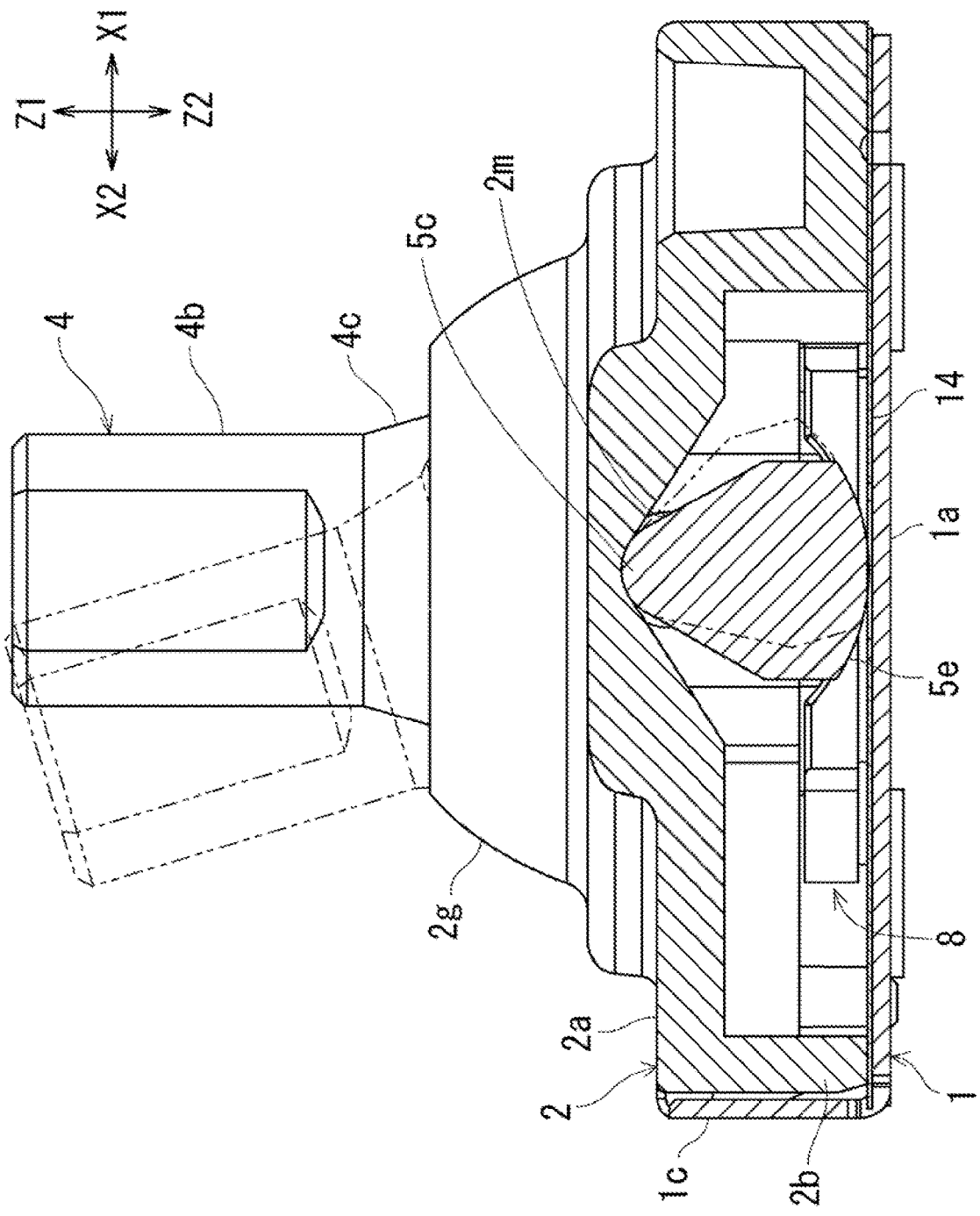
FIG. 14 is a cross-sectional view taken along line E-E of FIG. 2.

Hereinafter, a multi-directional input device according to an embodiment of the present invention (hereinafter, simply referred to as a multi-directional input device) will be described with reference to FIGS. 1 to 14. In the drawing, a direction of an arrow Y1 is a forward direction of the multi-directional input device, a direction of an arrow Y2 is a backward direction of the multi-directional input device, a direction of an arrow X1 is a left direction of the multi-directional input device, a direction of an arrow X2 is a right direction of the multi-directional input device, a direction of an arrow Z1 is an upward direction of the multi-directional input device, and a direction of an arrow Z2 is a downward direction of the multi-directional input device.

The multi-directional input device can be used for various electronic devices such as a game machine controller. As illustrated in FIGS. 1 to 14, the multi-directional input device includes a lower case 1, an upper case 2, two screws 3a and 3b, an operating member 4, a rotating member 5, a magnet holding member 6, a compression coil spring 7, a receiving member 8, a magnet 9, a magnetic sensor 10, a pressing member 11, a cover sheet 12, a metal dome 13, and a substrate 14.

The lower case 1 and the upper case 2 constitute a rectangular box shape case by combining them. The lower case 1 is made of sheet metal. The lower case 1 includes a bottom plate portion 1a and left and right-side plate portions 1b and 1c. The bottom plate portion 1a is formed in a rectangular shape. The left and right-side plate portions 1b and 1c are raised from the left and right sides of the bottom plate portion 1a. The left and right-side plate portions 1b and 1c are provided so as to face each other. The lower case 1 is formed in a concave shape in a front view.

The upper case 2 is a resin molded article. The upper case 2 includes a top plate portion 2a and a peripheral side wall portion (four side wall portions) 2b. The top plate portion 2a is formed in a rectangular shape. The peripheral side wall portion 2b is suspended from four sides of the top plate portion 2a, that is, upper, lower, left, and right sides. The upper case 2 is formed in a rectangular box cap shape that opens downward. The upper case 2 is disposed so as to cover the bottom plate portion 1a of the lower case 1. The upper case 2 is fixed to the lower case 1 in a state of being fitted between the left and right-side plate portions 1b and 1c of the lower case 1.

The upper case 2 is fixed to the lower case 1 by engagement in which engagement claws 2c and 2d protruding from the outer surfaces of the left and right side wall portions of the peripheral side wall portion 2b of the upper case 2 are fitted into engagement holes 1d and 1e bored in the left and right side plate portions 1b and 1c of the lower case 1, and fastening in which two screws (male screws) 3a and 3b are screwed into two female screw portions 2e and 2f provided in the upper case 2 through two screw insertion holes 1f and 1g bored in the lower case 1.

The upper case 2 includes a dome portion 2g, an inner wall portion 2h, a first accommodating portion 2i, a second accommodating portion 2j, a third accommodating portion 2k, a first guide groove portion 2l, a second guide groove portion 2m, and an insertion hole 2n.

The dome portion 2g is formed such that a central portion of the top plate portion 2a bulges upward in a dome shape. The inner wall portion 2h is suspended from the outer peripheral edge portion of the dome portion 2g. The inner wall portion 2h is formed in a cylindrical shape. The first accommodating portion 2i is formed by an inner region of the dome portion 2g and an inner region of the inner wall portion 2h. The rotating member 5 is rotatably accommodated in the first accommodating portion 2i.

The second accommodating portion 2j is formed between the peripheral side wall portion 2b and the inner wall portion 2h. The pressing member 11 is accommodated in the second accommodating portion 2j in a state of being vertically movable. The third accommodating portion 2k is formed between the peripheral side wall portion 2b and the inner wall portion 2h. A pressing fulcrum portion 5e to be described later is rotatably accommodated in the third accommodating portion 2k. The second accommodating portion 2j and the third accommodating portion 2k are formed at two positions directly opposite to each other with the inner wall portion 2h interposed therebetween. In the illustrated example, the second accommodating portion 2j is formed between the front side wall portion of the peripheral side wall portion 2b of the upper case 2 and the inner wall portion 2h, and the third accommodating portion 2k is formed between the rear side wall portion of the peripheral side wall portion 2b and the inner wall portion 2h.

The first guide groove portion 2l is formed in the inner wall portion 2h so as to allow the first accommodating portion 2i and the second accommodating portion 2j to communicate with each other. The first guide groove portion 2l is formed in an inverted U shape so as to open downward. The second guide groove portion 2m is formed in the inner wall portion 2h so as to allow the first accommodating portion 2i and the third accommodating portion 2k to communicate with each other. The second guide groove portion 2m is formed in an inverted U shape so as to open downward. The first guide groove portion 2l and the second guide groove portion 2m are formed in the inner wall portion 2h so as to face each other in the front-rear direction.

The insertion hole 2n is formed at the top portion (central portion) of the dome portion 2g. The insertion hole 2n is formed in a circular shape. The insertion hole 2n opens the first accommodating portion 2i above the upper case 2. The insertion hole 2n protrudes the operating member 4 from the inside of the case, specifically, the first accommodating portion 2i to the outside of the case, specifically, above the upper case 2 so as to be tilted and pushed in operably.

The substrate 14 is a rectangular flexible substrate (FPC) or a printed wiring board (PCB) having no flexibility. In the illustrated example, the substrate 14 is a rectangular flexible substrate (FPC). The substrate 14 is fixed on the bottom plate portion 1a of the lower case 1 in a state where the peripheral edge portion of the substrate 14 is sandwiched between the bottom plate portion 1a of the lower case 1 and the peripheral side wall portion 2b of the upper case 2. The substrate 14 has a belt-shaped tail portion 14a for external connection. The tail portion 14a extends from one side of the substrate 14 and is drawn out from the inside of the case to the outside. In the illustrated example, it extends from the rear side of the substrate 14 and is drawn out from the inside of the case to the outside, specifically, to the rear of the case.

The receiving member 8 is a resin molded article. The receiving member 8 includes a receiving portion 8a, a flange portion 8b, and a recessed portion 8c. The receiving portion 8a is formed in a disk shape. The flange portion 8b is formed in a plate shape so as to protrude from a lower end portion of a peripheral side surface of the receiving portion 8a. The recessed portion 8c is formed in the central portion of the lower surface of the receiving portion 8a.

The receiving member 8 is fixed to a central portion of the substrate 14 facing the first accommodating portion 2i of the upper case 2 with an adhesive. The receiving member 8 forms a support surface 8d parallel to and flat with the substrate 14 for supporting the magnet holding member 6 below the first accommodating portion 2i of the upper case 2 by the upper surface of the receiving portion 8a. The receiving member 8 forms a fourth accommodating portion 8e between the receiving portion 8a and the substrate 14 by the recessed portion 8c on the lower surface of the receiving portion 8a. The magnetic sensor 10 is accommodated in the fourth accommodating portion 8e.

The operating member 4 is a resin molded article. The operating member 4 is a round bar-shaped member. The operating member 4 includes a base portion 4a, a key top mounting portion 4b, a truncated cone portion 4c, a first support shaft 4d, a second support shaft 4e, and a hole portion 4f. The components 4a to 4f of the operating member 4 are provided coaxially with one straight line which is a center line of the operating member 4.

The base portion 4a is formed in a round bar shape. The key top mounting portion 4b is formed in a round bar shape thinner than the base portion 4a. The truncated cone portion 4c is provided between the base portion 4a and the key top mounting portion 4b. The truncated cone portion 4c connects the base portion 4a and the key top mounting portion 4b in a straight line. The first support shaft 4d and the second support shaft 4e protrude from the lower end portion of the outer peripheral surface of the base portion 4a toward two opposite sides. The first support shaft 4d and the second support shaft 4e are provided coaxially with one straight line orthogonal to the center line of the operating member 4.

The hole portion 4f is formed at the center of the operating member 4. The magnet holding member 6 is accommodated in the hole portion 4f so as to be movable along the center line of the operating member 4, and the compression coil spring 7 is accommodated in the hole portion 4f so as to be stretchable along the center line of the operating member 4.

The hole portion 4f includes a large-diameter portion 4g, a small-diameter portion 4h, and a downward stepped surface 4i. The large-diameter portion 4g has a circular cross-sectional shape. The large-diameter portion 4g is provided at the central portion of the base portion 4a. The large-diameter portion 4g is opened downward at the end surface of the base portion 4a (the lower end surface of the operating member 4). The small-diameter portion 4h has a circular cross-sectional shape smaller in diameter than the large-diameter portion 4g. The small-diameter portion 4h is provided at the central portion of the truncated cone portion 4c. The small-diameter portion 4h is opened in the large-diameter portion 4g at the central portion of the top surface of the large-diameter portion 4g. The downward stepped surface 4i is formed of an outer portion of the top surface of the large-diameter portion 4g.

The rotating member 5 is a resin molded article. The rotating member 5 is a circular ring-shaped member. The rotating member 5 includes a through hole 5a, a first support shaft 5b, a second support shaft 5c, a pressing portion 5d, a pressing fulcrum portion 5e, a first recessed portion 5f, and a second recessed portion 5g.

The through hole 5a is a hole that vertically penetrates the rotating member 5 penetrating in the vertical direction. The base portion 4a of the operating member 4 is inserted into the through hole 5a. The first support shaft 5b and the second support shaft 5c protrude from the outer peripheral surface of the rotating member 5 toward two opposite directions. The first support shaft 5b and the second support shaft 5c are provided coaxially with one straight line orthogonal to the center line of the rotating member 5. The pressing portion 5d protrudes downward from the end portion of the first support shaft 5b. The lower end of the pressing portion 5d is formed in an arc shape protruding downward. The pressing fulcrum portion 5e protrudes downward from the end portion of the second support shaft 5c. The lower end of the pressing fulcrum portion 5e is formed in an arc shape protruding downward.

The first recessed portion 5f and the second recessed portion 5g are provided on the inner peripheral surface of the rotating member 5. The first recessed portion 5f and the second recessed portion 5g are provided so as to face each other in a direction orthogonal to the first support shaft 5b and the second support shaft 5c. The first support shaft 4d of the operating member 4 is rotatably inserted into the first recessed portion 5f. The second support shaft 4e of the operating member 4 is rotatably inserted into the second recessed portion 5g. The outer peripheral surface of the rotating member 5 is curved in accordance with a curved surface forming the inner surface of the dome portion 2g of the upper case 2.

The magnet holding member 6 is a resin molded article. The magnet holding member 6 is a round bar-shaped member. The magnet holding member 6 includes a large-diameter portion 6a, a small-diameter portion 6b, a medium-diameter portion 6c, a first upward stepped surface 6d, a second upward stepped surface 6e, a hole portion 6f, a central abutment surface 6g, and a peripheral abutment surface 6h. The components 6a to 6h of the magnet holding member 6 are provided coaxially with one straight line which is the center line of the magnet holding member 6.

The large-diameter portion 6a has a circular cross-sectional shape. The large-diameter portion 6a is inserted into the large-diameter portion 4g of the hole portion 4f of the operating member 4 so as to be movable along the center line of the operating member 4. The small-diameter portion 6b has a circular cross-sectional shape smaller in diameter than the large-diameter portion 6a. The small-diameter portion 6b is inserted into the small-diameter portion 4h of the hole portion 4f of the operating member 4 so as to be movable along the center line of the operating member 4. The medium-diameter portion 6c is provided between the large-diameter shaft portion 6a and the small-diameter shaft portion 6b. The medium-diameter portion 6c connects the large-diameter shaft portion 6a and the small-diameter shaft portion 6b in a straight line. The medium-diameter portion 6c has a circular cross-sectional shape smaller in diameter than the large-diameter portion 6a and larger in diameter than the small-diameter portion 6b. The medium-diameter portion 6c is movably inserted into the large-diameter portion 4g of the hole portion 4f of the operating member 4 along the center line of the operating member 4 so as to form a gap for accommodating the compression coil spring 7 between the medium-diameter portion 6c and the peripheral wall surface of the large-diameter portion 4g of the hole portion 4f of the operating member 4.

The first upward stepped surface 6d is provided between the large-diameter portion 6a and the medium-diameter portion 6c. The first upward stepped surface 6d faces the downward stepped surface 4i of the operating member 4. The second upward stepped surface 6e is provided between the small-diameter shaft portion 6b and the medium-diameter shaft portion 6c. The second upward stepped surface 6e faces the downward stepped surface 4i of the operating member 4.

The hole portion 6f has a circular cross-sectional shape. The hole portion 6f is provided from the central portion of the large-diameter portion 6a to the central portion of the medium-diameter portion 6c. The hole portion 6f is opened downward at the end surface of the large-diameter portion 6a (the lower end surface of the magnet holding member 6). The magnet 9 is fitted and fixed to the hole portion 6f.

The central abutment surface 6g is provided around the opening of the hole portion 6f. The central abutment surface 6g is formed of an end surface (lower end surface of the magnet holding member 6) of the large-diameter portion 6a which is parallel to the substrate 14 and flat. The central abutment surface 6g comes into abutment against the support surface 8d of the receiving member 8 to support the magnet holding member 6 in an upright state on the support surface 8d of the receiving member 8. The peripheral abutment surface 6h is provided around the central abutment surface 6g. The peripheral abutment surface 6h is formed of a curved surface that is rounded at a corner portion between an end surface and a peripheral side surface of the large-diameter portion 6a. The peripheral abutment surface 6h supports the magnet holding member 6 in a tilted state on the support surface 8d of the receiving member 8 by abutting on the support surface 8d of the receiving member 8.

The compression coil spring 7 is made of a metal wire material.

The rotating member 5 extends the first support shaft 5b and the second guide groove portion 2m in the front-rear direction by inserting the first support shaft 5b into the first guide groove portion 2l of the upper case 2 and inserting the second support shaft 5c into the second guide groove portion 2m of the upper case 2, and is accommodated in the first accommodating portion 2i of the upper case 2 so as to be rotatable about the axes of the first support shaft 5b and the second guide groove portion 2m. In this state, in the rotating member 5, the pressing portion 5d is disposed in the second accommodating portion 2j of the upper case 2 so as to be rotatable about the axes of the first support shaft 5b and the second guide groove portion 2m, and the pressing fulcrum portion 5e is disposed in the third accommodating portion 2k of the upper case 2 so as to be rotatable about the axes of the first support shaft 5b and the second guide groove portion 2m.

The operating member 4 extends the first support shaft 4b and the second support shaft 4e in the left-right direction by inserting the base portion 4a into the through hole 5a of the rotating member 5, inserting the first support shaft 4d into the first recessed portion 5f of the rotating member 5, and inserting the second support shaft 4e into the second recessed portion 5g of the rotating member 5, and is supported by the rotating member 5 so as to be rotatable about the axes of the first support shaft 4b and the second support shaft 4e. In this state, in the operating member 4, the truncated cone portion 4c and the key top mounting portion 4b protrude from the first accommodating portion of the upper case 2 to the upper side of the upper case 2 through the insertion hole 2n of the upper case 2.

The magnet holding member 6 is inserted into the hole portion 4f of the operating member 4 so as to be movable along the center line of the operating member 4, and the central abutment surface 6g faces the support surface 8d of the receiving member 8.

The compression coil spring 7 is accommodated in a gap formed between a peripheral wall surface of the large-diameter portion 4g of the hole portion 4f of the operating member 4 and a peripheral wall surface of the medium-diameter portion 6c of the magnet holding member 6. By bringing a lower end portion of the compression coil spring 7 into abutment against the first upward stepped surface 6d of the magnet holding member 6 and bringing an upper end portion of the compression coil spring 7 into abutment against the downward stepped surface 4i of the hole portion 4f of the operating member 4, the compression coil spring 7 biases the operating member 4 and the rotating member 5 upward and biases the magnet holding member 6 downward.

In a state where the operating force is not applied to the operating member 4, the magnet holding member 6 is held in an upright state on the support surface 8d of the receiving member 8 in a state where the central abutment surface 6g is pressed against the support surface 8d of the receiving member 8 by the biasing force of the compression coil spring 7, the operating member 4 and the rotating member 5 are pushed upward until the first support shaft 5b of the rotating member 5 is engaged with the upper end of the first guide groove portion 2l of the upper case 2 and the second support shaft 5c of the rotating member 5 is engaged with the upper end of the second guide groove portion 2m of the upper case 2, and the operating member 4 is held in an upright state on the support surface 8d of the receiving member 8 through the magnet holding member 6. With this state as a neutral state, the operating member 4 can be tilted in any direction of the periphery and can be pushed in downward. The rotating member 5 can be rotated in conjunction with the tilting operation of the operating member 4 and can be tilted so as to push down the pressing portion 5d with the pressing fulcrum portion 5e as a fulcrum in conjunction with the push-in operation of the operating member 4. The magnet holding member 6 enters the hole portion 4f of the operating member 4 along with the push-in operation of the operating member 4, so that the magnet holding member 6 can be tilted only in conjunction with the tilting operation of the operating member 4 without interlocking by absorbing the push-in operation of the operating member 4.

The magnet 9 and the magnetic sensor 10 function as a tilt operation detector that detects a tilt operation of the operating member 4, and the metal dome 13 functions as a push-in operation detector of the operating member 4. Specifically, the metal dome 13 functions as a push switch, and opens and closes a fixed contact (not illustrated) formed on the substrate 14.

The magnet 9 is a columnar permanent magnet. The magnet 9 is fitted and fixed to the hole portion 6f of the magnet holding member 6. The magnet 9 is fixed by an adhesive.

The magnetic sensor 10 is disposed at a position facing the magnet 9 and detects movement of the magnet 9 (change in magnetic field of the magnet 9). In the illustrated example, the magnetic sensor 10 is surface mounted on a central portion of the substrate 14 so as to be disposed at a position facing the magnet 9. The magnetic sensor 10 is accommodated in the recessed portion 8c (fourth accommodating portion 8e) of the receiving member 8.

As the magnetic sensor 10, one having a pair of magnetoresistive elements or one having a Hall element is used. In the illustrated example, the magnetic sensor 10 having a pair of magnetoresistive elements is used, and the movement of the magnet 9 is detected using the magnetoresistive effect of the magnetoresistive elements. When the operating member 4 is tilted, the magnet holding member 6 is tilted in conjunction with the tilting of the operating member 4, and the magnet 9 is displaced along with the tilting of the magnet holding member 6. The magnetic field changes according to the displacement of the magnet 9, and the resistance value of the magnetoresistive element of the magnetic sensor 10 changes. When a voltage is applied to one end of the magnetic sensor 10 and the other end is grounded, a voltage proportional to the displacement of the magnet 9 is output from the connection point of the pair of magnetoresistive elements. As a result, a voltage proportional to the tilting direction and the tilt amount of the operating member 4 can be output.

The cover sheet 12 is a single-sided adhesive sheet. The metal dome 13 is a movable contact formed of an upward convex dome-shaped metal plate. An upper surface of the metal dome 13 is attached to a lower surface of the cover sheet 12 to form a metal dome sheet. A central fixed contact (not illustrated) and an outer fixed contact (not illustrated) are formed on the substrate 14. The central fixed contact is formed in a circular shape and is disposed below the second accommodating portion 2j of the upper case 2. The outer fixed contact is formed in a C shape and is disposed so as to surround the central fixed contact at an interval.

The metal dome sheet is attached to the substrate 14 below the second accommodating portion 2j of the upper case 2, the metal dome 13 is fixed on the outer fixed contact in a state of straddling the central fixed contact, and the top portion of the metal dome 13 is in a state of being separated from and facing the central fixed contact immediately below the metal dome 13 with a gap.

The pressing member 11 is a resin molded article. The pressing member 11 is a rectangular parallelepiped member. The pressing member 11 is accommodated in the second accommodating portion 2j of the upper case 2 in a state of being vertically movable. The pressing member 11 has a recessed portion 11a and a protruding portion 11b. The recessed portion 11a is formed on the upper surface of the pressing member 11. The recessed portion 11a recesses the upper surface of the pressing member 11 in an arc shape. The pressing portion 5d of the rotating member 5 faces the recessed portion 11a. The protruding portion 11b is formed on the lower surface of the pressing member 11. The protruding portion 11b is formed in a truncated cone shape whose outer diameter gradually decreases downward. The lower end surface of the protruding portion 11b is in abutment against the upper surface of the cover sheet 12 so as to press the top portion of the metal dome 13.

When the operating member 4 is pushed in, the rotating member 5 moves downward in conjunction with the pushing in of the operating member 4, and along with the downward movement of the rotating member 5, the lower end surface of the pressing fulcrum portion 5 comes into abutment against the bottom plate portion 1a of the lower case 1, and the rotating member 5 tilts so as to push down the pressing portion 5d with the pressing fulcrum portion 5e as a fulcrum. Along with the tilting of the rotating member 5, the pressing portion 5d comes into abutment against the recessed portion 11a of the pressing member 11 to push down the pressing member 11. Along with the pushing down of the pressing member 11, the top portion of the metal dome 13 is pushed down by the protruding portion 11b of the pressing member 11, the top portion of the metal dome 13 is elastically deformed in a downward convex shape with a click feeling, the top portion of the metal dome 13 comes into contact with the central fixed contact of the substrate 14, the central fixed contact and the outer fixed contact of the substrate 14 are electrically conductively connected to each other through the metal dome 13, and the switch is turned on. Thus, the push-in operation of the operating member 4 can be detected.

When the operating member 4 is pushed in, as described above, the magnet holding member 6 enters the hole portion 4f of the operating member 4 along with the push-in operation of the operating member 4, so that the magnet holding member 6 can be tilted only in conjunction with the tilting operation of the operating member 4 without interlocking by absorbing the push-in operation of the operating member 4. That is, since the magnet 9 is held by the magnet holding member 6 that is relatively movable with respect to the operating member 4 only in the direction along the push-in direction and is interlocked only in the tilting direction, the magnet 9 does not move downward and the magnetic field does not change when the operating member 4 is pushed in. Therefore, the detection accuracy of the tilting operation of the operating member 4 is not adversely affected, and the detection accuracy of the tilting operation of the operating member 4 can be improved.

As described above, the multi-directional input device includes the operating member 4 that can be tilted and pushed in, the metal dome 13 that functions as a push-in operation detector that detects a push-in operation of the operating member 4, the magnet holding member 6 that is relatively movable with respect to the operating member 4 only in a direction along the push-in direction and is interlocked only in the tilting direction, the magnet 9 held by the magnet holding member 6, and the magnetic sensor 10 that is disposed at a position facing the magnet 9 and detects the movement of the magnet 9. As described above, the detection accuracy of the tilting operation of the operating member 4 can be improved.

Hereinafter, a multi-directional input device (hereinafter, simply referred to as another multi-directional input device) according to another embodiment of the present invention will be described with reference to the drawings.

Figure 15:
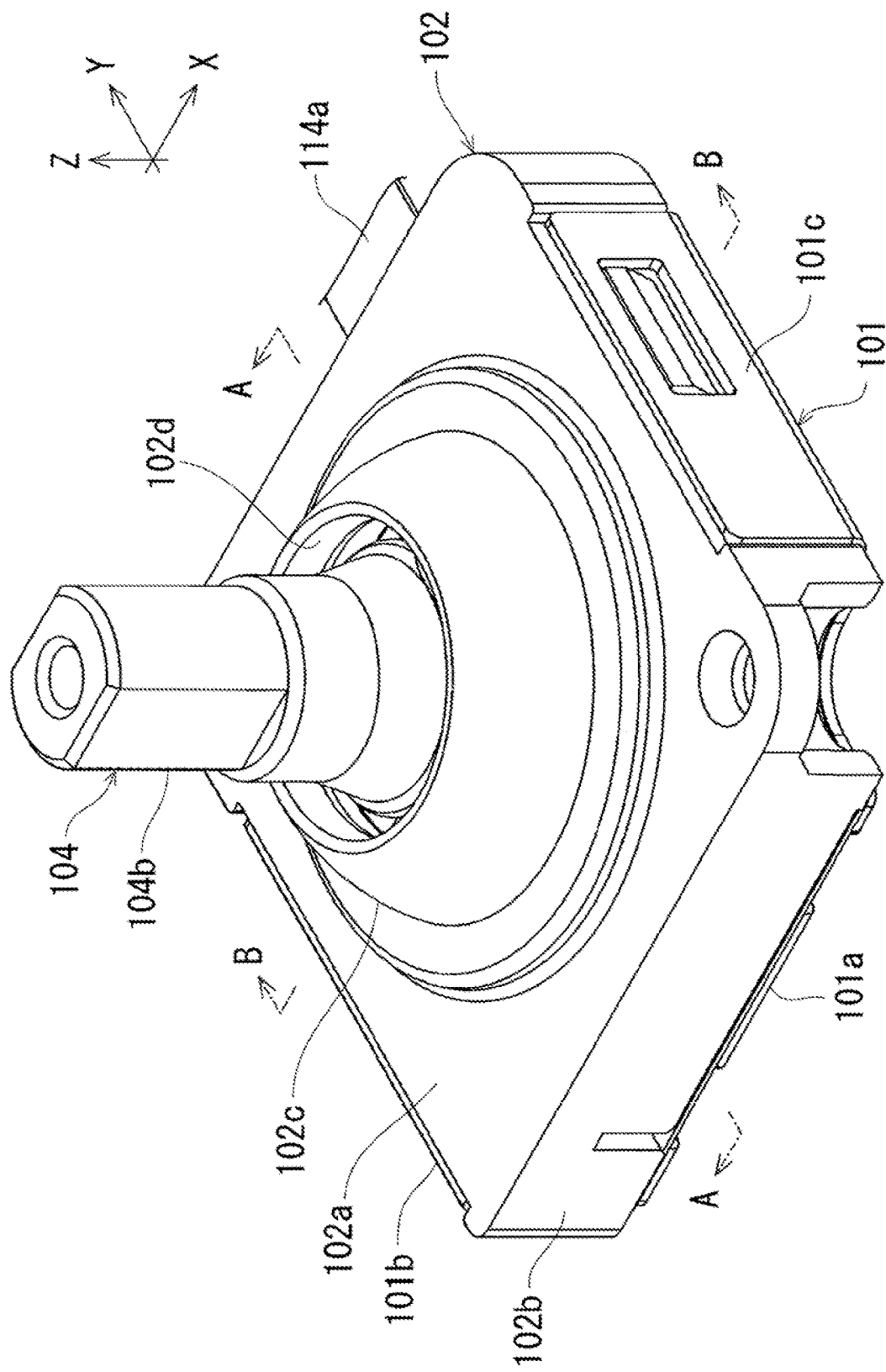
FIG. 15 is a perspective view illustrating a multi-directional input device according to another embodiment of the present invention in an initial state in which an operating force is not applied to an operating member.
Figure 16:
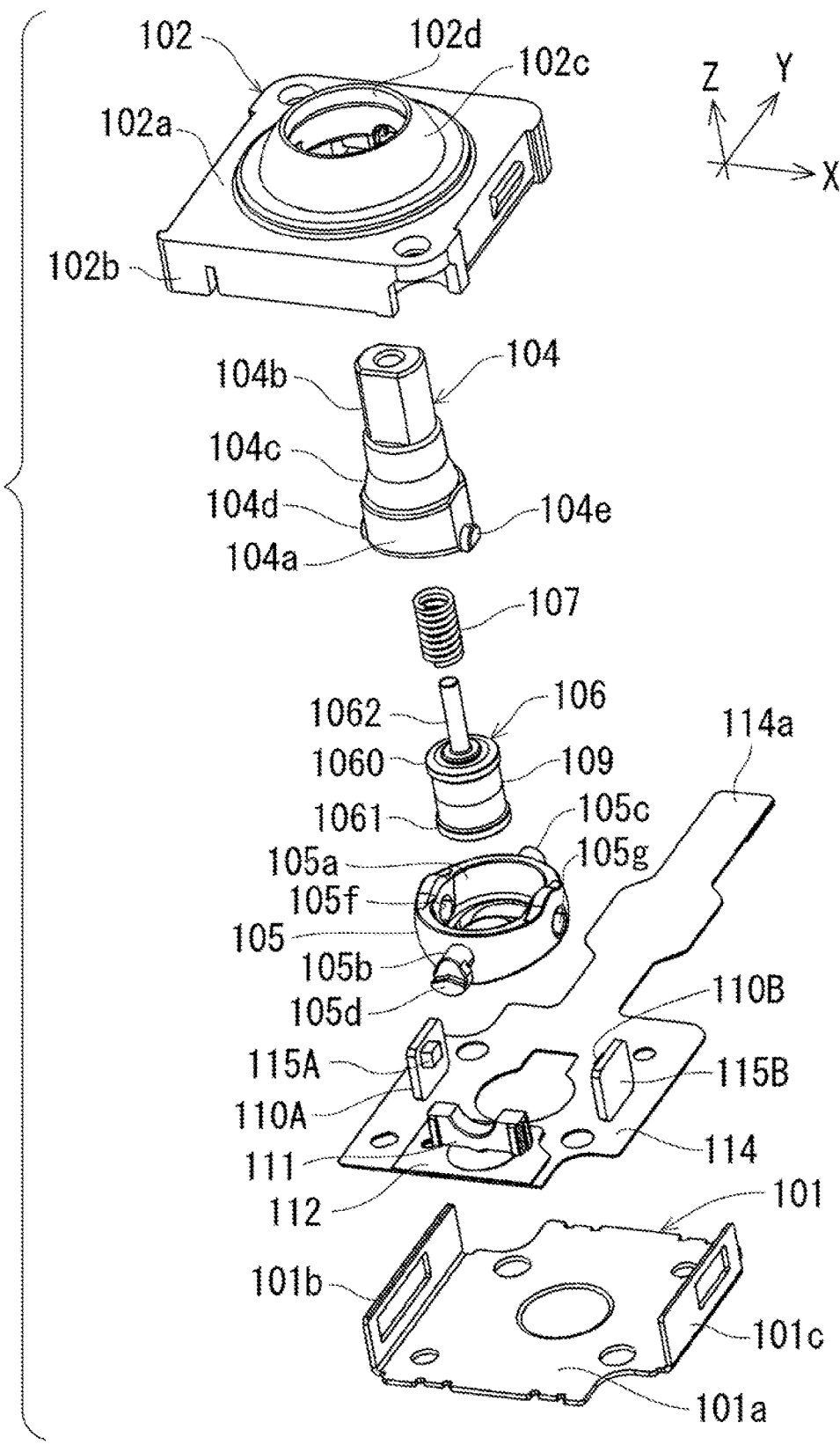
FIG. 16 is an exploded front perspective view of the multi-directional input device in FIG. 15.
Figure 17:
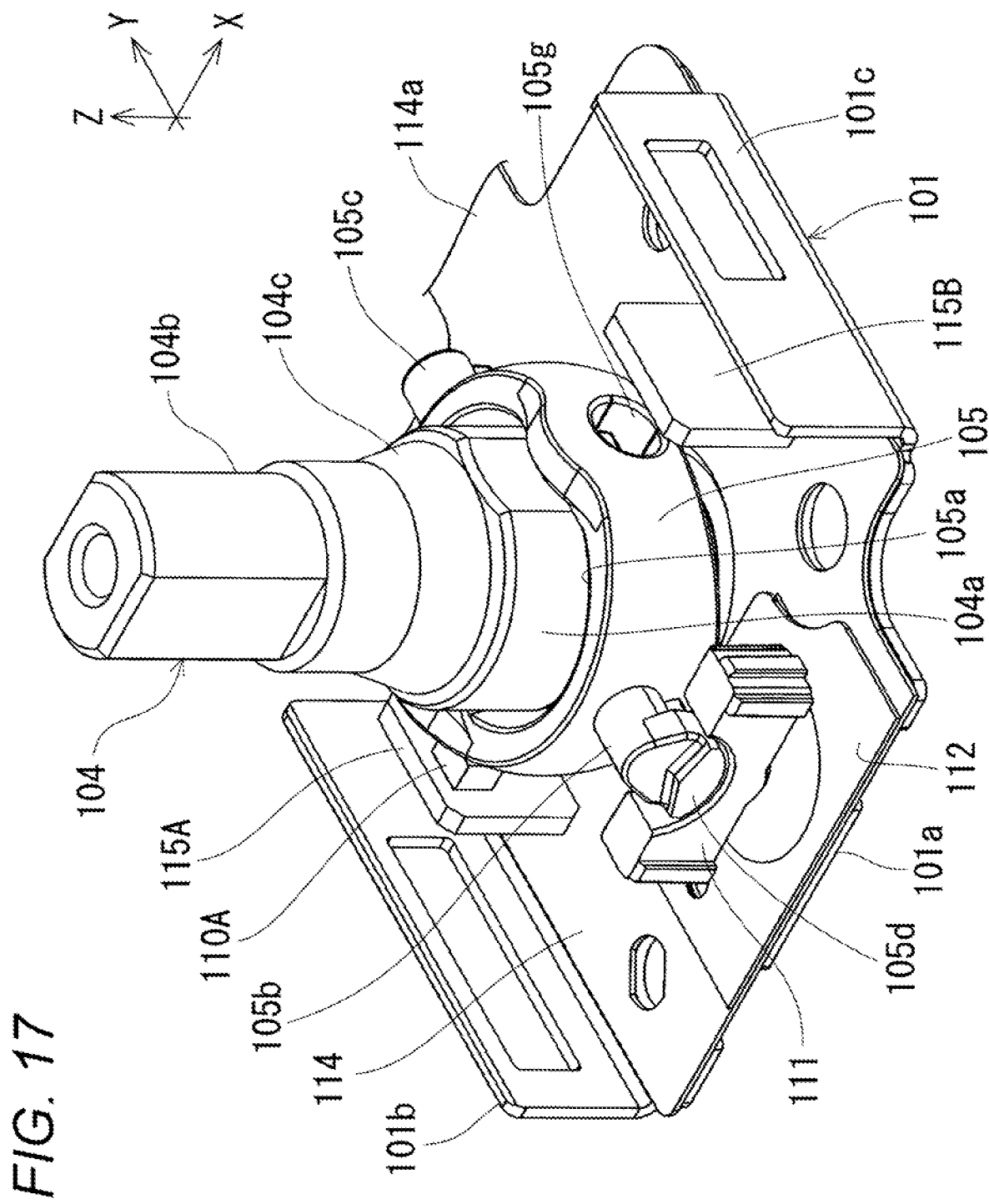
FIG. 17 is a front perspective view of the multi-directional input device in FIG. 15 in a state where an upper cover is transparent.
Figure 18:
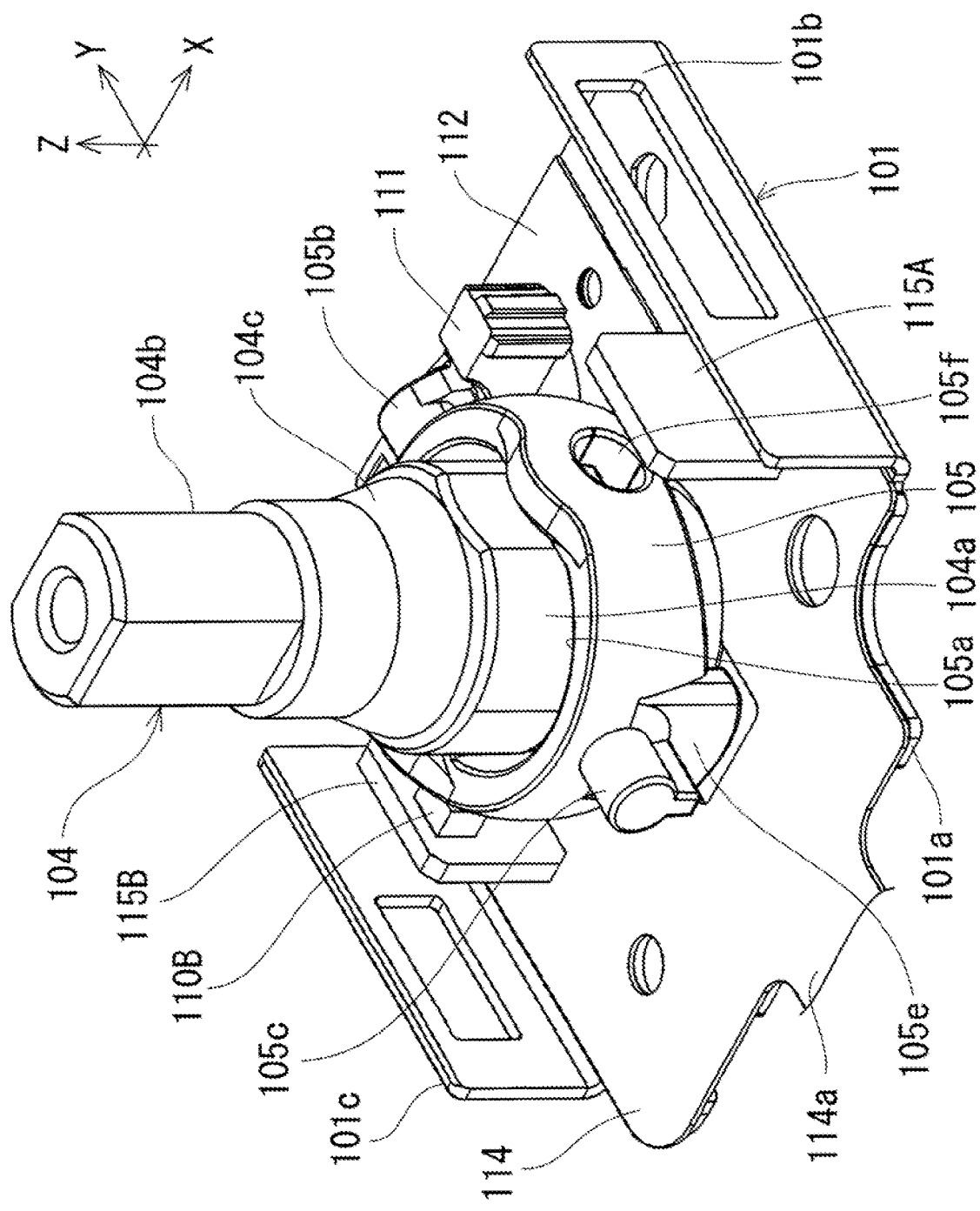
FIG. 18 is a rear perspective view of the multi-directional input device in FIG. 15 in a state where the upper cover is transparent.
Figure 19:
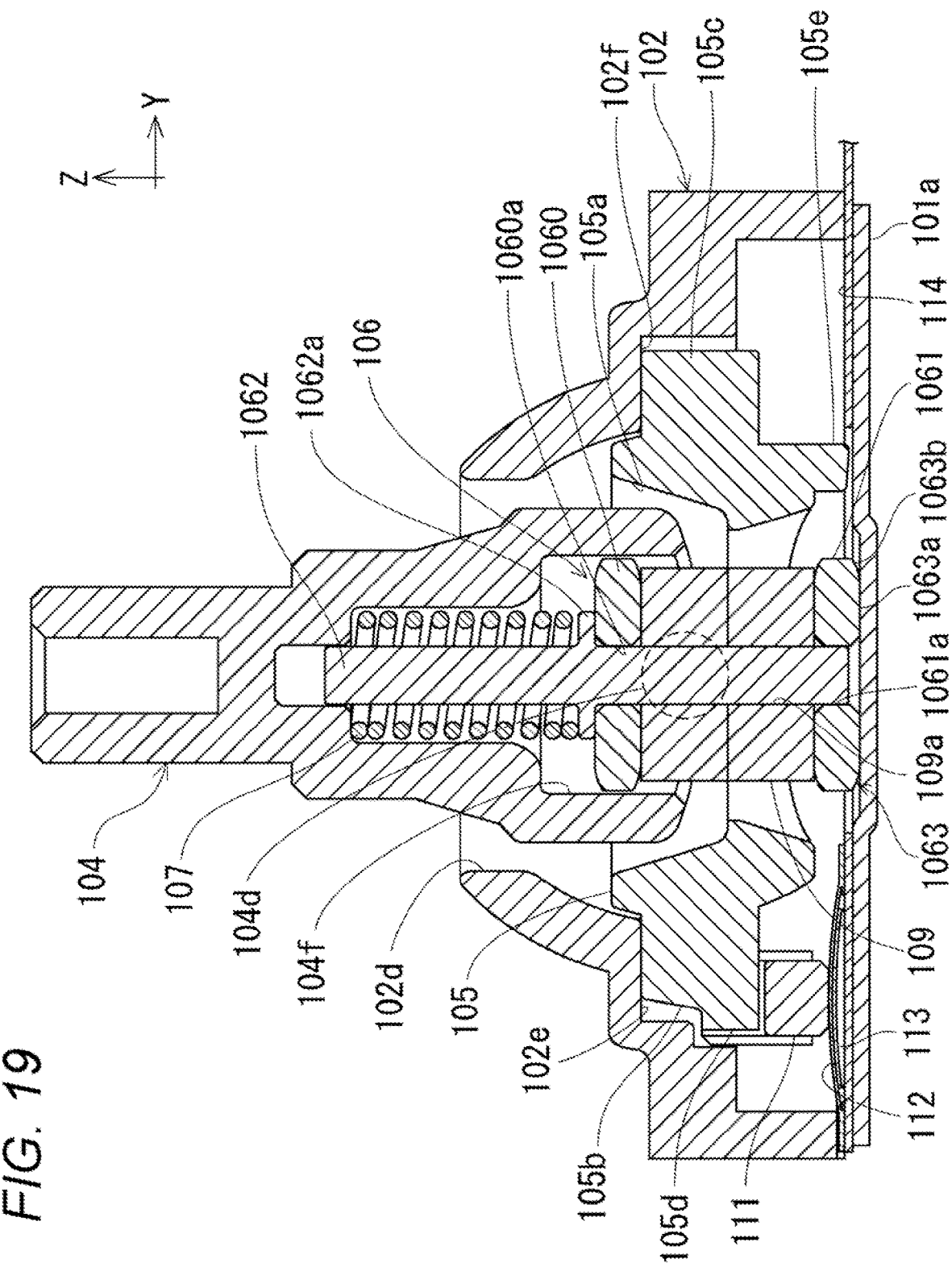
FIG. 19 is a cross-sectional view taken along line A-A of FIG. 15.
Figure 20:
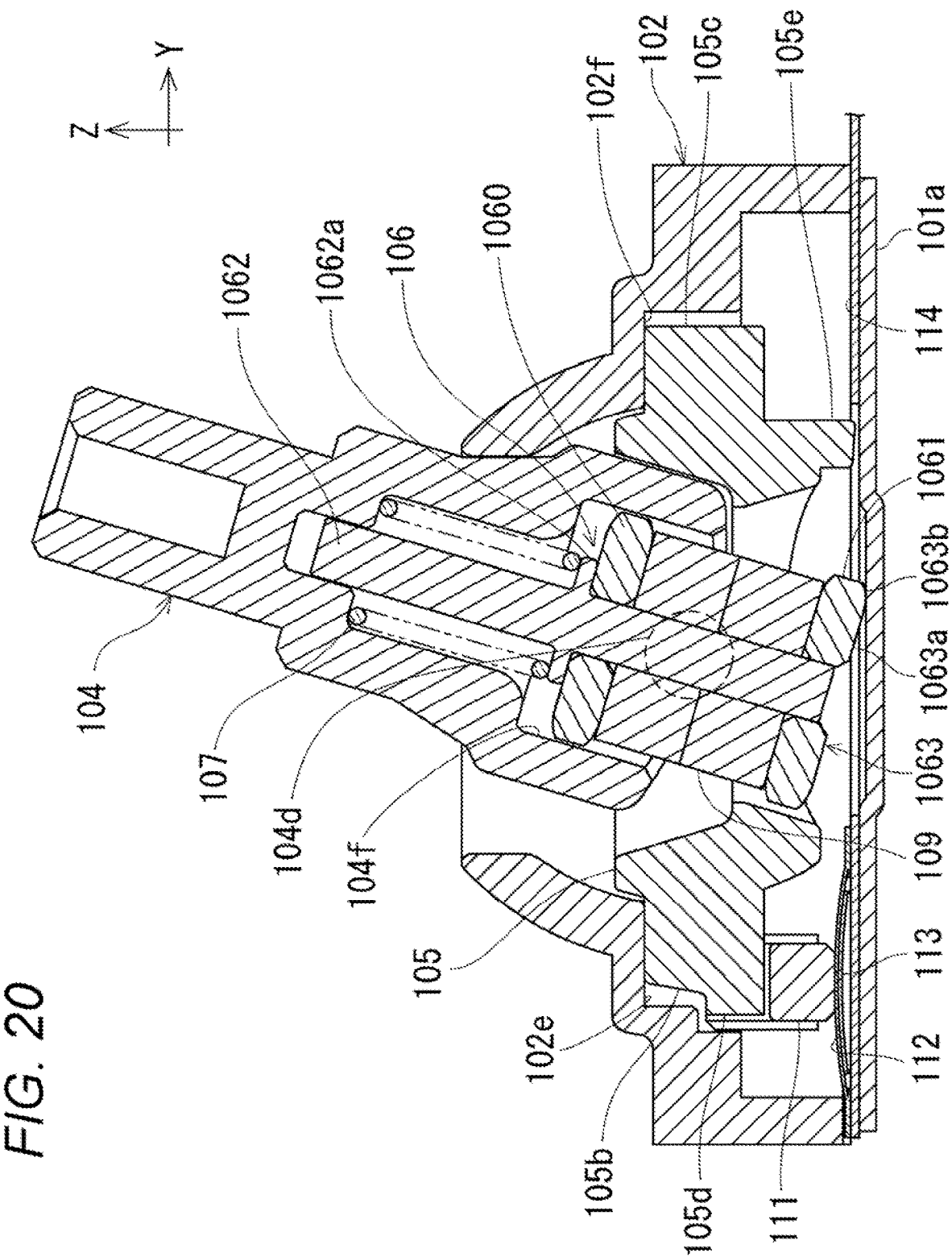
FIG. 20 is a cross-sectional view taken along line A-A of FIG. 15 in a state where the operating member is tilted in a YZ plane direction.
Figure 21:
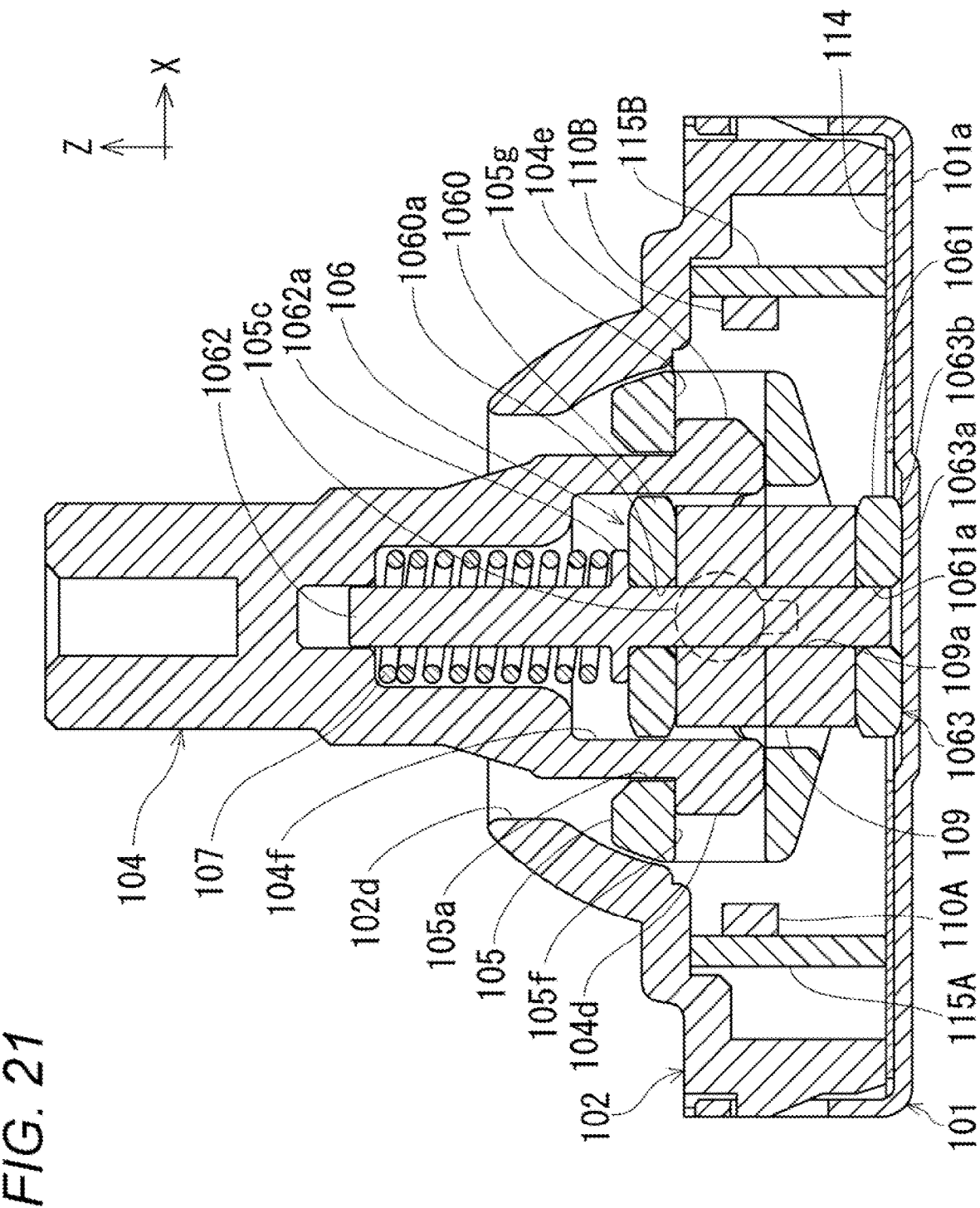
FIG. 21 is a cross-sectional view taken along line B-B of FIG. 15.
Figure 22:
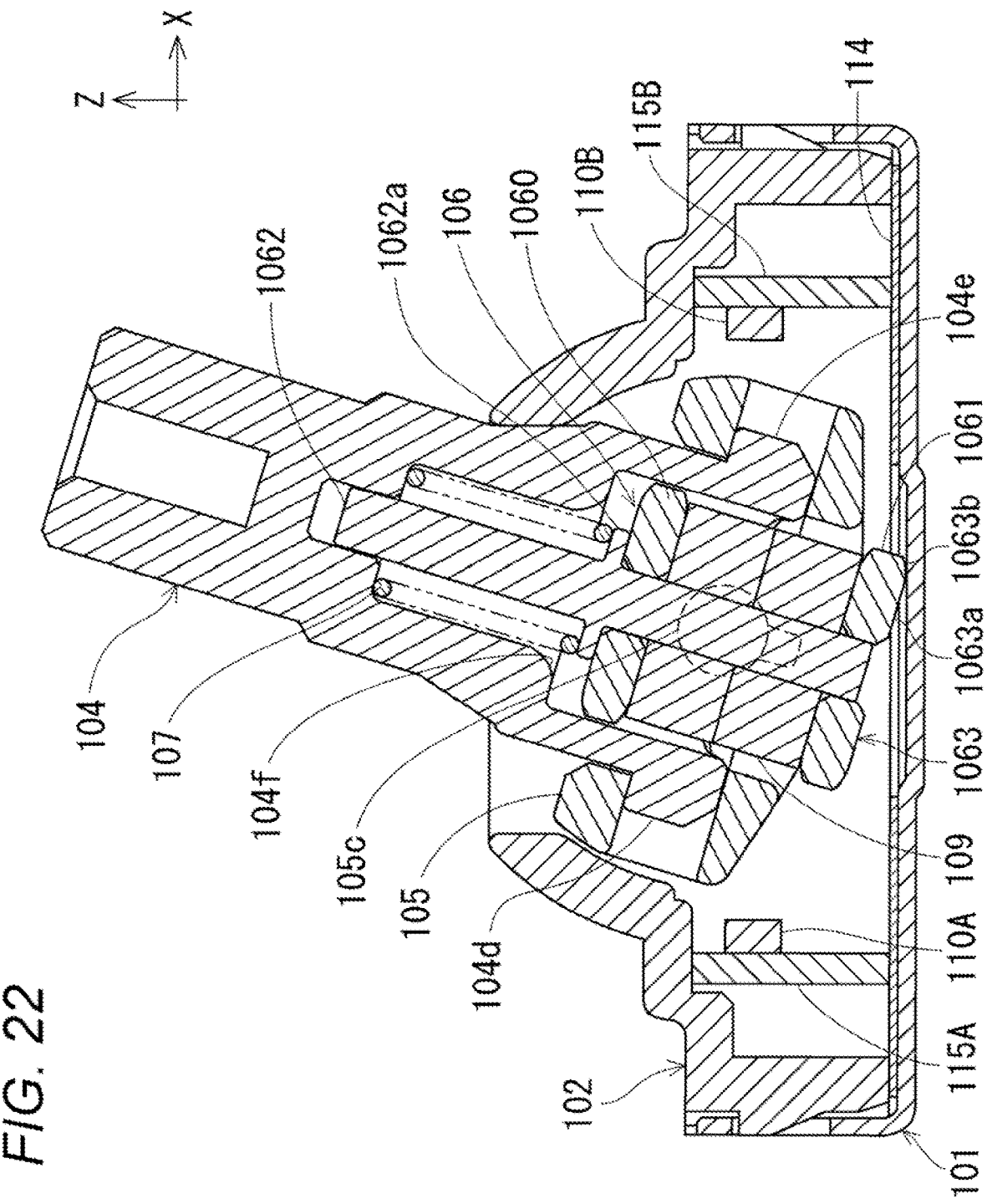
FIG. 22 is a cross-sectional view taken along line B-B of FIG. 15 in a state where the operating member is tilted in an XZ plane direction.

FIG. 15 illustrates a relationship between another multi-directional input device and a three-dimensional space formed by three orthogonal axes (X axis, Y axis, Z axis). A left-right direction of another multi-directional input device is an X-axis direction, a front-back direction of another multi-directional input device orthogonal to the X-axis is a Y-axis direction, and a vertical direction of another multi-directional input device orthogonal to each of the X-axis and the Y-axis is a Z-axis direction.

A direction toward the right side of another multi-directional input device is a positive direction (+X-axis direction) of the X axis, a direction toward the front side of another multi-directional input device is a positive direction (+Y-axis direction) of the Y axis, and a direction toward the upper side of another multi-directional input device is a positive direction (+Z-axis direction) of the Z axis.

A two-dimensional plane formed between the X axis and the Y axis is an XY plane, a two-dimensional plane formed between the X axis and the Z axis is an XZ plane, and a two-dimensional plane formed between the Y axis and the Z axis is a YZ plane.

Another multi-directional input device can be used for various electronic devices such as a game machine controller.

As illustrated in FIGS. 15 to 22, another multi-directional input device includes a lower case 101, an upper case 102, an operating member 104, a rotating member 105, a magnet holding portion 106, a compression coil spring 107, a magnet 109, a first magnetic sensor 110A, a second magnetic sensor 110B, a pusher 111, a cover sheet 112, a metal dome 113, a main substrate 114, a first sub-substrate 115A, and a second sub-substrate 115B.

The lower case 101 and the upper case 102 are combined to form a rectangular box shape case. Various components 104, 105, 106, 107, 109, 110A, 110B, 111, 112, 113, 114, 115A, and 115B of another multi-directional input device are accommodated in the case.

The lower case 101 is made of sheet metal. The lower case 101 includes a bottom plate portion 101a and left and right-side plate portions 101b and 101c. The bottom plate portion 101a is formed in a rectangular shape. The left and right-side plate portions 101b and 101c are raised from left and right sides of the bottom plate portion 101a.

The upper case 102 is a resin molded article. The upper case 102 includes a top plate portion 102a and a peripheral side wall portion (four side wall portions) 102b. The top plate portion 102a is formed in a rectangular shape. The peripheral side wall portion 102b is suspended from four sides of the top plate portion 2a, that is, front, rear, left, and right sides. The upper case 102 is formed in a bottomless rectangular box cap shape that opens downward.

The upper case 102 is disposed on the bottom plate portion 101a so as to cover the bottom plate portion 101a from above. The upper case 102 is fixed to the bottom plate portion 101a by two screws (not illustrated) in a state of being fitted between the left and right-side plate portions 101b and 101c. The upper case 102 functions as a case main body of the case, and the lower case 101 functions as a bottom lid of the case.

The upper case 102 includes a dome portion 102c and an insertion hole 102d. The dome portion 102c is formed such that a central portion of the top plate portion 102a bulges upward in a dome shape. The inner surface of the dome portion 102c is formed as a ball-like curved surface. The insertion hole 102d is formed at the top portion (central portion) of the dome portion 102c. The insertion hole 102d is formed in a circular shape. The insertion hole 102d opens the inside of the upper case 102 upward.

The main substrate 114 is a flexible substrate (FPC). The main substrate 114 is fixed on the bottom plate portion 101a in a state where the peripheral edge portion of the main substrate 114 is sandwiched between the bottom plate portion 101a and the peripheral side wall portion 102b. The main substrate 114 has a belt-shaped tail portion 114a for an external connection portion. The tail portion 114a extends in one direction (rearward) from the rectangular main body portion of the main substrate 114 and is drawn out from the inside of the upper case 102 to the outside.

The operating member 104 is a resin molded article. The operating member 104 is a round bar-shaped member. The operating member 104 includes a base portion 104a, a key top mounting portion 104b, a truncated cone portion 104c, a pair of left and right second shaft portions 104d and 104e, and a magnet accommodating hole 104f. Among the components of the operating member 104, the components 104a to 104f excluding the second shaft portions 104d and 104e are provided coaxially with one straight line extending in the Z-axis direction which is the center line of the operating member 104.

The base portion 104a is provided at a lower end portion of the operating member 104. The base portion 104a is formed in a round bar shape. The key top mounting portion 104b is provided at the upper end portion of the operating member 104. The key top mounting portion 104b is formed in a round bar shape thinner than the base portion 104a. The truncated cone portion 104c is provided between the base portion 104a and the key top mounting portion 104b and connects them in a straight line in the Z-axis direction.

The left second shaft portion 104d and the right second shaft portion 104e protrude from the lower end portion of the outer peripheral surface of the base portion 104a toward two opposite directions. The left second shaft portion 104d and the right second shaft portion 104e are provided coaxially with one straight line extending in the X-axis direction orthogonal to the center line of the operating member 4.

The magnet accommodating hole 104f is formed from the central portion of the end surface of the base portion 104a (the lower end surface of the operating member 4) to the central portion of the truncated cone portion 104c. The magnet accommodating hole 104f is a stepped hole having a circular cross section whose diameter is reduced in two stages from bottom to top. The magnet accommodating hole 104f is opened downward at the end surface of the base portion 104a (the lower end surface of the operating member 4).

The rotating member 105 is a resin molded article. The rotating member 105 is a circular ring-shaped member. The rotating member 105 includes a through hole 105a, a pair of front and rear first shaft portions 105b and 105c, a pressing portion 105d, a pressing fulcrum portion 105e, and a pair of left and right bearing portions 105f and 105g.

The through hole 105a is a hole that penetrates the rotating member 105 in the Z-axis direction. The front first shaft portion 105b and the rear first shaft portion 105c protrude from the outer peripheral surface of the rotating member 105 toward two opposite sides. The front first shaft portion 105b and the rear first shaft portion 105c are provided coaxially with one straight line extending in the Y-axis direction orthogonal to the center line of the rotating member 105.

The pressing portion 105d protrudes downward from the end portion of the front first shaft portion 105b. The lower end of the pressing portion 105d is formed in an arc shape protruding downward. The pressing fulcrum portion 105e protrudes downward from the base portion of the rear second shaft portion 105c. The lower end of the pressing fulcrum portion 105e is formed in an arc shape protruding downward.

The left bearing portion 105f and the right bearing portion 105g are circular through holes penetrating the inner and outer peripheral surfaces of the rotating member 105. The left bearing portion 105f and the right bearing portion 105g are provided coaxially with one straight line extending in the X-axis direction so as to face each other in the X-axis direction. The outer peripheral surface of the rotating member 105 is formed in a curved surface in a spherical segment shape in accordance with the inner surface of the dome portion 102c.

Figure 23:
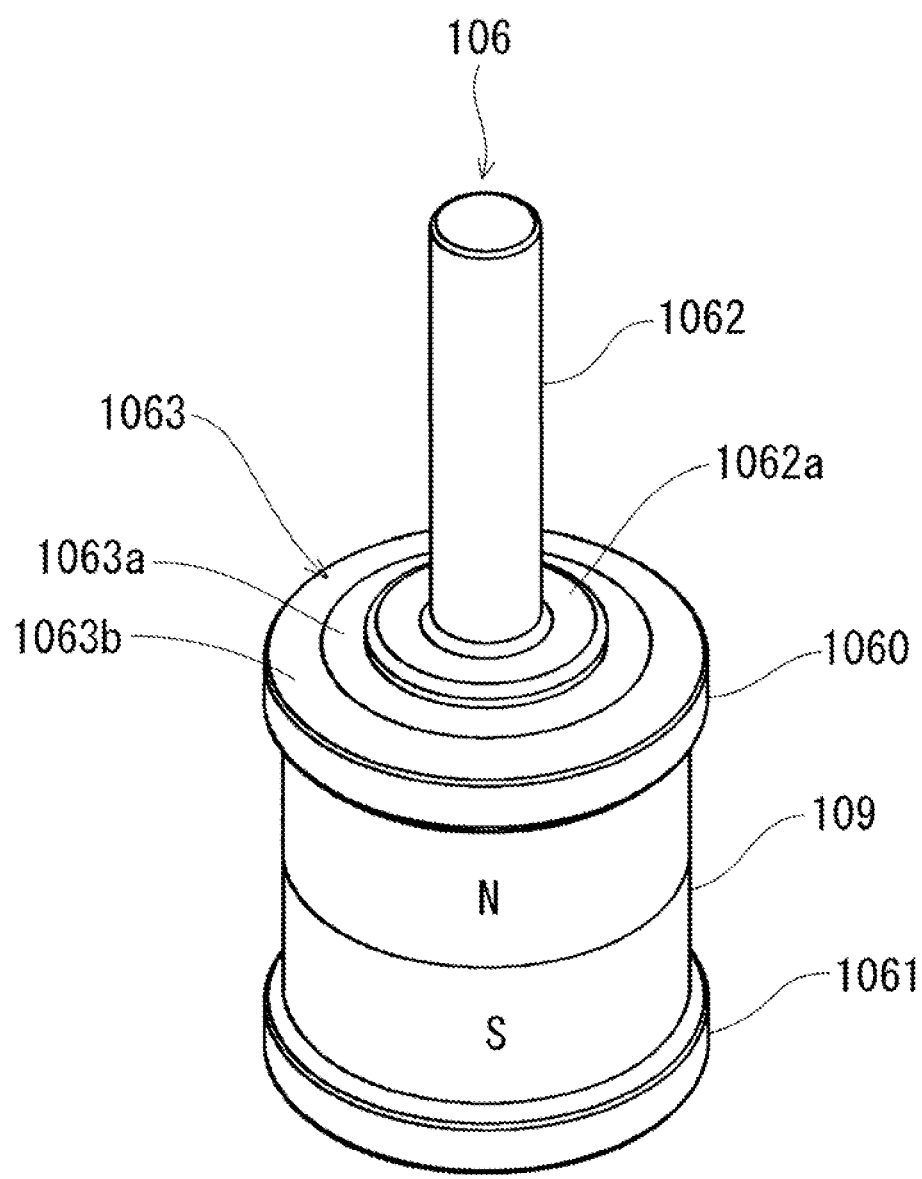
FIG. 23 is a perspective view of a magnet holding portion.
Figure 24:
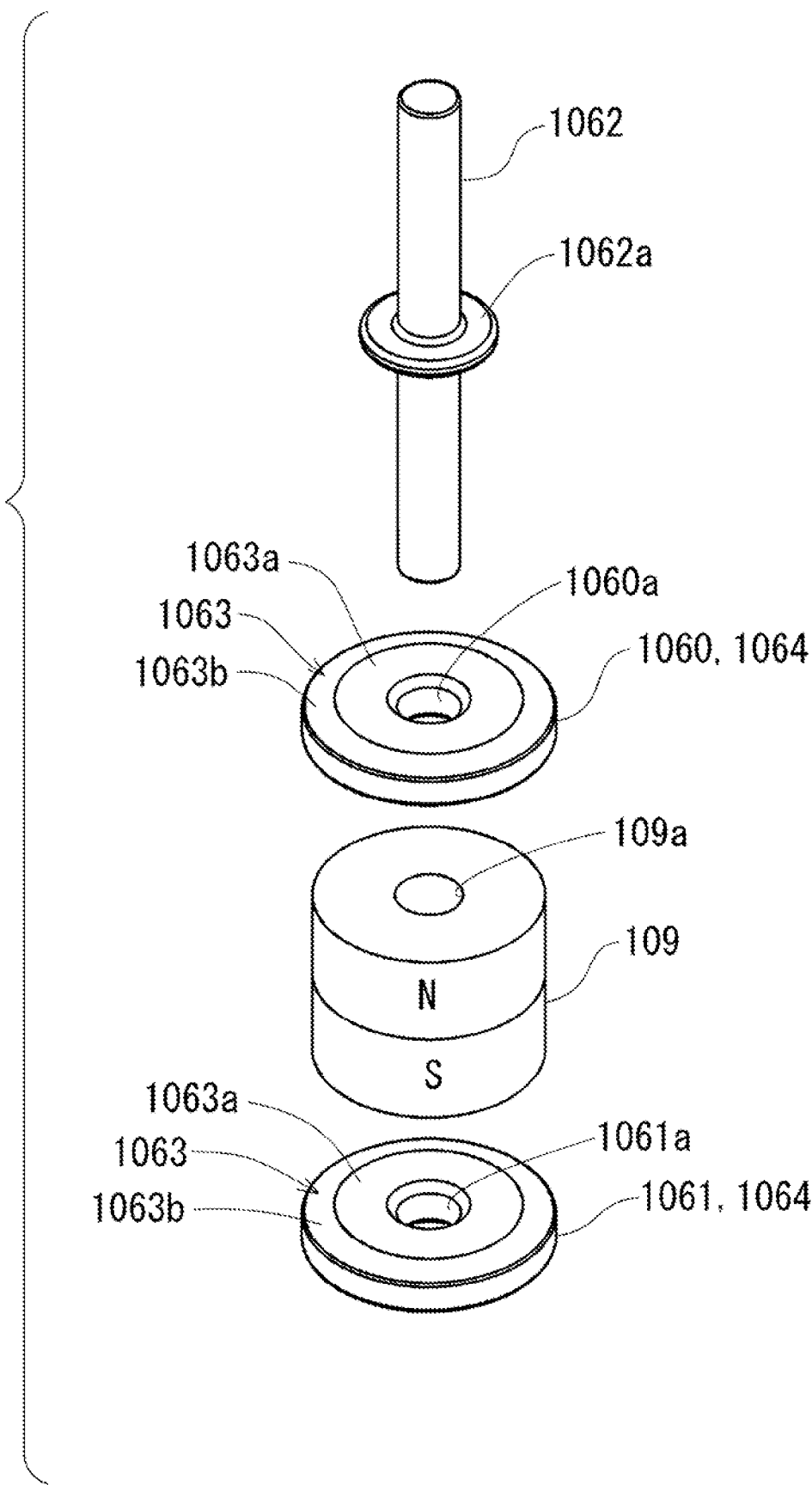
FIG. 24 is an exploded perspective view of the magnet holding portion.
Figure 25A:
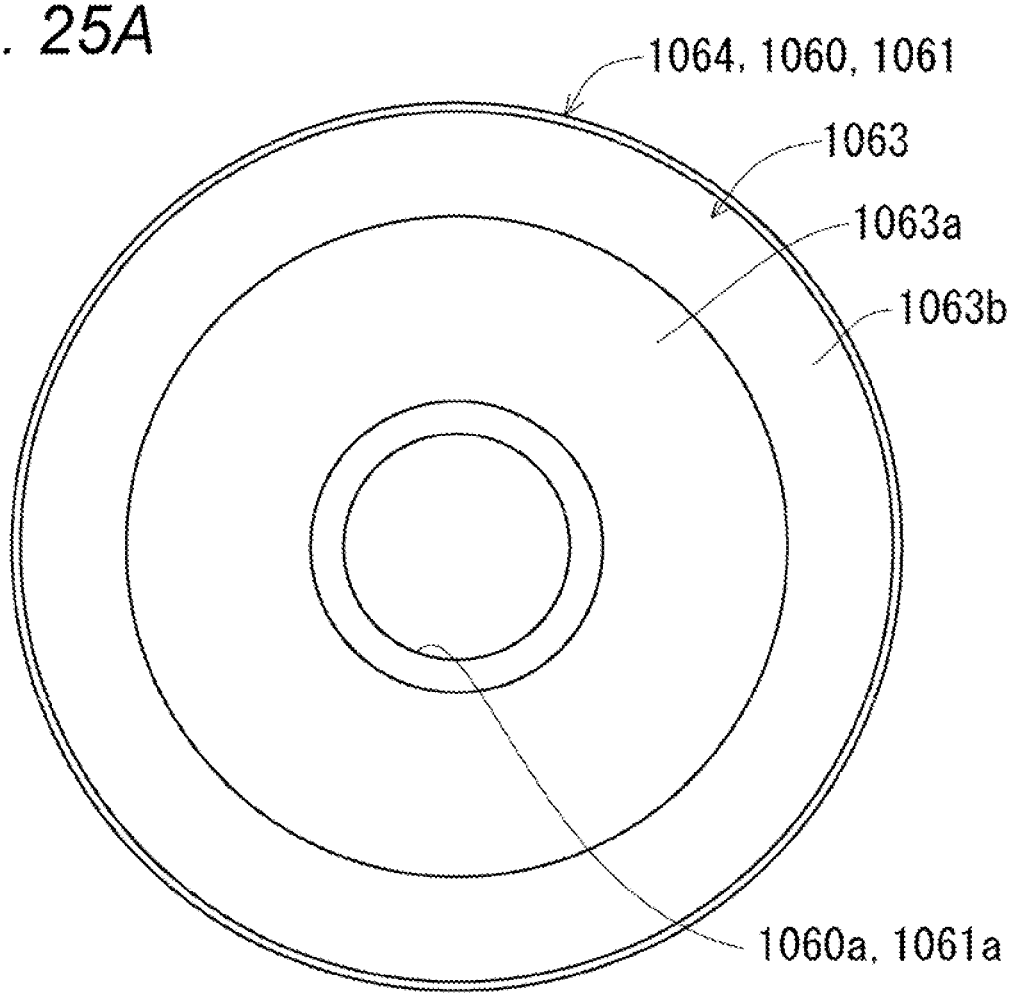
Figure 25B:
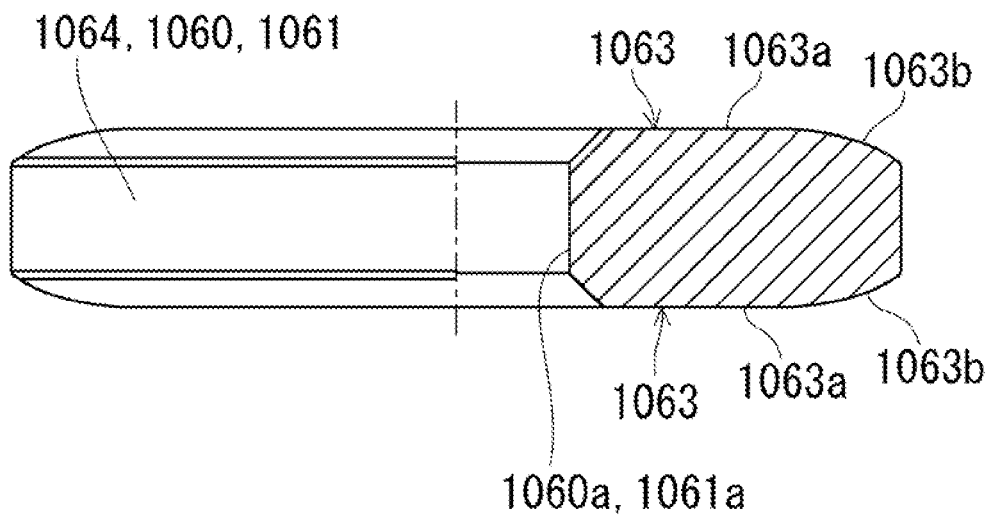

As also illustrated in FIGS. 23 and 24, the magnet 109 is a cylindrical permanent magnet magnetized (polarized) to the NS2 pole in the axial direction with the direction along the protruding direction of the operating member 104 as the axial direction. The magnet 109 is a cylindrical permanent magnet whose axial direction is the Z-axis direction. The magnet 109 has a circular through hole 109a at the central portion. The magnet 109 is magnetized to the NS2 pole in the axial direction so that both end surfaces (the upper end surface and the lower end surface) have different poles. The magnet 109 has an upper end surface as an N pole and a lower end surface as an S pole.

As also illustrated in FIGS. 23 to 24, the magnet holding portion 106 includes a pair of upper and lower disk portions 1060 and 1061 disposed at both ends of the magnet 109, and a pin 1062. In the same manner as the magnet 109, the upper disk portion 1060 and the lower disk portion 1061 have circular through holes 1060a and 1061a, respectively, at the central portion.

The pin 1062 is a round pin having a circular cross section fitted into the through holes 1060a, 1061a, and 109a. The pin 1062 is a pin made of metal not attached to the magnet 109 or a pin made of metal attached to the magnet 109, and is a pin subjected to surface processing such as plating so as not to be attached to the magnet 109.

The magnet holding portion 106 is configured to hold the magnet 109 between the upper disk portion 1060 and the lower disk portion 1061 in a state where the pin 1062 is inserted into the through holes 1060a, 1061a, and 109a of the upper disk portion 1060, the lower disk portion 1061, and the magnet 109. The upper disk portion 1060, the lower disk portion 1061, and the magnet 109 are provided coaxially with one straight line extending in the Z-axis direction which is the center line of the pin 1062.

The magnet holding portion 106 has an abutment surface 1063 in a spherical segment shape against the bottom plate portion 101a on the lower surface (the lower end surface of the magnet holding portion 106) of the lower disk portion 1061 facing the bottom plate portion 101a. The abutment surface 1063 includes a circular flat surface 1063a formed of a small diameter side end surface of a spherical segment and a ball-like curved surface 1063b formed of a side surface of the spherical segment.

The pin 1062 has a disk-shaped flange portion 1062a at an axially intermediate portion of the pin 1062. In the pin 1062, in a state where the flange portion 1062a is in abutment against the upper surface of the upper disk portion 1060, the lower pin 1062 is inserted from the flange portion 1062a into the through holes 1060a, 1061a, and 109a of the upper disk portion 1060, the lower disk portion 1061, and the magnet 109, the lower end of the pin 1062 is positioned inside the through hole 1061a of the lower disk portion 1061, the pin 1062 does not protrude from the lower surface of the lower disk portion 1061, and the upper pin 1062 protrudes upward from the upper surface of the upper disk portion 1060 from the flange portion 1062a.

The magnet holding portion 106 includes two disk-shaped components 1064 formed of a magnetic material attached to the magnet 109, and is configured such that the two disk-shaped components 1064 are an upper disk portion 1060 (one disk-shaped component 1064) and a lower disk portion 1061 (the other disk-shaped component 1064), abutment surfaces 1063 are provided on both surfaces of the upper disk portion 1060 and the lower disk portion 1061, and the abutment surface 1063 in a spherical segment shape provided on the lower surface of the lower disk portion 1061 (the lower surface of the magnet holding portion 106) is an abutment surface 1063 with respect to the bottom plate portion 101a.

The upper disk portion 1060 and the lower disk portion 1061 can be fixed to the pin 1062 by using an adhesive or by press-fitting the pin 1062 into the through holes 1060a and 1061a. Such fixing can suppress rattling of the magnet 109.

Cushion materials (not illustrated) may be provided between the upper disk portion 1060 and the magnet 109 and between the lower disk portion 1061 and the magnet 109 to prevent rattling of the magnet 109.

The compression coil spring 107 is made of a metal wire material not attached to the magnet 109.

In the rotating member 105, the front first shaft portion 105b and the rear first shaft portion 105c are inserted into a front guide groove 102e and a rear guide groove 102f formed inside the upper case 102. As a result, this prevents or reduces the rotation of the rotating member 105 about the center line with respect to the upper case 102. In this state, the rotating member 105 is accommodated in the upper case 102 so as to be rotatable about the axes of the front first shaft portion 105b and the rear first shaft portion 105c. The front guide groove 102e and the rear guide groove 102f are formed in an inverted U shape so as to open downward.

In the operating member 104, the base portion 104a is inserted into the through hole 105a of the rotating member 105, and the left second shaft portion 104d and the right second shaft portion 104e are inserted into the left bearing portion 105f and the right bearing portion 105g of the rotating member 105. As a result, the operating member 104 is supported by the rotating member 105 so as to be rotatable about the axes of the left second shaft portion 104d and the right second shaft portion 104e. In this state, the operating member 104 causes the key top mounting portion 104b to protrude from the inside of the upper case 102 to the upper side of the upper case 102 through the insertion hole 102d.

In a state where the compression coil spring 107 is externally fitted from the flange portion 1062a to the upper pin 1062, the magnet holding portion 106 is movably inserted into the magnet accommodating hole 104f of the operating member 104 along the center line of the operating member 104, and the lower surface of the lower disk portion 1061 faces the bottom plate portion 101a.

The compression coil spring 107 is accommodated between the flange portion 1062a and the upper surface of the magnet accommodating hole 104f and biases the operating member 104 and the rotating member 105 upward and biases the magnet holding portion 106 downward.

In a state where the operating force is not applied to the operating member 104, the magnet holding portion 106 is supported in an upright state on the bottom plate portion 101a in a state where the flat surface 1063a in the abutment surface 1063 of the lower surface of the lower disk portion 1061 is pressed against the bottom plate portion 101a by the biasing force of the compression coil spring 107, and the operating member 104 and the rotating member 105 are pushed up until the front first shaft portion 105b and the rear first shaft portion 105c are engaged with the upper ends (closed end portions) of the front guide groove 102e and the rear guide groove 102f.

As a result, the operating member 104 is supported in an upright state on the bottom plate portion 101a through the magnet holding portion 106. With this state as an initial state, the operating member 104 can be tilted and pressed in any direction of the periphery (all directions of 360 degrees). The illustrated operating member 104 can be tilted up to 16.5 degrees.

The rotating member 105 is rotatable in conjunction with the tilting operation of the operating member 104. In addition, the rotating member 105 can move downward (tilt) so as to press the pressing portion 105*d* with the pressing fulcrum portion 105*e* as a fulcrum in a state where the pressing fulcrum portion 105*e* is pressed against the bottom plate portion 101*a* along with pressing of the operating member 104.

The magnet holding portion 106 relatively moves with respect to the operating member 104 in the direction along the center line of the operating member 104 against the biasing force of the compression coil spring 107 along with pressing of the operating member 104, that is, enters the magnet accommodating hole 104*f* of the operating member 104, so that the magnet holding portion 106 does not move downward along with pressing of the operating member 104. That is, the magnet holding portion 106 is interlocked only with the tilting operation of the operating member 104.

In a state where the operating member 104 is tilted, the magnet holding portion 106 supports itself and the operating member 104 in a tilted state on the bottom plate portion 101*a* in a state where the curved surface 1063*b* of the abutment surface 1063 in the lower surface of the lower disk portion 1061 is pressed against the bottom plate portion 101*a*.

The pusher 111 and the metal dome 113 function as a pressing detector of the operating member 4. Specifically, it functions as a pressing switch, and opens and closes a fixed contact (not illustrated) formed on the main substrate 114.

The cover sheet 112 is a single-sided adhesive sheet. The metal dome 113 is a movable contact formed of an upward convex dome-shaped metal plate. An upper surface of the metal dome 13 is attached to a lower surface of the cover sheet 12 to form a metal dome sheet.

A central fixed contact (not illustrated) and an outer fixed contact (not illustrated) are formed on the main substrate 114. The central fixed contact is formed in a circular shape and is disposed below the pressing portion 105*d* of the rotating member 105. The outer fixed contact is formed in a C shape and is disposed so as to surround the central fixed contact at an interval.

The metal dome sheet is attached to the main substrate 114 so as to fix the metal dome 113 on the outer fixed contact in a state of straddling the central fixed contact. In this state, the top portion of the metal dome 113 is in a state of facing away from the central fixed contact immediately below the top portion with a gap.

The pusher 111 is a resin molded article. The pusher 111 is a rectangular parallelepiped member. The pusher 111 is accommodated in the upper case 102 in a state of being vertically movable. The pusher 111 is disposed between the pressing portion 105*d* of the rotating member 105 and the metal dome 113. The pusher 111 is biased upward by the metal dome 113, and the upper surface of the pusher 111 is pressed against the lower end of the pressing portion 105*d* of the rotating member 105.

When the operating member 104 is pressed, the rotating member 105 moves downward along with pressing of the operating member 104, the pusher 111 moves downward against the biasing force of the metal dome 113 by the downward movement of the rotating member 105, and the top portion of the metal dome 113 is pressed by the pusher 111. As a result, the top portion of the metal dome 113 is elastically deformed in a downward convex shape and comes into contact with the central fixed contact of the main substrate 114, the central fixed contact and the outer fixed contact of the main substrate 114 are electrically conductively connected to each other by the metal dome 113, and the pressing switch is turned on. As a result, pressing of the operating member 104 can be detected.

The magnet 109, the first magnetic sensor 110A, the second magnetic sensor 110B, and the magnet tilt angle calculation unit 116 function as a tilt operation detector of the operating member 104.

Figure 26:
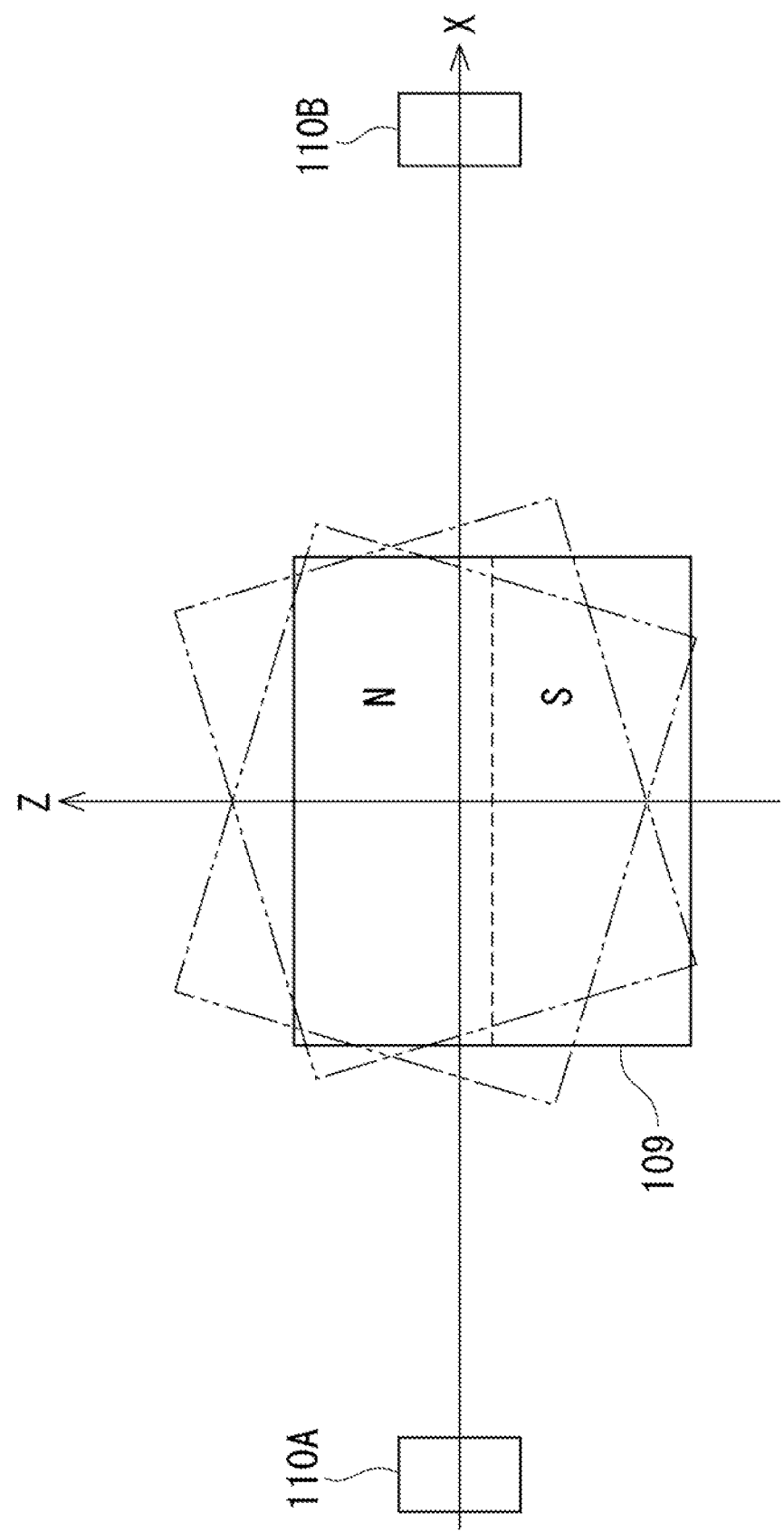
FIG. 26 is a front view illustrating a positional relationship among a magnet, a first magnetic sensor, and a second magnetic sensor.
Figure 27:
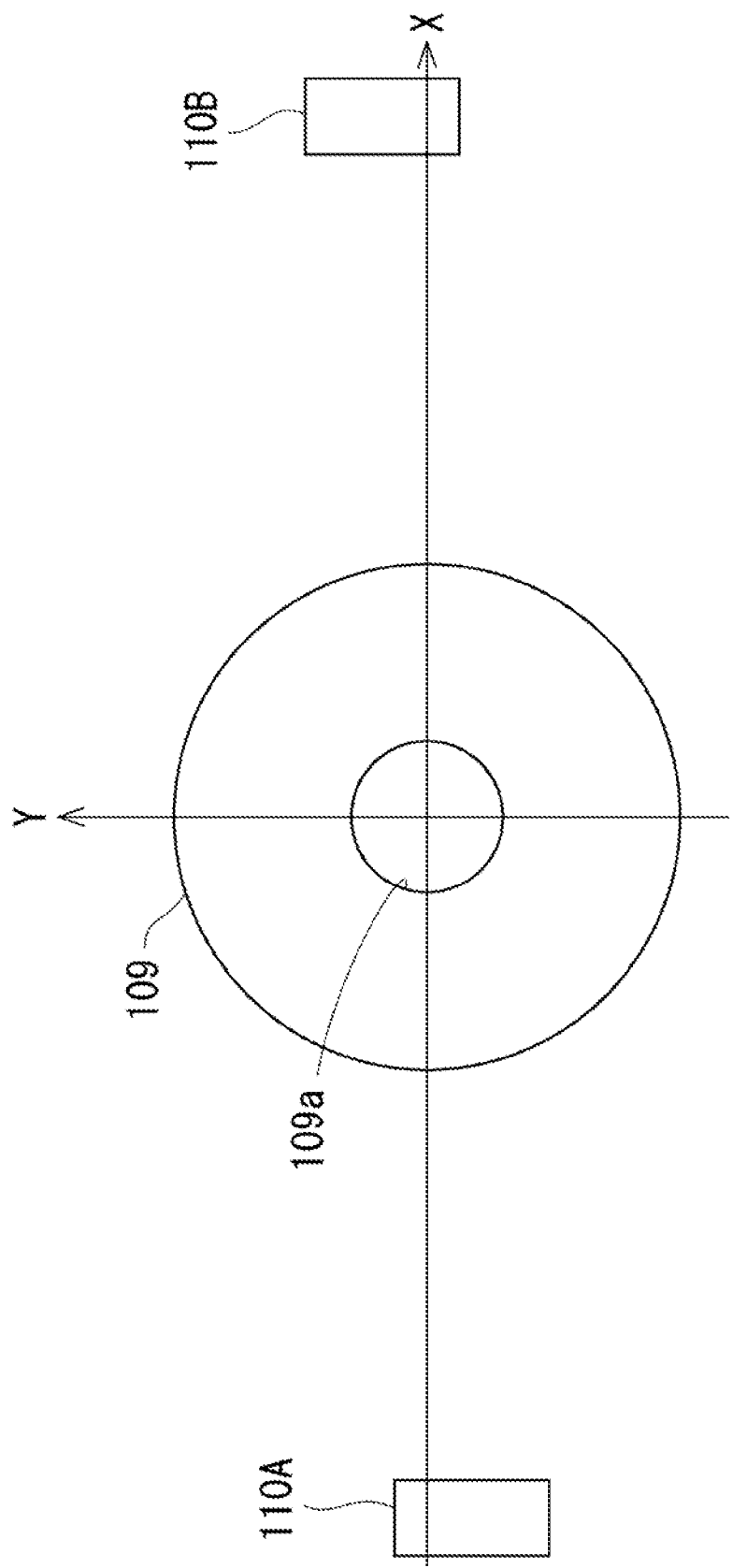
FIG. 27 is a plan view of FIG. 26.
Figure 28:
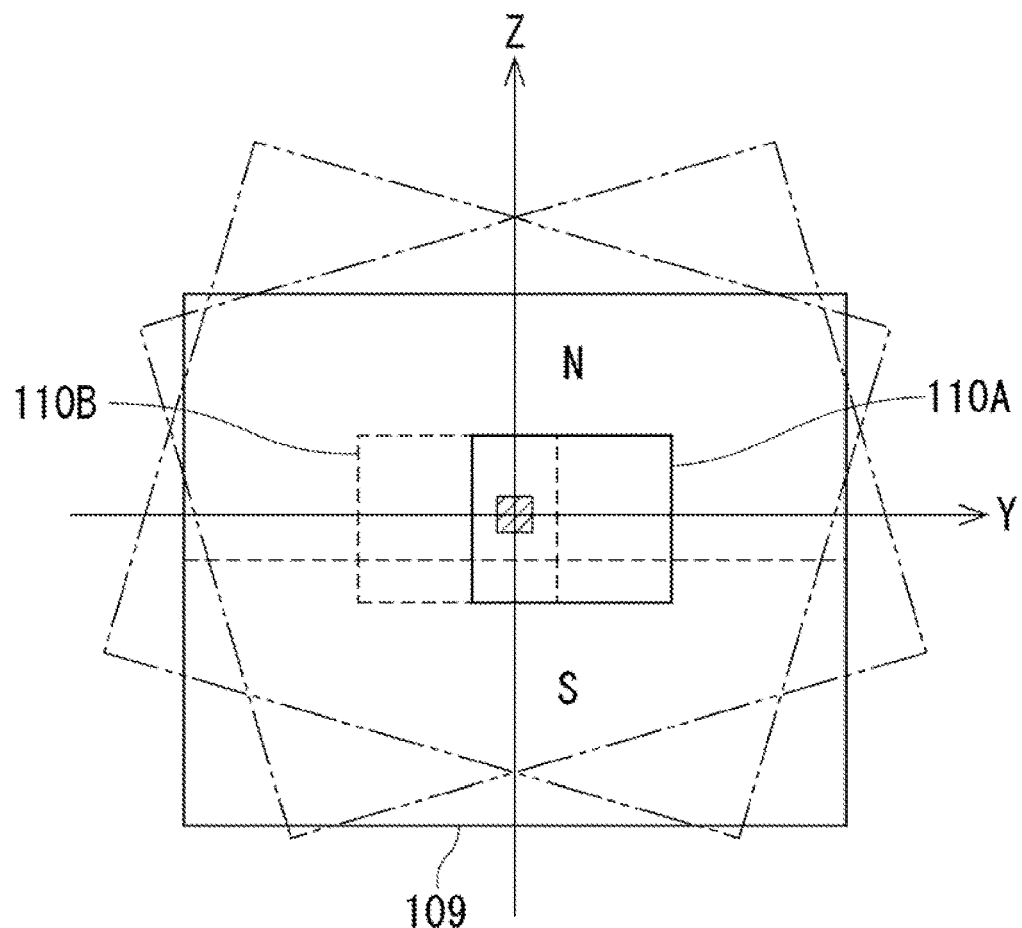
FIG. 28 is a left side view of FIG. 26.

As also illustrated in FIGS. 26 to 28, the first magnetic sensor 110A and the second magnetic sensor 110B are disposed on the sides of the magnet 109. Specifically, the first magnetic sensor 110A and the second magnetic sensor 110B are disposed at two positions on the sides of the magnet 109 that are point-symmetric with respect to the axis (center line) of the magnet 109. More specifically, the first magnetic sensor 110A and the second magnetic sensor 110B are arranged in a direction (X-axis direction) orthogonal to the protruding direction (Y-axis direction) of the front first shaft portion 105*b* and the rear first shaft portion 105*c*.

The first magnetic sensor 110A is disposed on the left side of the rotating member 105 and faces the magnet 109 with a predetermined distance. The second magnetic sensor 110B is disposed on the right side of the rotating member 105 and faces the magnet 109 at the same distance as the first magnetic sensor 110A.

The first magnetic sensor 110A and the second magnetic sensor 110B are surface mounted on a first sub-substrate 115A and a second sub-substrate 115B made of small rigid substrates. Each of the first sub-substrate 115A and the second sub-substrate 115B is vertically erected on the main substrate 114 in a state where the sensor mounting surface is held inside the upper case 102 so as to be orthogonal to one straight line extending in the X-axis direction orthogonal to the axis (center line) of the magnet 109.

The first magnetic sensor 110A and the second magnetic sensor 110B are the same magnetic sensors and are magnetic sensors capable of detecting magnetic flux densities in three axial directions orthogonal to one another of the X axis, the Y axis, which are radial planes of the magnet 109, and the Z axis, which is an axial direction of the magnet 109. As this magnetic sensor, for example, a 3D Hall sensor or the like can be used.

The first magnetic sensor 110A and the second magnetic sensor 110B are disposed such that centers of respective magnetic-sensitive portions 110Ax and 110Bx in the X-axis direction are coaxial with one straight line extending in the X-axis direction orthogonal to the axis (center line) of the magnet 109.

Figure 29:
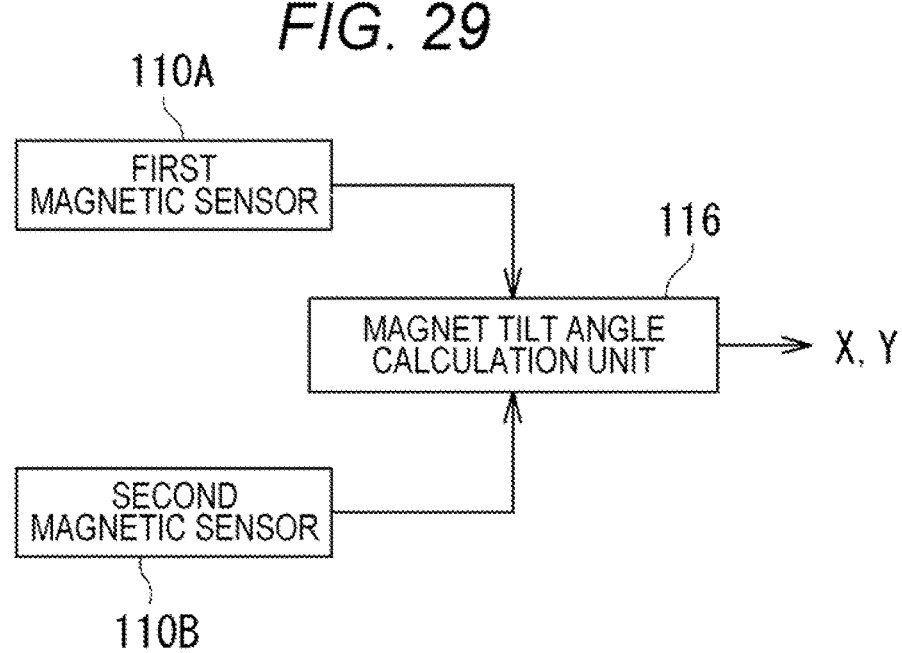
FIG. 29 is a processing block diagram of output signals of the first magnetic sensor and the second magnetic sensor.

As illustrated in FIG. 29, the first magnetic sensor 110A and the second magnetic sensor 110B are connected to the magnet tilt angle calculation unit 116, and a tilt angle of the magnet 109, that is, a tilt operation of the operating member 104 is detected. Specifically, (1) the magnetic flux densities Bx, By, and Bz in the three axial directions are measured and output by the first magnetic sensor 110A and the second magnetic sensor 110B. (2) The magnet tilt angle calculation unit 116 calculates an angle formed by magnetic flux density vectors Bz and By and an angle formed by magnetic flux density vectors Bz and Bx in the first magnetic sensor 110A and the second magnetic sensor 110B based on output values of the first magnetic sensor 110A and the second magnetic sensor 110B. (3) The magnet tilt angle calculation unit 116 calculates the tilt angle of the magnet 109 based on the result of (2). That is, an output value A of the first magnetic sensor 110A and an output value B of the second magnetic sensor 110B are added, divided by 2, and averaged.

Figure 30:
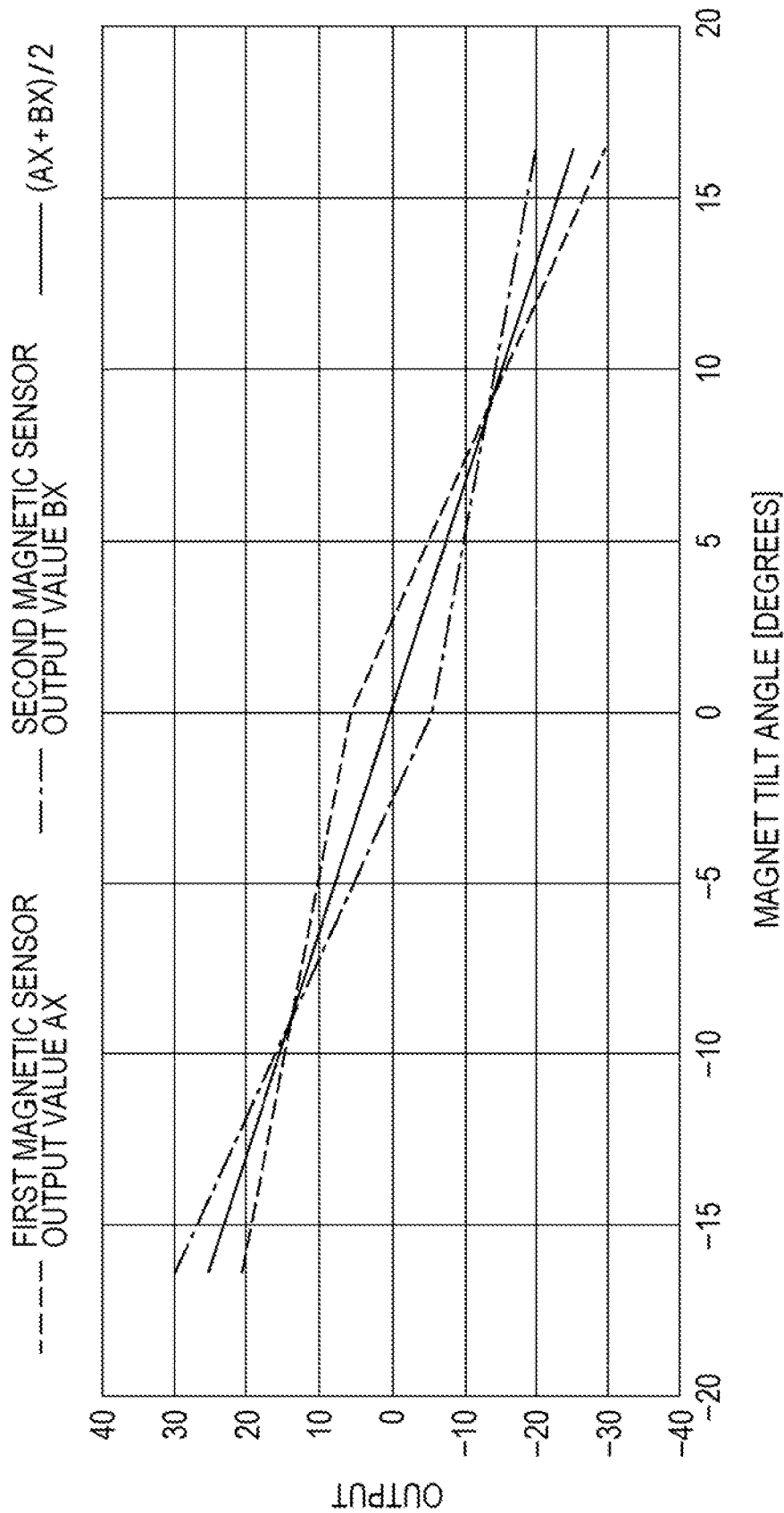
FIG. 30 is a diagram showing an analysis result of detection of a tilt amount of the operating member in an X-axis direction.
Figure 31:
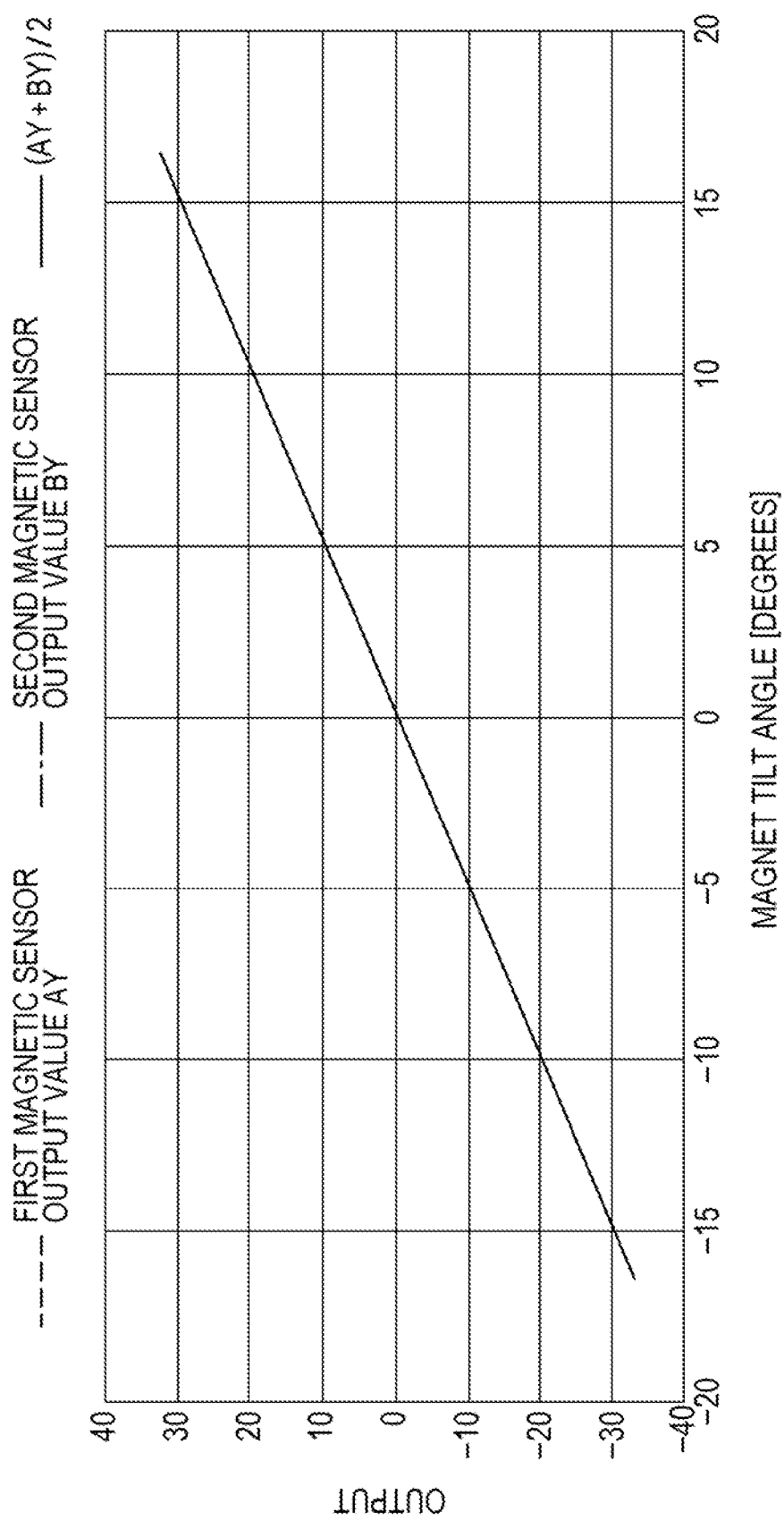
FIG. 31 is a diagram showing an analysis result of detection of a tilt amount of the operating member in a Y-axis direction.

Here, in the detection of the tilt amounts in the Y-axis direction in which the distances of the first magnetic sensor 110A and the second magnetic sensor 110B with respect to the magnet 109 do not change, as shown in FIG. 31, substantially the same outputs are output in both the first magnetic sensor 110A and the second magnetic sensor 110B, and the average values also overlap each other. On the other hand, in the detection of the tilt amounts in the X-axis direction in which the distances of the first magnetic sensor 110A and the second magnetic sensor 110B with respect to the magnet 109 changes, as shown in FIG. 30, the tilt of the output value with respect to the tilt angle of the magnet 109 differs between the case where the magnet 109 approaches and the case where the magnet 109 moves away from the first magnetic sensor 110A and the second magnetic sensor 110B, but the output obtained by adding the output value A of the first magnetic sensor 110A and the output value B of the second magnetic sensor 110B and averaging the sum by 2 has a substantially linear output characteristic with respect to the tilt angle. That is, it can be seen that the influence of the difference in the tilting direction is offset.

In another multi-directional input device, the magnet tilt angle calculation unit 116 is provided outside the other multi-directional input device, that is, in various electronic devices such as a game machine controller including the other multi-directional input device, but may be provided inside the other multi-directional input device.

Figure 32:
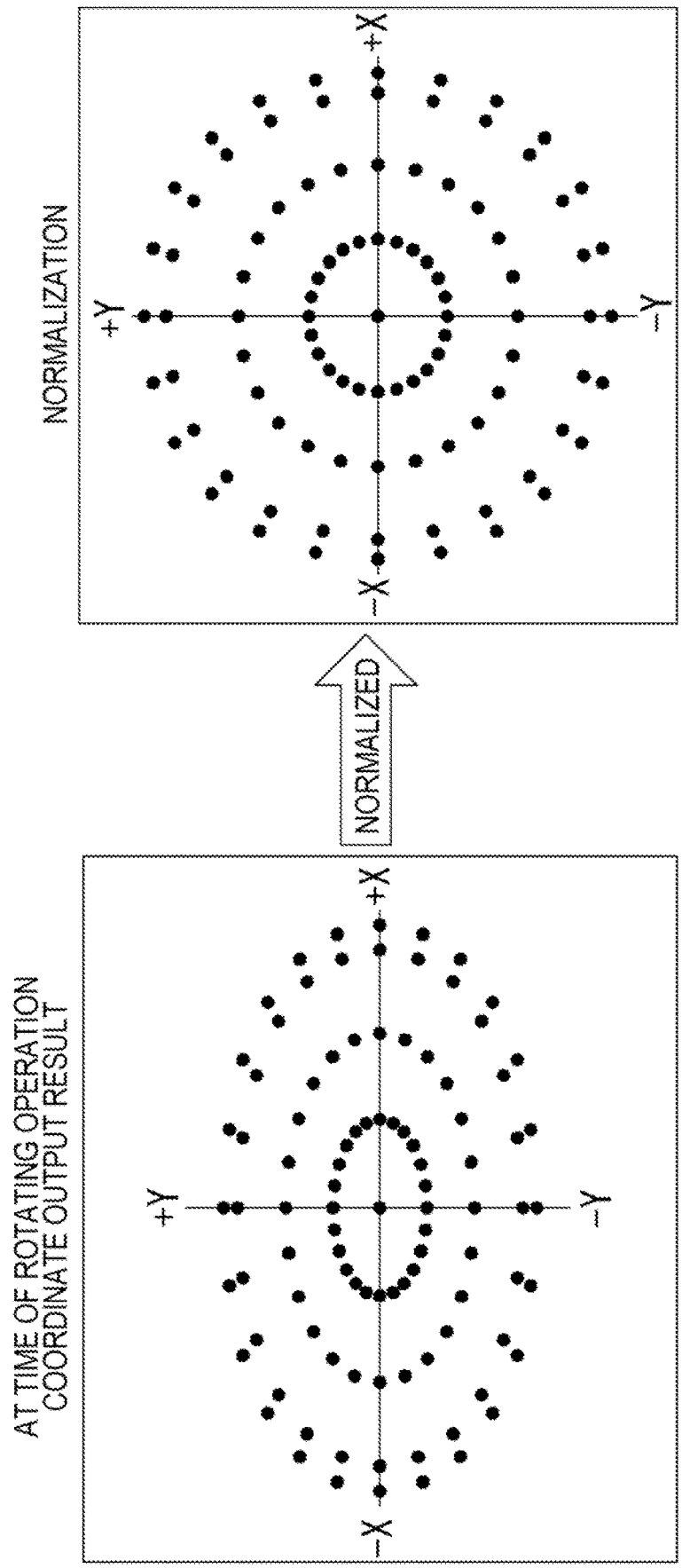
FIG. 32 is a diagram showing an analysis result of X-Y coordinate output values at the time of omnidirectional tilt.
Figure 33:
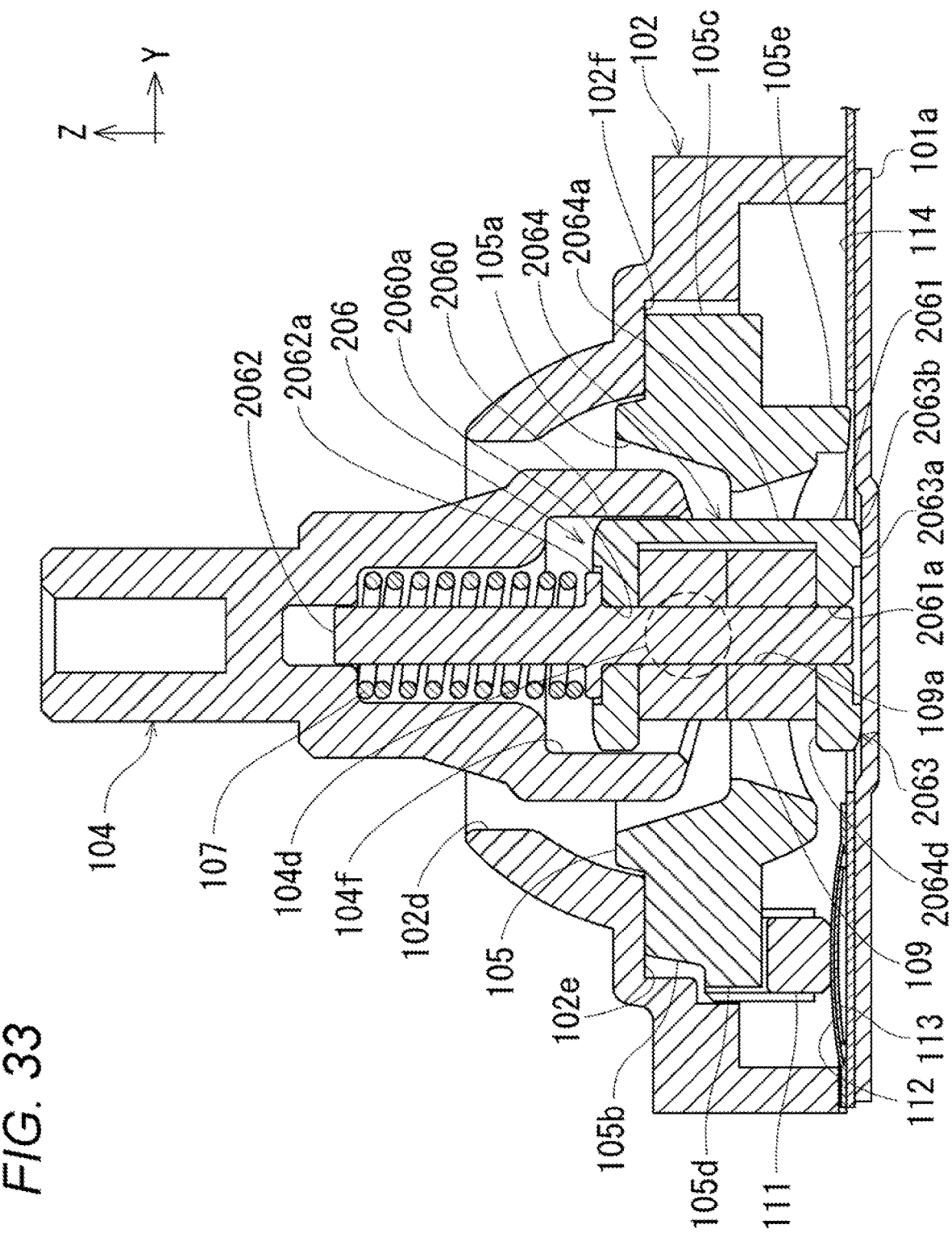
FIG. 33 is a cross-sectional view corresponding to FIG. 19, illustrating a first modification of the magnet holding portion.
Figure 34:
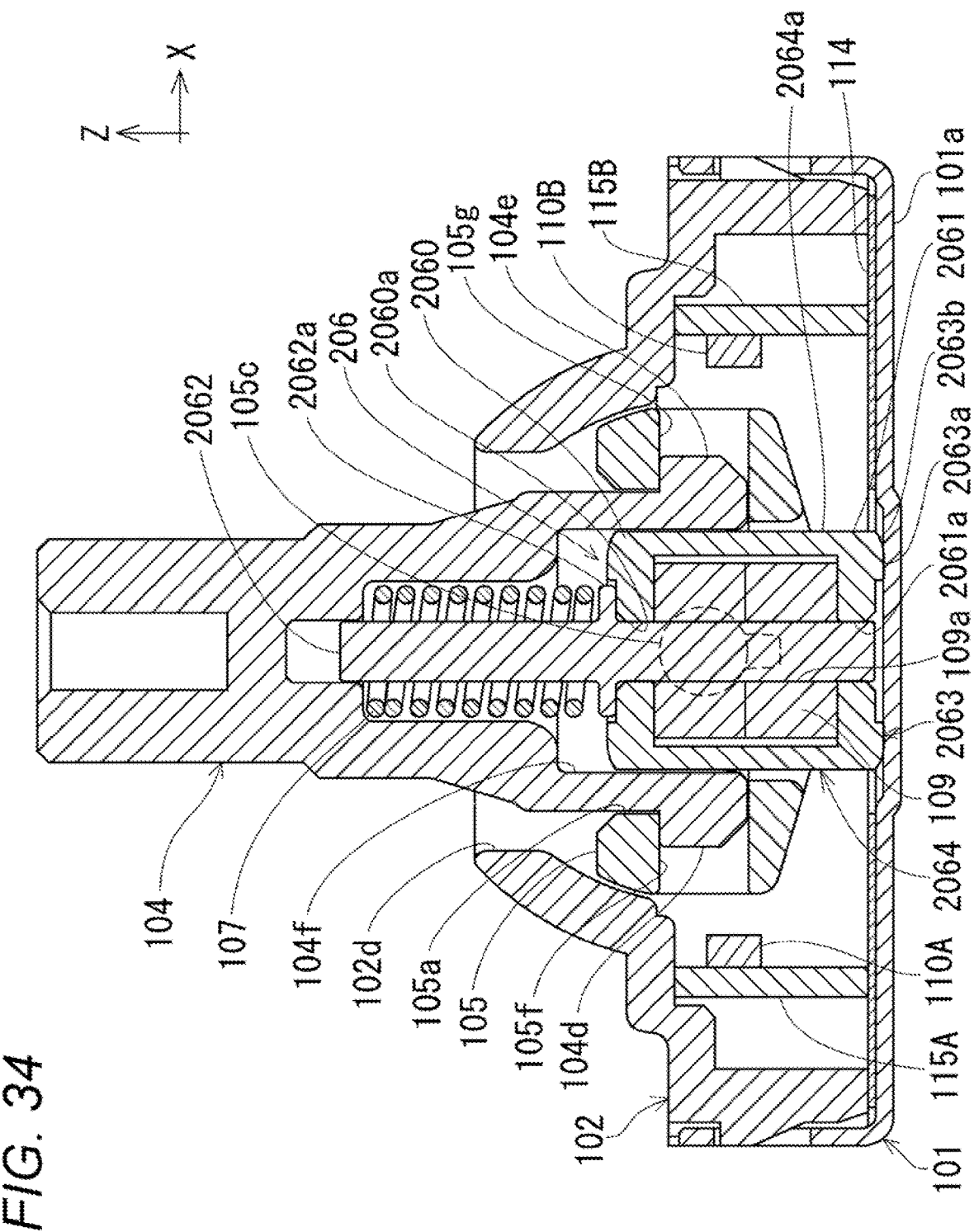
FIG. 34 is a cross-sectional view corresponding to FIG. 21, illustrating the first modification of the magnet holding portion.
Figure 35:
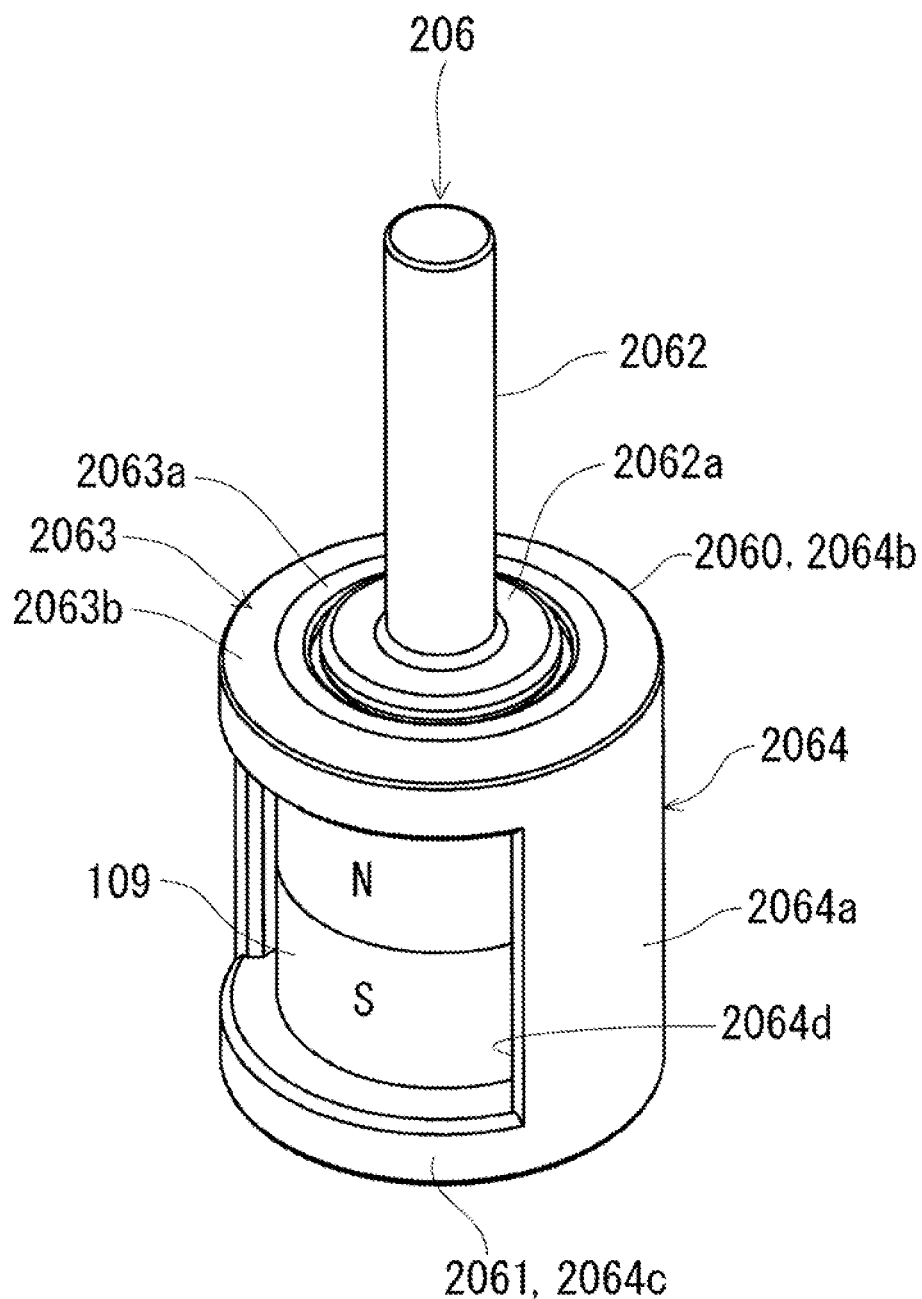
FIG. 35 is a perspective view illustrating the first modification of the magnet holding portion.
Figure 37A:
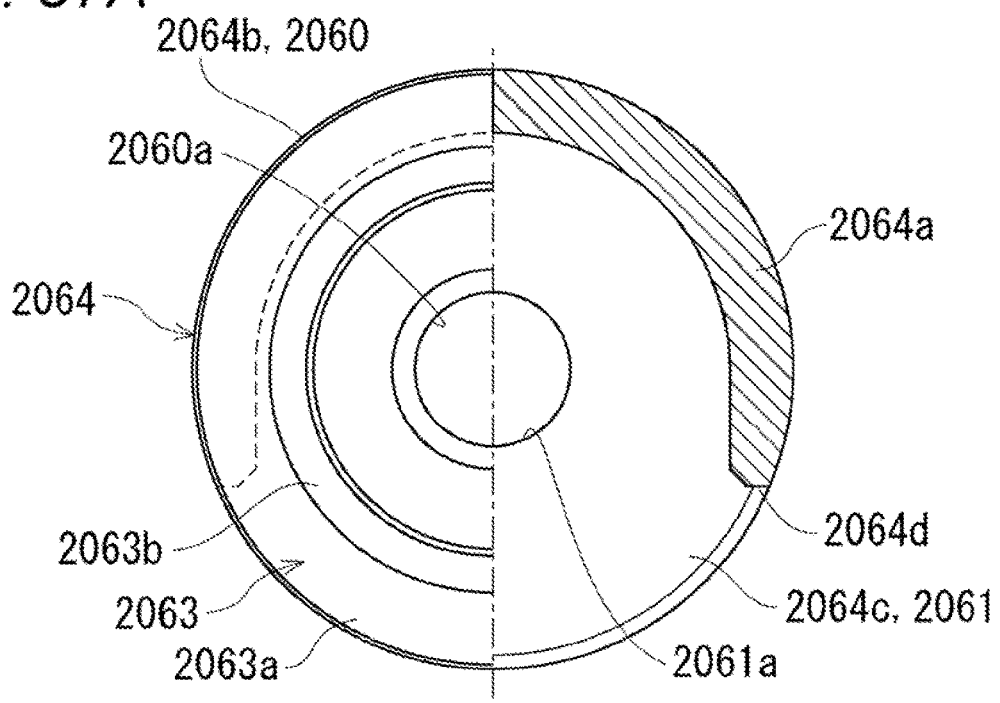
Figure 37B:
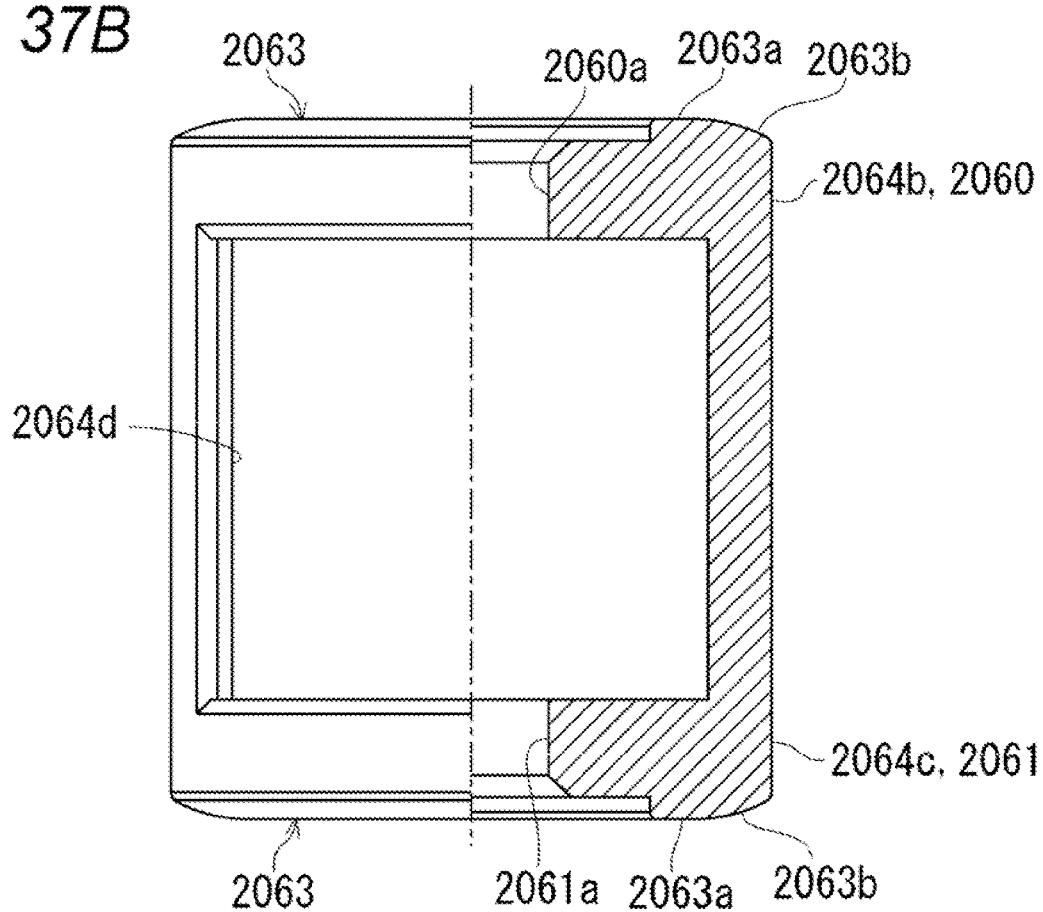

FIG. 32 shows an analysis result of output values (X-Y coordinate output values) when the operation is performed at azimuth angles in increments of 15 degrees (0 degrees to 360 degrees) and tilt angles of 0, 5, 10, 15, and 16.5 degrees. Referring to FIG. 32, an elliptical output on the left side is obtained, and when the elliptical output is normalized, the elliptical output becomes a circular output on the right side, and a deviation of the output value due to the tilting direction and a lack of linearity are not observed.

A first modification of the magnet holding portion will be described with reference to FIGS. 33 to 37B. A magnet holding portion 206 of the first modification is replaced with the magnet holding portion 106 described above.

The magnet holding portion 206 includes a pair of upper and lower disk portions 2060 and 2061 disposed at both ends of the magnet 109, and a pin 2062. In the same manner as the magnet 109, the upper disk portion 2060 and the lower disk portion 2061 have circular through holes 2060a and 2061a, respectively, at the central portion.

The pin 2062 is a round pin having a circular cross section fitted into the through holes 2060a, 2061a, and 109a. The pin 2062 is a pin made of metal not attached to the magnet 109 or a pin made of metal attached to the magnet 109, and is a pin subjected to surface processing such as plating so as not to be attached to the magnet 109.

The magnet holding portion 206 is configured to hold the magnet 109 between the upper disk portion 2060 and the lower disk portion 2061 in a state where the pin 2062 is inserted into the through holes 2060a, 2061a, and 109a of the upper disk portion 2060, the lower disk portion 2061, and the magnet 109. The upper disk portion 2060, the lower disk portion 2061, and the magnet 109 are provided coaxially with one straight line extending in the Z-axis direction which is the center line of the pin 2062.

The magnet holding portion 206 has an abutment surface 2063 in a spherical segment shape against the bottom plate portion 101a on the lower surface (the lower end surface of the magnet holding portion 206) of the lower disk portion 2061 facing the bottom plate portion 101a. The abutment surface 2063 includes a circular flat surface 2063a formed of a small diameter side end surface of the spherical segment and a ball-like curved surface 2063b formed of a side surface of the spherical segment.

The pin 2062 has a disk-shaped flange portion 2062a at an axially intermediate portion of the pin 2062. In the pin 2062, in a state where the flange portion 2062a is in abutment against the upper surface of the upper disk portion 2060, the lower pin 2062 is inserted from the flange portion 2062a into the through holes 2060a, 2061a, and 109a of the upper disk portion 2060, the lower disk portion 2061, and the magnet 109, the lower end of the pin 2062 is positioned inside the through hole 2061a of the lower disk portion 2061, the pin 2062 does not protrude from the lower surface of the lower disk portion 2061, and the upper pin 2062 protrudes upward from the upper surface of the upper disk portion 2060 from the flange portion 2062a.

The magnet holding portion 206 includes a cylindrical component 2064 in which a side wall portion 2064a having a C-shaped cross section and a pair of disk-shaped end wall portions 2064b and 2064c for closing both end openings of the side wall portion 2064a are integrally formed of a nonmagnetic material (synthetic resin), and which has a side window 2064d into which the magnet 109 can be inserted from the side. The magnet holding portion 206 is configured such that the pair of disk-shaped end wall portions 2064b and 2064c are an upper disk portion 2060 and a lower disk portion 2061, abutment surfaces 2063 are provided on an upper surface (outer surface) of the upper disk portion 2060 and a lower surface (outer surface) of the lower disk portion 2061, and the abutment surface 2063 having a spherical segment shape and provided on the lower surface (lower surface of the magnet holding portion 206) of the lower disk portion 2061 is the abutment surface 2063 against the bottom plate portion 101a.

The upper disk portion 2060 and the lower disk portion 2061 can be fixed to the pin 2062 by using an adhesive or by press-fitting the pin 2062 into the through holes 2060a and 2061a. Such fixing can suppress rattling of the magnet 109.

Cushion materials (not illustrated) may be provided between the upper disk portion 2060 and the magnet 109 and between the lower disk portion 2061 and the magnet 109 to prevent rattling of the magnet 109.

In a state where the compression coil spring 107 is externally fitted from the flange portion 2062a to the upper pin 2062, the magnet holding portion 206 is movably inserted into the magnet accommodating hole 104f of the operating member 104 along the center line of the operating member 104, and the lower surface of the lower disk portion 2061 faces the bottom plate portion 101a.

The compression coil spring 107 is accommodated between the flange portion 2062a and the upper surface of the magnet accommodating hole 104f and biases the operating member 104 and the rotating member 105 upward and biases the magnet holding portion 206 downward.

In a state where the operating force is not applied to the operating member 104, the magnet holding portion 206 is supported in an upright state on the bottom plate portion 101a in a state where the flat surface 2063a in the abutment surface 2063 of the lower surface of the lower disk portion 2061 is pressed against the bottom plate portion 101a by the biasing force of the compression coil spring 107.

The magnet holding portion 206 relatively moves with respect to the operating member 104 in the direction along the center line of the operating member 104 against the biasing force of the compression coil spring 107 along with pressing of the operating member 104, that is, enters the magnet accommodating hole 104f of the operating member 104, so that the magnet holding portion 206 does not move downward along with pressing of the operating member 104. That is, the magnet holding portion 206 is interlocked only with the tilting operation of the operating member 104.

In a state where the operating member 104 is tilted, the magnet holding portion 206 supports itself and the operating member 104 in a tilted state on the bottom plate portion 101a in a state where the curved surface 2063b of the abutment surface 2063 in the lower surface of the lower disk portion 2061 is pressed against the bottom plate portion 101a.

Figure 38:
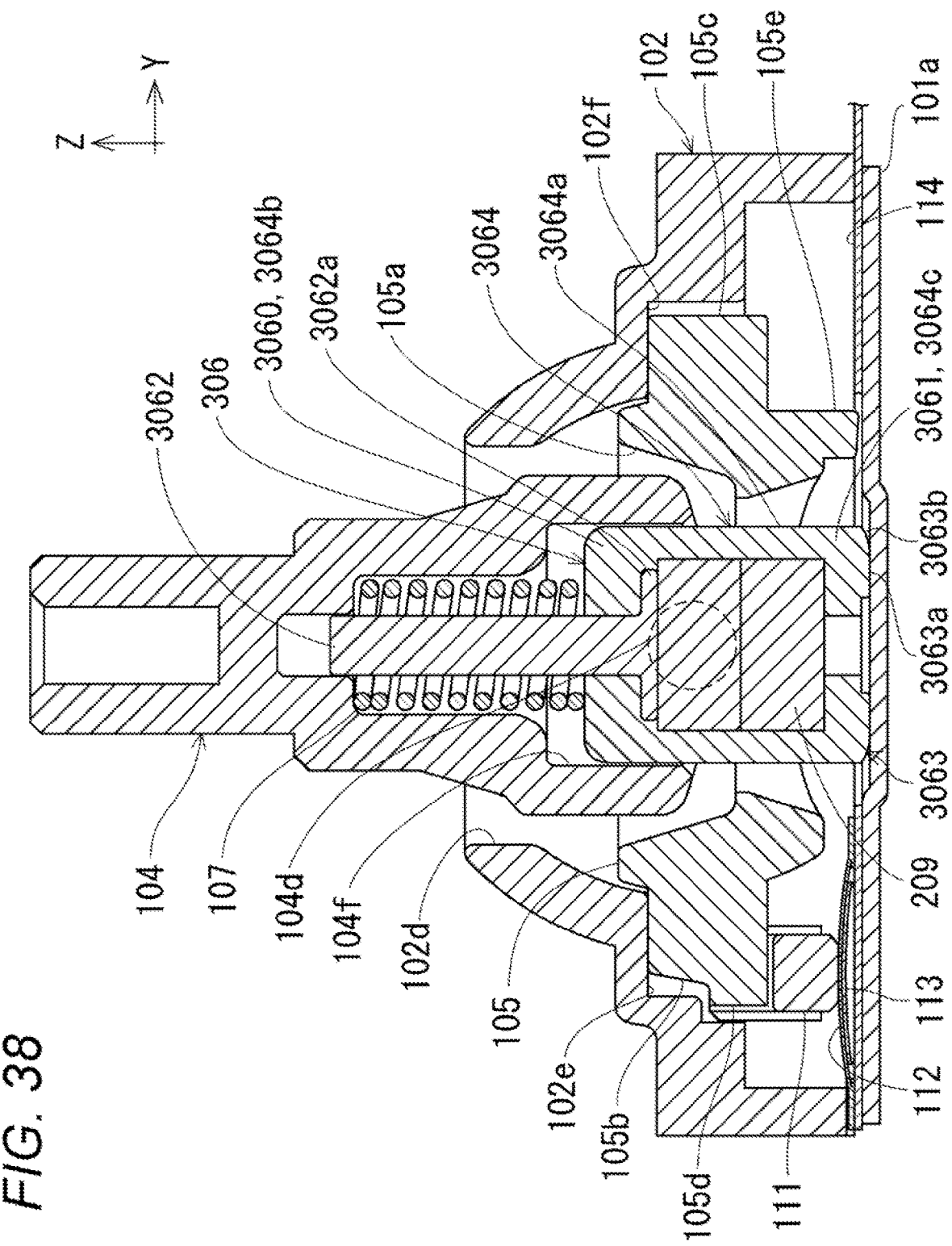
FIG. 38 is a cross-sectional view corresponding to FIG. 19, illustrating a second modification of the magnet holding portion.

A second modification of the magnet holding portion will be described with reference to FIG. 38. A magnet holding portion 306 of the second modification is replaced with the magnet holding portions 106 and 206 described above.

The magnet 209 is different from the magnet 109 in that a circular through hole is not provided at the central portion. That is, the magnet 209 is a columnar permanent magnet magnetized (polarized) to the NS2 pole in the axial direction with the direction along the protruding direction of the operating member 104 as the axial direction. The magnet 209 is a columnar permanent magnet whose axial direction is the Z-axis direction. The magnet 209 is magnetized to the NS2 pole in the axial direction so that both end surfaces (the upper end surface and the lower end surface) have different poles. The magnet 209 has an upper end surface as an N pole and a lower end surface as an S pole.

In the same manner as the magnet holding portions 106 and 206, the magnet holding portion 306 includes a pair of upper and lower disk portions 3060 and 3061 disposed at both ends of the magnet 209, and a pin 3062.

The pin 3062 is a round pin having a circular cross section. The pin 3062 is a pin made of metal not attached to the magnet 209 or a pin made of metal attached to the magnet 209, and is a pin subjected to surface processing such as plating so as not to be attached to the magnet 209.

The pin 3062 is located coaxially with the magnet 209 and protrudes upward (in the protruding direction of the operating member 104) from the upper disk portion 2060 (one of the disk portions in the protruding direction of the operating member 104).

The pin 3062 is located coaxially with the magnet 209 in a state where the lower end of the pin 3062 is in abutment against the upper surface of the magnet 209 and protrudes upward (in the protruding direction of the operating member 104) from the upper disk portion 2060 (one of the disk portions in the protruding direction of the operating member 104). The pin 3062 has a disk-shaped flat head 3062a, and the flat head 3062a is in abutment against the upper surface of the magnet 209.

The magnet holding portion 306 has an abutment surface 3063 in a spherical segment shape against the bottom plate portion 101a on the lower surface (the lower end surface of the magnet holding portion 306) of the lower disk portion 3061 facing the bottom plate portion 101a. The abutment surface 3063 includes a circular flat surface 3063a formed of a small diameter side end surface of the spherical segment and a ball-like curved surface 3063b formed of a side surface of the spherical segment.

The magnet holding portion 306 includes a cylindrical component 3064 in which a cylindrical side wall portion 3064a disposed on an outer periphery of the magnet 209 and a pair of disk-shaped end wall portions 3064b and 3064c for closing both end openings of the side wall portion 3064a are integrally formed of a nonmagnetic material (synthetic resin), and which covers the entire magnet 209. The magnet holding portion 306 is configured such that the pair of disk-shaped end wall portions 3064b and 3064c are an upper disk portion 3060 and a lower disk portion 3061, an abutment surface 3063 is provided on a lower surface (outer surface) of the lower disk portion 3061, and the abutment surface 3063 having a spherical segment shape and provided on the lower surface (lower surface of the magnet holding portion 306) of the lower disk portion 3061 is the abutment surface 3063 against the bottom plate portion 101a.

The magnet holding portion 306 including the magnet 206, the pin 3062, and the cylindrical component 3064 is integrally formed by insert molding in a state where the lower end portions of the magnet 206 and the pin 3062 are embedded in the cylindrical component 3064.

In a state where the compression coil spring 107 is externally fitted to the pin 3062 protruding upward from the upper disk portion 3060, the magnet holding portion 306 is movably inserted into the magnet accommodating hole 104f of the operating member 104 along the center line of the operating member 104, and the lower surface of the lower disk portion 3061 faces the bottom plate portion 101a.

The compression coil spring 107 is accommodated between the upper disk portion 3060 and the upper surface of the magnet accommodating hole 104f and biases the operating member 104 and the rotating member 105 upward and biases the magnet holding portion 306 downward.

In a state where the operating force is not applied to the operating member 104, the magnet holding portion 306 is supported in an upright state on the bottom plate portion 101a in a state where the flat surface 3063a in the abutment surface 3063 of the lower surface of the lower disk portion 3061 is pressed against the bottom plate portion 101a by the biasing force of the compression coil spring 107.

The magnet holding portion 306 relatively moves with respect to the operating member 104 in the direction along the center line of the operating member 104 against the biasing force of the compression coil spring 107 along with pressing of the operating member 104, that is, enters the magnet accommodating hole 104f of the operating member 104, so that the magnet holding portion 306 does not move downward along with pressing of the operating member 104. That is, the magnet holding portion 306 is interlocked only with the tilting operation of the operating member 104.

In a state where the operating member 104 is tilted, the magnet holding portion 306 supports itself and the operating member 104 in a tilted state on the bottom plate portion 101a in a state where the curved surface 3063b of the abutment surface 3063 in the lower surface of the lower disk portion 3061 is pressed against the bottom plate portion 101a.

As described above, another multi-directional input device includes: the cases 101 and 102; the operating member 104 that protrudes from the case 102 and can be tilted; the elastic member 107 that returns the operating member 104 to the initial state before the tilting operation; the magnet holding portion 106 (or 206 or 306) that is relatively movable with respect to the operating member 104 only in the direction along the protruding direction and is interlocked only in the tilting direction; the magnet 109 (or 209) arranged in the magnet holding portion 106 (or 206 or 306); and the magnetic sensors 110A and 110B that are arranged at positions facing the magnet 109 (or 209) and detect the movement of the magnet 109 (or 209), in which the magnet holding portion 106 (or 206 or 306) includes the pair of disk portions 1060 (or 2060 or 3060) and 1061 (or 2061 or 3061) arranged at both ends of the magnet 109 (or 209), and the pin 1062 (or 2062 or 3062) that is located coaxially with the magnet 109 (or 209) and protrudes in the protruding direction of the operating member 104 from one of the disk portions 1060 (or 2060 or 3060) in the protruding direction of the operating member 104.

In another multi-directional input device, the magnet 109 (or 209) is held by the magnet holding portion 106 (or 206 or 306) that is relatively movable with respect to the operating member 104 only in the direction along the protruding direction and is interlocked only in the tilting direction. Therefore, even if the operating member 104 moves downward against the compression coil spring 107, the magnet 109 (or 209) does not move downward, and the magnetic field does not change. Therefore, the detection accuracy of the tilting operation of the operating member 104 can be improved.

In another multi-directional input device, the magnet holding portion 106 includes the pair of disk portions 1060 and 1061 disposed at both ends of the magnet 109, and the pin 1062 that is located coaxially with the magnet 109 and protrudes in the protruding direction of the operating member 104 from one of the disk portions 1060 in the protruding direction of the operating member 104. Therefore, when the outer diameter of the magnet 109 is increased, it is not necessary to increase the outer diameter of the magnet holding portion 106 accordingly, and the magnet 109 can be increased without increasing the size of the product, so that the detection accuracy of the tilting operation of the operating member 104 can be improved.

In another multi-directional input device, the magnet 109 has the through hole 109*a* at the central portion, the magnet holding portion 106 (or 206) includes the pair of disk portions 1060 (or 2060) and 1061 (or 2061) disposed at both ends of the magnet, and the pin 1062 (or 2062), the through holes 1060*a* (or 2060*a*) and 1061*a* (or 2061*a*) are provided at the central portions of the disk portions 1060 (or 2060) and 1061 (or 2061), and the magnet 109 is held between the disk portions 1060 (or 2060) and 1061 (or 2061) in a state where the pin 1062 (or 2062) is inserted into the through holes 1060*a* (or 2060*a*) and 1061*a* (or 2061*a*) and 109*a* of the disk portions 1060 (or 2060) and 1061 (or 2061) and the magnet 109. Therefore, when the outer diameter of the magnet 109 is increased, it is not necessary to increase the outer diameter of the magnet holding portion 106 accordingly, and the magnet 109 can be increased without increasing the size of the product, so that the detection accuracy of the tilting operation of the operating member 104 can be improved.

In another multi-directional input device, the magnet holding portion 106 (or 206 or 306) has the abutment surface 1063 (or 2063 or 3063) in a spherical segment shape on one surface opposite to the magnet 109 (or 209) side in one of the disk portions 1061 (or 2061 or 3061) opposite to the protruding direction of the operating member 104, the abutment surface 1063 (or 2063 or 3063) includes the flat surface 1063*a* (or 2063*a* or 3063*a*) formed of the small diameter side end surface of the spherical segment, and the curved surface 1063*b* (or 2063*b* or 3063*b*) formed of the side surface of the spherical segment, the operating member 104 is supported on the bottom plate portion 101*a* of the case 101 in an upright state together with the magnet holding portion 106 (or 206 or 306) in a state where the flat surface 1063*a* (or 2063*a* or 3063*a*) is in abutment against the bottom plate portion 101*a*, and the operating member 104 is supported on the bottom plate portion 101*a* in a tilted state together with the magnet holding portion 106 (or 206 or 306) in a state where the curved surface 1063*b* (or 2063*b* or 3063*b*) is in abutment against the bottom plate portion 101*a*.

In another multi-directional input device, the elastic member 107 is a compression coil spring disposed between the operating member 104 and the magnet holding portion 106 (or 206 or 306) and is configured to press the abutment surface 1063 (or 2063 or 3063) against the bottom plate portion 101*a* while biasing the operating member 104 in the protruding direction.

Another multi-directional input device includes the rotating member 105 having the through hole 105*a* into which the operating member 104 is inserted, the rotating member 105 includes the first shaft portions 105*b* and 105*c*, the first shaft portions 105*b* and 105*c* are provided coaxially with one straight line orthogonal to the center line of the rotating member 105 in a state of protruding toward two opposite directions from the outer peripheral surface of the rotating member 105, the rotating member 105 is accommodated in the case 102 so as to be rotatable about the axes of the first shaft portions 105*b* and 105*c*, the operating member 104 includes the second shaft portions 104*d* and 104*e*, the second shaft portions 104*d* and 104*e* are provided coaxially with one straight line orthogonal to the center line of the operating member 104 and also orthogonal to the first shaft portions 105*b* and 105*c* in a state of protruding toward two opposite directions from the outer peripheral surface of the operating member 104, and the operating member 104 protrudes from the case 102 and can be tilted in any direction of the periphery in a state of being rotatably supported about the axes of the second shaft portions 104*d* and 104*e* with respect to the rotating member 105.

Another multi-directional input device includes the pusher 111 accommodated in the case 102 in a state of being movable in the vertical direction, and the metal dome 113 which is a snap-type contact member for biasing the pusher 111 upward, and includes the pressing switch capable of detecting pressing of the operating member 104, the rotating member 105 is accommodated in the case 102 in a state of being movable downward along with pressing of the operating member 104, and the pressing switch is configured to cause the rotating member 105 that moves downward along with pressing of the operating member 104 to move the pusher 111 downward against the biasing force of the metal dome 113, and to press the metal dome 113 with the pusher 111.

In another multi-directional input device, the magnetic sensors 110A and 110B are disposed on the sides of the magnet 109, the magnet holding portion 106 includes the two same disk-shaped components 1064 formed of a magnetic material, the disk-shaped components 1064 are the disk portions 1060 and 1061, the abutment surfaces 1063 in a spherical segment shape are provided on both surfaces of the disk portions 1060 and 1061, the abutment surface 1063 includes the flat surface 1063*a* formed of the small-diameter end surface of the spherical segment and the curved surface 1063*b* formed of the side surface of the spherical segment, and among the flat surface 1063*a* and the curved surface 1063*b* of the abutment surface 1063 provided on one surface opposite to the magnet 109 side in one of the disk portions 1061 opposite to the protruding direction of the operating member 104, the operating member 104 is supported on the bottom plate portion 101*a* of the case 101 in an upright state together with the magnet holding portion 106 in a state where the flat surface 1063*a* is in abutment against the bottom plate portion 101*a*, and the operating member 104 is supported on the bottom plate portion 101*a* in a tilted state together with the magnet holding portion 106 in a state where the curved surface 1063*b* is in abutment against the bottom plate portion 101*a*.

In another multi-directional input device, the magnetic sensors 110A and 110B are disposed on the sides of the magnet 109, the magnet holding portion 206 includes the cylindrical component 2064 in which the side wall portion 2064*a* having a C-shaped cross section and the pair of disk-shaped end wall portions 2064*b* and 2064*c* for closing both end openings of the side wall portion 2064*a* are integrally formed of a nonmagnetic material, and which has the side window 2064d into which the magnet 109 can be inserted from the side, the end wall portions 2064b and 2064c of the cylindrical component 2064 are the disk portions 2060 and 2061, the abutment surfaces 2063 in a spherical segment shape are provided on the outer surfaces of the disk portions 2060 and 2061, the abutment surface 2063 includes the flat surface 2063a formed of the small-diameter end surface of the spherical segment and the curved surface 2063b formed of the side surface of the spherical segment, and among the flat surface 2063a and the curved surface 2063b of the abutment surface 2063 provided on the outer surface opposite to the magnet 109 side in one of the disk portions 2061 opposite to the protruding direction of the operating member 104, the operating member 104 is supported on the bottom plate portion 101a of the case 101 in an upright state together with the magnet holding portion 206 in a state where the flat surface 2063a is in abutment against the bottom plate portion 101a, and the operating member 104 is supported on the bottom plate portion 101a in a tilted state together with the magnet holding portion 206 in a state where the curved surface 2063b is in abutment against the bottom plate portion 101a.

In another multi-directional input device, the magnetic sensors 110A and 110B are magnetic sensors that are disposed on the sides of the magnet 109 (or 209) and can detect magnetic components in three axial directions orthogonal to one another.

In another multi-directional input device, the magnetic sensors 110A and 110B are magnetic sensors that are disposed on the sides of the magnet 109 (or 209) and can detect magnetic components in three axial directions orthogonal to one another. As compared with a case where the magnetic sensors are disposed below the magnet, it is possible to reduce the height of a product, secure an appropriate distance (for example, such a distance that minute rattling of the magnet does not adversely affect the detection of the tilting operation of the operating member) between the magnet 109 (or 209) and the magnetic sensors 110A and 110B, and improve the detection accuracy of the tilting operation of the operating member 104.

In another multi-directional input device, the magnetic sensors 110A and 110B are magnetic sensors disposed at two positions on the sides of the magnet 109 (or 209) that are point-symmetric with respect to the axis of the magnet 109 (or 209) and can detect magnetic components in three axial directions orthogonal to one another while facing the magnet 109 (or 209), another multi-directional input device includes the magnet tilt angle calculation unit 116 that calculates a tilt angle of the magnet 109 (or 209) based on output values of both the magnetic sensors 110A and 110B, and the magnet tilt angle calculation unit averages an angle of a magnetic flux density vector calculated based on the output value of one magnetic sensor and an angle of a magnetic flux density vector calculated based on the output value of the other magnetic sensor.

In another multi-directional input device, the magnetic sensors 110A and 110B are magnetic sensors that are disposed on the sides of the magnet 109 (or 209) and can detect magnetic components in three axial directions orthogonal to one another, and the magnet tilt angle calculation unit averages an angle of a magnetic flux density vector calculated based on the output value of one magnetic sensor and an angle of a magnetic flux density vector calculated based on the output value of the other magnetic sensor, so that the detection accuracy of the tilt operation of the operating member 104 by the magnetic sensors 110A and 110B disposed on the sides of the magnet 109 (or 209) can be improved while the height of the product is reduced.

In another multi-directional input device, the magnetic sensors 110A and 110B are magnetic sensors that are disposed on the sides of the magnet 109 (or 209) and can detect magnetic components in three axial directions orthogonal to one another, and the magnetic sensors 110A and 110B are disposed in a direction orthogonal to the protruding direction of the first shaft portions 105b and 105c.

In another multi-directional input device, the magnetic sensors 110A and 110B are magnetic sensors disposed at two positions on the sides of the magnet 109 (or 209) that are point-symmetric with respect to the axis of the magnet 109 (or 209) and can detect magnetic components in three axial directions orthogonal to one another while facing the magnet 109 (or 209). Another multi-directional input device includes the magnet tilt angle calculation unit 116 that calculates a tilt angle of the magnet 109 (or 209) based on output values of both the magnetic sensors 110A and 110B. The magnet tilt angle calculation unit averages an angle of a magnetic flux density vector calculated based on the output value of one magnetic sensor and an angle of a magnetic flux density vector calculated based on the output value of the other magnetic sensor, and the magnetic sensors 110A and 110B are arranged in a direction orthogonal to the protruding direction of the first shaft portions 105b and 105c.

In another multi-directional input device, the magnetic sensors 110A and 110B are arranged in a direction orthogonal to the protruding direction of the first shaft portions 105b and 105c, so that an appropriate distance (for example, a distance that is not too short and not too long) can be secured between the magnet 109 (or 209) and the magnetic sensors 110A and 110B, and the detection accuracy of the tilting operation of the operating member 104 can be improved.

What is claimed is:

1. A multi-directional input device comprising:
   an operating member that can be tilted and pushed in;
   a push-in operation detector that detects a push-in operation of the operating member;
   a magnet holding member that is relatively movable with respect to the operating member only in a direction along a push-in direction, and is interlocked with the operating member only in a tilting direction;
   a magnet held by the magnet holding member; and
   a magnetic sensor that is disposed at a position facing the magnet and detects movement of the magnet.

2. A multi-directional input device comprising:
   a case;
   an operating member that protrudes from the case and can be tilted;
   an elastic member that returns the operating member to an initial state before a tilting operation;
   a magnet holding portion that is relatively movable with respect to the operating member only in a direction along a protruding direction and is interlocked only in a tilting direction;
   a magnet held by the magnet holding portion; and
   a magnetic sensor that is arranged at a position facing the magnet and detects a movement of the magnet,
   wherein the magnet holding portion includes a pair of disk portions arranged at both ends of the magnet, and a pin that is located coaxially with the magnet and protrudes in a protruding direction of the operating member from one of the disk portions in the protruding direction of the operating member.

3. The multi-directional input device according to claim 2,
wherein the magnet holding portion has an abutment surface in a spherical segment shape on one surface on an opposite side to a magnet side in one of the disk portions opposite to the protruding direction of the operating member,
wherein the abutment surface includes a flat surface formed of a small diameter side end surface of a spherical segment, and a curved surface formed of a side surface of the spherical segment,
wherein the operating member is supported on a bottom plate portion of the case in an upright state together with the magnet holding portion in a state where the flat surface is in abutment against the bottom plate portion, and
wherein the operating member is supported on the bottom plate in a tilted state together with the magnet holding portion in a state where the curved surface is in abutment against the bottom plate portion.

4. The multi-directional input device according to claim 2, wherein the elastic member is a compression coil spring disposed between the operating member and the magnet holding portion and is configured to press the abutment surface against the bottom plate portion while biasing the operating member in the protruding direction.

5. The multi-directional input device according to claim 2, further comprising
a rotating member having a through hole into which the operating member is inserted,
wherein the rotating member includes a first shaft portion,
wherein the first shaft portion is provided coaxially with one straight line orthogonal to a center line of the rotating member, in a state of protruding toward two opposite directions from an outer peripheral surface of the rotating member,
wherein the rotating member is accommodated in the case so as to be rotatable about an axis of the first shaft portion,
wherein the operating member includes a second shaft portion,
wherein the second shaft portion is provided coaxially with one straight line orthogonal to the center line of the operating member and also orthogonal to the first shaft portion, in a state of protruding toward two opposite directions from an outer peripheral surface of the operating member, and
wherein the operating member protrudes from the case and can be tilted in any direction of a periphery in a state of being rotatably supported about an axis of the second shaft portion with respect to the rotating member.

6. The multi-directional input device according to claim 5, further comprising
pressing switch that is capable of detecting pressing of the operating member, the pressing switch including a pusher accommodated in the case in a state of being vertically movable and a snap-type contact member for biasing the pusher upward,
wherein the rotating member is accommodated in the case in a state of being movable downward along with pressing of the operating member, and
wherein the pressing switch is configured to cause the rotating member that moves downward along with pressing of the operating member to move the pusher downward against a biasing force of the contact member, and to press the contact member with the pusher.

7. The multi-directional input device according to claim 2,
wherein the magnetic sensor is disposed on a side of the magnet,
wherein the magnet holding portion includes two same disc-shaped components formed of a magnetic material, the disc-shaped components work as the disk portions, and abutment surfaces in a spherical segment shape are provided on both surfaces of the disk portions,
wherein the abutment surface includes a flat surface formed of a small-diameter end surface of a spherical segment and a curved surface formed of a side surface of the spherical segment, and
wherein, of the flat surface and the curved surface of the abutment surface provided on one surface opposite to a magnet side in one of the disk portions on an opposite side to the protruding direction of the operating member, the flat surface supports the operating member on the bottom plate portion of the case in an upright state together with the magnet holding portion in a state where the flat surface is in abutment against the bottom plate portion, and the curved surface supports the operating member on the bottom plate portion in a tilted state together with the magnet holding portion in a state where the curved surface is in abutment against the bottom plate portion.

8. The multi-directional input device according to claim 2,
wherein the magnetic sensor is disposed on a side of the magnet,
wherein the magnet holding portion includes a cylindrical component in which a side wall portion having a C-shaped cross section and a pair of disk-shaped end wall portions for closing both end openings of the side wall portion are integrally formed of a nonmagnetic material, and which has a side window into which the magnet can be inserted from the side, the end wall portions of the cylindrical component work as the disk portions, and abutment surfaces in a spherical segment shape are provided on outer surfaces of the disk portions,
wherein the abutment surface includes a flat surface formed of a small-diameter end surface of a spherical segment and a curved surface formed of a side surface of the spherical segment, and
wherein, of the flat surface and the curved surface of the abutment surface provided on outer surface opposite to a magnet side in one of the disk portions on an opposite side to the protruding direction of the operating member, the flat surface supports the operating member on the bottom plate portion of the case in an upright state together with the magnet holding portion in a state where the flat surface is in abutment against the bottom plate portion, and the curved surface supports the operating member on the bottom plate portion in a tilted state together with the magnet holding portion in a state where the curved surface is in abutment against the bottom plate portion.

9. The multi-directional input device according to claim 2, wherein the magnetic sensor is a magnetic sensor that is disposed on a side of the magnet and can detect magnetic components in three axial directions orthogonal to one another.

10. The multi-directional input device according to claim 2,
wherein the magnetic sensor is disposed at each of two positions on sides of the magnet that are point-symmetric with respect to an axis of the magnet and each of the magnetic sensors can detect magnetic components in three axial directions orthogonal to one another while facing the magnet, wherein the multi-directional input device includes a magnet tilt angle calculation unit that calculates a tilt angle of the magnet based on output values of both the magnetic sensors, and wherein the magnet tilt angle calculation unit averages an angle of a magnetic flux density vector calculated based on the output value of one magnetic sensor and an angle of a magnetic flux density vector calculated based on the output value of the other magnetic sensor.

11. The multi-directional input device according to claim 5, wherein the magnetic sensor is a magnetic sensor that is disposed on a side of the magnet and can detect magnetic components in three axial directions orthogonal to one another, and wherein the magnetic sensor is disposed in a direction orthogonal to a protruding direction of the first shaft portion.

12. The multi-directional input device according to claim 5, wherein the magnetic sensor is disposed at each of two positions on sides of the magnet that are point-symmetric with respect to an axis of the magnet and each of the magnetic sensors can detect magnetic components in three axial directions orthogonal to one another while facing the magnet, wherein the multi-directional input device includes a magnet tilt angle calculation unit that calculates a tilt angle of the magnet based on output values of both the magnetic sensors, wherein the magnet tilt angle calculation unit averages an angle of a magnetic flux density vector calculated based on the output value of one magnetic sensor and an angle of a magnetic flux density vector calculated based on the output value of the other magnetic sensor, and wherein the magnetic sensors are arranged in a direction orthogonal to a protruding direction of the first shaft portion.

13. The multi-directional input device according to claim 6, wherein the magnetic sensor is a magnetic sensor that is disposed on a side of the magnet and can detect magnetic components in three axial directions orthogonal to one another, and wherein the magnetic sensor is disposed in a direction orthogonal to a protruding direction of the first shaft portion.

14. The multi-directional input device according to claim 6, wherein the magnetic sensor is disposed at each of two positions on sides of the magnet that are point-symmetric with respect to an axis of the magnet and each of the magnetic sensors can detect magnetic components in three axial directions orthogonal to one another while facing the magnet, wherein the multi-directional input device includes a magnet tilt angle calculation unit that calculates a tilt angle of the magnet based on output values of both the magnetic sensors, wherein the magnet tilt angle calculation unit averages an angle of a magnetic flux density vector calculated based on the output value of one magnetic sensor and an angle of a magnetic flux density vector calculated based on the output value of the other magnetic sensor, and wherein the magnetic sensors are arranged in a direction orthogonal to a protruding direction of the first shaft portion.

* * * * *